US008365138B2

(12) United States Patent
Iborra et al.

(10) Patent No.: US 8,365,138 B2
(45) Date of Patent: Jan. 29, 2013

(54) AUTOMATIC SOFTWARE PRODUCTION SYSTEM

(75) Inventors: Jose Iborra, Denia Alicante (ES); Oscar Pastor, Valencia (ES)

(73) Assignee: Sosy, Inc., San Francisco, CA (US)

(*) Notice: Subject to any disclaimer, the term of this patent is extended or adjusted under 35 U.S.C. 154(b) by 1030 days.

(21) Appl. No.: 12/284,947

(22) Filed: Sep. 26, 2008

(65) Prior Publication Data
US 2009/0132995 A1 May 21, 2009

Related U.S. Application Data

(60) Division of application No. 10/877,492, filed on Jun. 24, 2004, which is a division of application No. 09/872,087, filed on Jun. 1, 2001, now abandoned, which is a continuation-in-part of application No. 09/543,085, filed on Apr. 4, 2000, now Pat. No. 6,681,383.

(51) Int. Cl.
G06F 9/44 (2006.01)
(52) U.S. Cl. .................... 717/104; 717/106; 717/113
(58) Field of Classification Search ........... 717/101–113
See application file for complete search history.

(56) References Cited

U.S. PATENT DOCUMENTS

| | | |
|---|---|---|
| 4,734,854 A | 3/1988 | Afshar |
| 5,159,687 A | 10/1992 | Richburg |
| 5,481,718 A | 1/1996 | Ryu et al. |
| 5,485,601 A | 1/1996 | Ching |
| 5,495,567 A | 2/1996 | Iizawa et al. |
| 5,499,371 A | 3/1996 | Henninger et al. |
| 5,603,018 A | 2/1997 | Terada et al. |
| 5,842,205 A | 11/1998 | Brann |
| 5,875,331 A | 2/1999 | Lindsey |
| 5,960,200 A | 9/1999 | Eager et al. |
| 6,199,195 B1 | 3/2001 | Goodwin et al. |
| 6,275,976 B1 | 8/2001 | Scandura |
| 6,289,502 B1 | 9/2001 | Garland et al. |
| 6,385,765 B1 | 5/2002 | Cleaveland et al. |
| 6,618,852 B1 | 9/2003 | Van Elkern et al. |
| 6,681,383 B1 | 1/2004 | Pastor et al. |
| 7,137,100 B2 | 11/2006 | Iborra et al. |
| 7,278,130 B2 | 10/2007 | Iborra et al. |
| 7,334,216 B2 | 2/2008 | Molina-Moreno et al. |

OTHER PUBLICATIONS

Willumsen, "Executable Conceptual Models in Information Systems Engineering", 1993, CiteSeerX, 317 pages.*
Author Unknown, Features of VDMTools(R), Sep. 1998, pp. 1-8, IFAD, Denmark.
Author Unknown, VDMTools(R) VDM++ Toolbox User Manual, 1999, IFAD, Denmark.
Oscar Pastor et al., From Object Oriented Conceptual Modeling to Automated Programming in Java, Conceptual Modeling—ER '98, 1998, pp. 183-196, Springer Berlin/Heidelberg.
Nunes, "Object Modelling for User-Centered Development and User Interface Design: the Wisdom Approach", PhD Thesis, Apr. 2001.
Molina, P., et al., Specifying Conceptual Interface Patterns . . . In Proceedings of User Interfaces for Data Intensive Systems, IEEE Computer Society, pp. 72-79, May 31, 2001.
Molina: Master's Thesis, English Translation (Section 5 Only): Specification in OO-Method, PFC:User Interface Specification in OO-Method, 1998.
J.-P. Jacqquot et al., Early Specification of User-Interfaces: Toward a Formal Approach,Software Engineering, 1997, IEEE.

(Continued)

Primary Examiner — Ted T Vo
(74) Attorney, Agent, or Firm — Ronald C. Fish; Electronic-Patent-Group.com

(57) ABSTRACT

An automated software production system is provided, in which system requirements are captured, converted into a formal specification, and validated for correctness and completeness. In addition, a translator is provided to automatically generate a complete, robust software application based on the validated formal specification, including user-interface code and error handling code.

54 Claims, 25 Drawing Sheets

OTHER PUBLICATIONS

Frank Koob et al., Industrial Usage of Formal Development Methods—the VSE-Tool Applied in Pilot Projects, 1996, IEEE, Bonn, Germany.

Paulo Pinheiro De Silva et al., Generating User Interface Code in a Model Based User Interface Development Environment, 2000, University of Manchester, Manchester, U.K.

Paulo Pinheiro Da Silva et al., Generating User Interface Code from Declarative Models: The Teallach Approach, Aug. 1999, Univ. of Manchester, Manchester, U.K.

Tony Griffiths et al., Teallach: A Model-Based User Interface Development Environment for Object Databases, User Interfaces to Data Intensive Systems 1999, IEEE.

Bernd Bruegge, Rose Tutorial 15-413, Sep. 1997, School of Computer Science, Carnegie Mellon University, Pittsburge, U.S.A.

Author Unknown, Rational Rose 98i Using Rose J, 1998, Rational Software Corporation, U.S.A.

John Hsia, Your Guide to Rational Rose Add-Ins, Jun. 1999, Rational Software and Miller Freeman, Inc. U.S.A.

\* cited by examiner

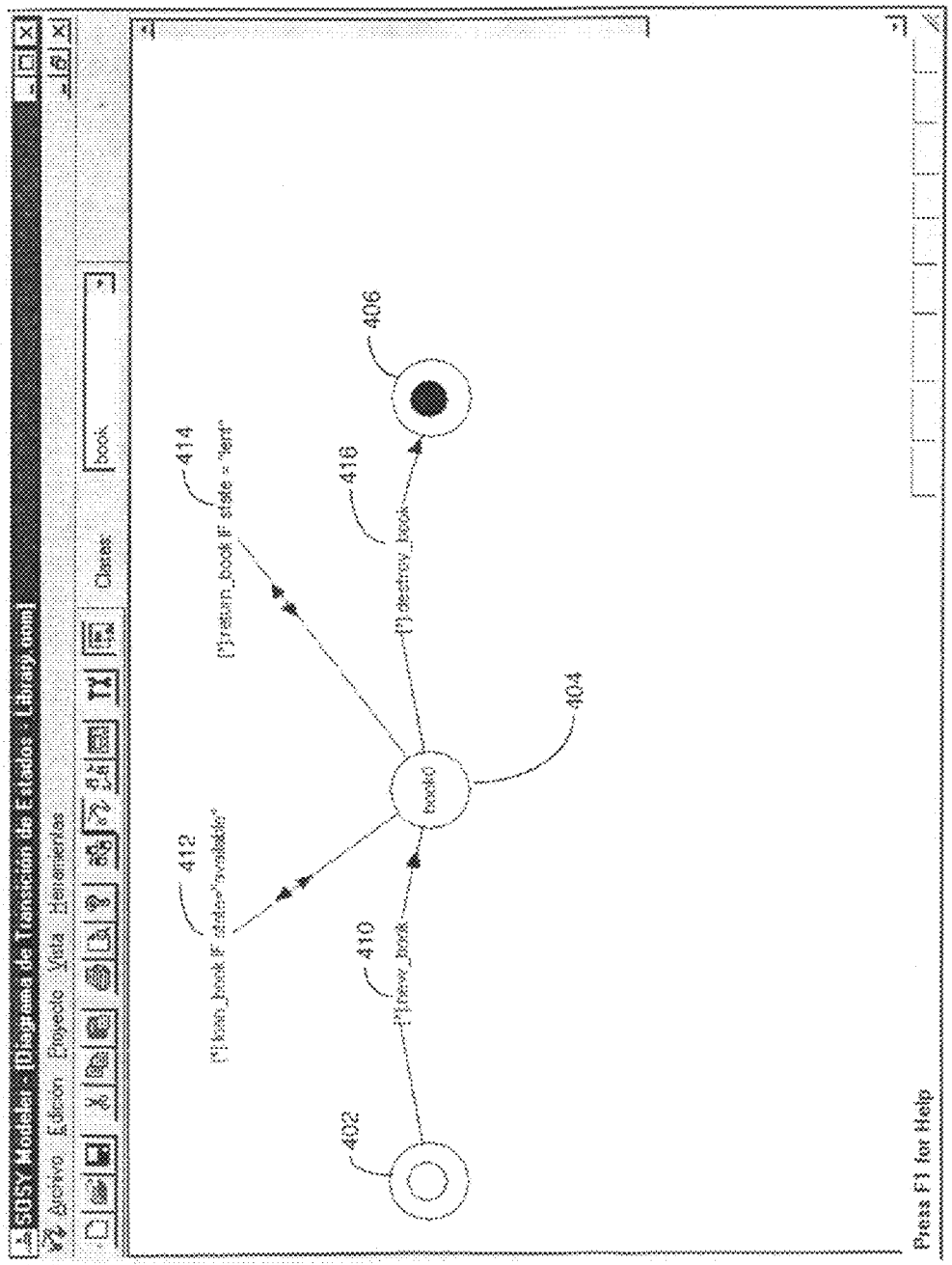

CLASS CREATION DIALOG

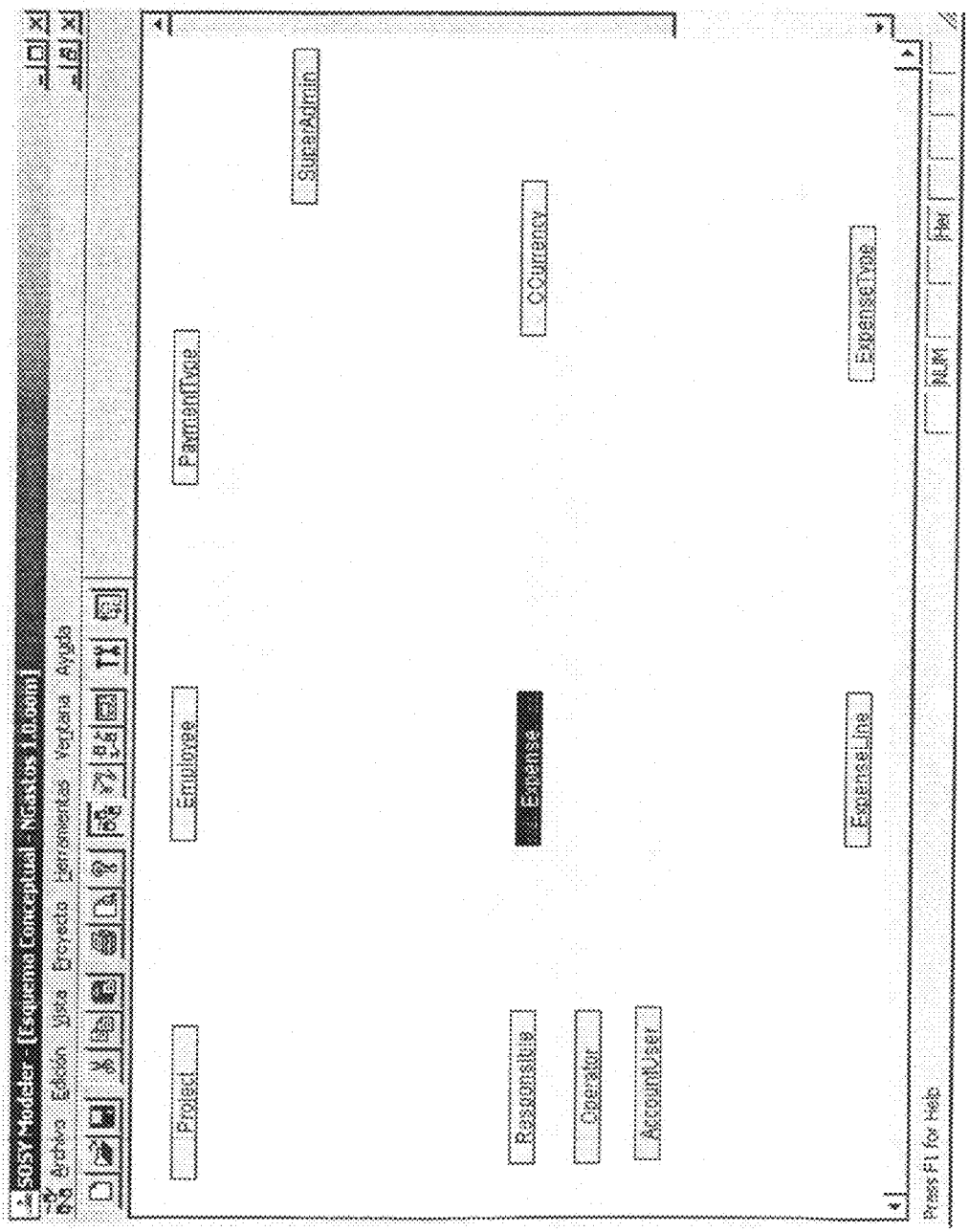
FIG. 9B ALL CLASSES NEEDED AND CREATED IN EXPENSE MANAGEMENT SYSTEM

DIALOG TO CREATE AND MODIFY RELATIONSHIPS BETWEEN CLASSES

GRAPHIC DIALOG TO CREATE RELATIONSHIPS BETWEEN CLASSES AND GRAPHICALLY SHOW THE RELATIONSHIPS SO CREATED

FIG. 11A

SERVICES OF CLASS "EXPENSE"

FIG. 12

FIG. 13 DIALOG TO DEFINE FORMULA FOR "DELETEALL" TRANSACTION

INTEGRITY CONSTRAINTS OF EXPENSE CLASS

DIALOG BOX TO CREATE EVALUATION OF "CAUSE" ATTRIBUTE WITH THE "MODIFY" EVENT TO FORM PART OF FUNCTIONAL MODEL

AGENT RELATIONSHIP DIALOG THAT CAN BE USED TO SET WHICH SERVICES "ACCOUNT USE" CAN ACCESS AND VISIBILITY OF CLASS ATTRIBUTES FOR THIS USER

STATE TRANSITION DIAGRAM FOR CLASS "EXPENSE"

DIALOG BOX TO MODEL PRECONDITION

DIALOG BOX USED BY SOSY MODELER TO ESTABLISH THE SEARCHING CRITERIA FOR THE EXPENSE CLASS AND TO ESTABLISH THE FILTER FORMULA TO USE AND THE VARIABLES TO REQUEST THE USER TO ENTER

AUTOMATIC SOFTWARE PRODUCTION SYSTEM

CROSS-REFERENCE TO RELATED APPLICATIONS

This is a voluntary divisional application under 37 CFR 1.53(b) of a prior U.S. patent application Ser. No. 10/877,492, filed Jun. 24, 2004, which was a divisional application of U.S. patent application Ser. No. 09/872,087, filed Jun. 1, 2001 (now abandoned) which was a continuation-in-part application of a prior U.S. patent application filed 4 Apr. 2000, Ser. No. 09/543,085 (now U.S. Pat. No. 6,681,383). This application claims subject matter that is related to the subject matter claimed in two other continuation-in-part applications entitled "Automatic Software Production System" U.S. patent application Ser. No. 09/872,413 and 09/872,333 and the following other U.S. patent applications and patents U.S. Pat. No. 7,271308, filed Jun. 1, 2001, Ser. No. 09/872,413;

U.S. Pat. No. 7,137,100 filed Jun. 1, 2001, Ser. No. 09/872,333;

U.S. Pat. No. 7,334,216 filed Jan. 31, 2003, Ser. No. 10/356,250;

U.S. patent application Ser. No. 10/877,492, filed Jun. 24, 2004

U.S. patent application Ser. No. 11/542,827, filed Oct. 4, 2006;

U.S. patent application Ser. No. 11/543,426, filed Oct. 5, 2006;

U.S. patent application Ser. No. 11/545,438, filed Oct. 10, 2006;

U.S. patent application Ser. No. 11/977,218, filed Oct. 23, 2007;

U.S. patent application Ser. No. 12/284,842, filed Sep. 25, 2008;

FIELD OF THE INVENTION

The present invention relates to computer systems and more particularly to an automatic software production system and methodology.

COMPUTER PROGRAM LISTING APPENDIX

The assembly code computer program listing having file name TOTAL.ASM size 39,107,073 bytes, created on May 23, 2001 which was submitted in duplicate with this patent application on a single CD-ROM is hereby incorporated by reference. The file is in TXT format on a disc compatible with IBM-PCs and the Windows 98 operating system, and can be opened by any word processor.

BACKGROUND OF THE INVENTION

Software engineering is the application of a systematic and disciplined approach to the development and maintenance of computer programs, applications, and other software systems. Due to the increasing computerization of the world's economy, the need for effective software engineering methodologies is more important than ever.

The traditional software development process involves a number of phases. First, the requirements of the program are specified, typically in the form of a written specification document based on customer needs. Then, a software developer writes source code to implement the requirements, for example, by designing data structures and coding the system logic. Finally, the software developer undergoes an extensive testing and debugging phase in which mistakes and ambiguities in the requirements are identified and errors in the software code are fixed. Having to refine the system requirements is one of the most serious problems that might occur, because any modification to the requirements necessitates a redevelopment of the source code, starting the process all over again. Thus, the testing and debugging phase is the longest phase in the software engineering process and the most difficult to estimate completion times.

For the past forty years, there have been many attempts to improve isolated portions of the software engineering process. For example, the creation of first higher-level languages such as FORTRAN and then of structured programming languages such as ALGOL has helped ease the burden of implementing the system logic. As another example, the introduction of object-oriented methodologies has helped in the design and implementation of data structures. These improvements in the software engineering process have lessened the mismatch between the problem space, which is the Conceptual Model for the application, and the solution space, which is the actual software code. Nevertheless, some mismatch between the problem space and the solution space remains, which gives rise to an opportunity for programming errors. Because of the programming errors, it is necessary to undergo an extensive testing and debugging phase to isolate and fix the software faults.

Lately, there has been some interest in the use of "requirements analysis" and Computer Aided Software Engineering (CASE) to facilitate the first phase of the software engineering process, which is the identification and specification of the requirements. In particular, these approaches attempt to allow for software engineers to formally specify the requirements and build a prototype to validate and test the requirements. After the requirements are tested, the prototype is discarded and the software engineer develops the complete software application based on the requirements.

One example is known as "OMTROLL", whose objective is to assist software designers by means of an Object Modeling Technique (OMT)-compliant graphical notation to build the formal specification of the system. This specification is based on the TROLL specification language and has to be refined to a complete system specification. In addition, OMTROLL has a CASE support called TrollWorkbench, which provides a prototyping function by generating an independently executable prototype from a graphical conceptual specification. The prototype generated is a C++ program that includes the static/dynamic aspects of the system and uses an Ingress database as a repository of the specification.

OBLOG is another object-oriented approach for software development that falls within the scope of the European ESPRIT project IS-CORE (Information Systems-Correctness and Reusability). The OBLOG semantics is formalized in the context of the theory of categories. OBLOG also employs a CASE tool for introducing specifications and enables a developer to build a prototype by supplying rewrite rules to convert the specifications into code for the prototype. The rewrite rules must be written using a specific language provided by OBLOG.

Another approach that focuses more on levels of formalism is the Object System Analysis model (OSA). The aim of OSA is to develop a method that enables system designers to work with different levels of formalism, ranging from informal to mathematically rigorous. In this context, this kind of tunable formalism encourages both theoreticians and practitioners to work with the same model allowing them to explore the difficulties encountered in making model and languages equivalent and resolve these difficulties in the context of OSA for a particular language. OSA also has a CASE support tool called IPOST, which can generate a prototype from an OSA model to validate the requirements.

A different approach has been proposed by SOFL (Structured-Object-based-Formal Language), whose aim is to address the integration of formal methods into established industrial software processes using an integration of formal methods, structured analysis and specifications, and an object-based method. SOFL facilitates the transformation from requirements specifications in a structured style to a design in an object-based style and facilitates the transformation from designs to programs in the appropriate style. In accordance with the previous arguments, the SOFL proposal attempts to overcome the fact that formal methods have not been largely used in industry, by finding mechanisms to link object-oriented methodology and structured techniques with formal methods, e.g. VDM (Vienna Development Method) style semantics for its specification modules. Combining structured and objected-oriented techniques in a single method, however, makes it difficult to clarify the method semantics; thus, effective tool support is necessary for checking consistency.

Still another approach is known as TRADE (Toolkit for Requirements and Design Engineering), whose conceptual framework distinguishes external system interactions from internal components. TRADE contains techniques from structured and object-oriented specification and design methods. A graphical editor called TCM (Toolkit for Conceptual Modeling) is provided to support the TRADE framework.

Although these approaches are of some help for the first phase, i.e. in refining the requirements before the computer application is coded, they do not address the main source for the lack of productivity during later phases of the software engineering process, namely the programming and testing/debugging phases. For example, once the requirements are identified, the software engineer typically discards the prototype generated by most of these approaches and then designs and implements the requirements in a standard programming language such as C++. The newly developed code, due to the mismatch between the problem space and the solution space, will commonly contain coding errors and will need to be extensively tested and debugged.

Even if the prototype is not discarded and used as skeleton for the final application, the software developer must still develop additional code, especially to implement the user interface and error processing. In this case, there still remains the need for testing and debugging the code the programmer has written. The rule-rewriting approach of OBLOG, moreover, fails to address this need, because the difficulties associated with programming are merely shifted one level back, to the development of the rewriting rules in an unfamiliar, proprietary language.

Other approaches include those of Rational and Sterling, but these are not based on a formal language.

Therefore, there exists a long-felt need for improving the software engineering process, especially for reducing the amount of time spent in the programming and testing phases. In addition, a need exists for a way to reducing programming errors during the course of developing a robust software application. Furthermore, there is also a need for facilitating the maintenance of software applications when their requirements have changed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates an exemplary state transition diagram in accordance with one embodiment of the present invention.

FIG. 9B is screenshot of a graphic interface box showing the classes that have been defined to store the pertinent information and provide the pertinent services to implement a computer program that meets the above defined requirements. Defining these classes starts the process of building the Formal Specification in the high level repository.

FIG. 11(A) shows the dialog box used to define the attributes for the Expense class with their properties. This dialog box is used to define whether each attribute is constant, variable or derived, the type of data it contains and other things.

Figure 12:
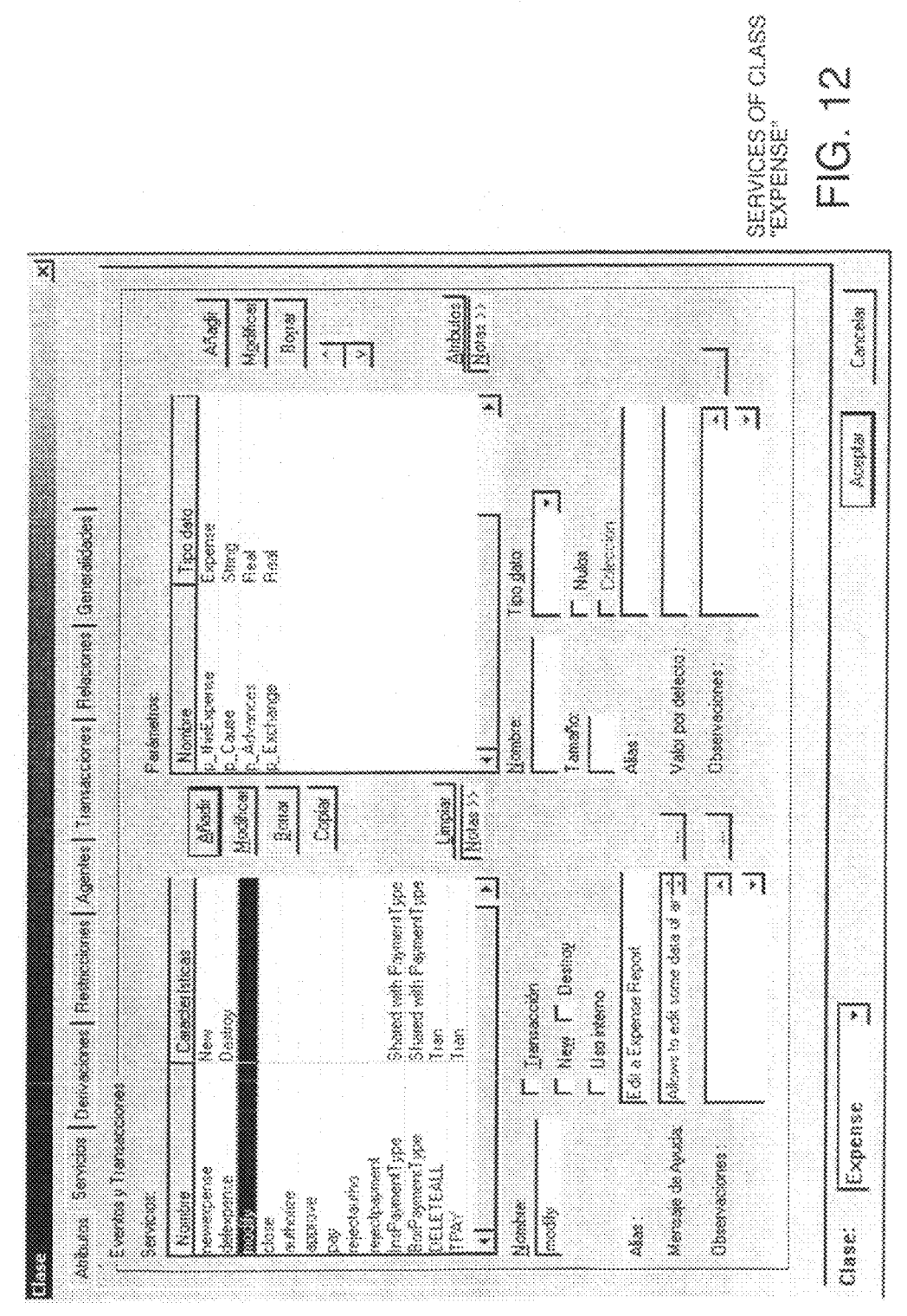

FIG. 12 shows a dialog box which a SOSY modeler uses to define the services of the Expense class with their arguments.

DETAILED DESCRIPTION OF THE PREFERRED EMBODIMENT

Figure 1:
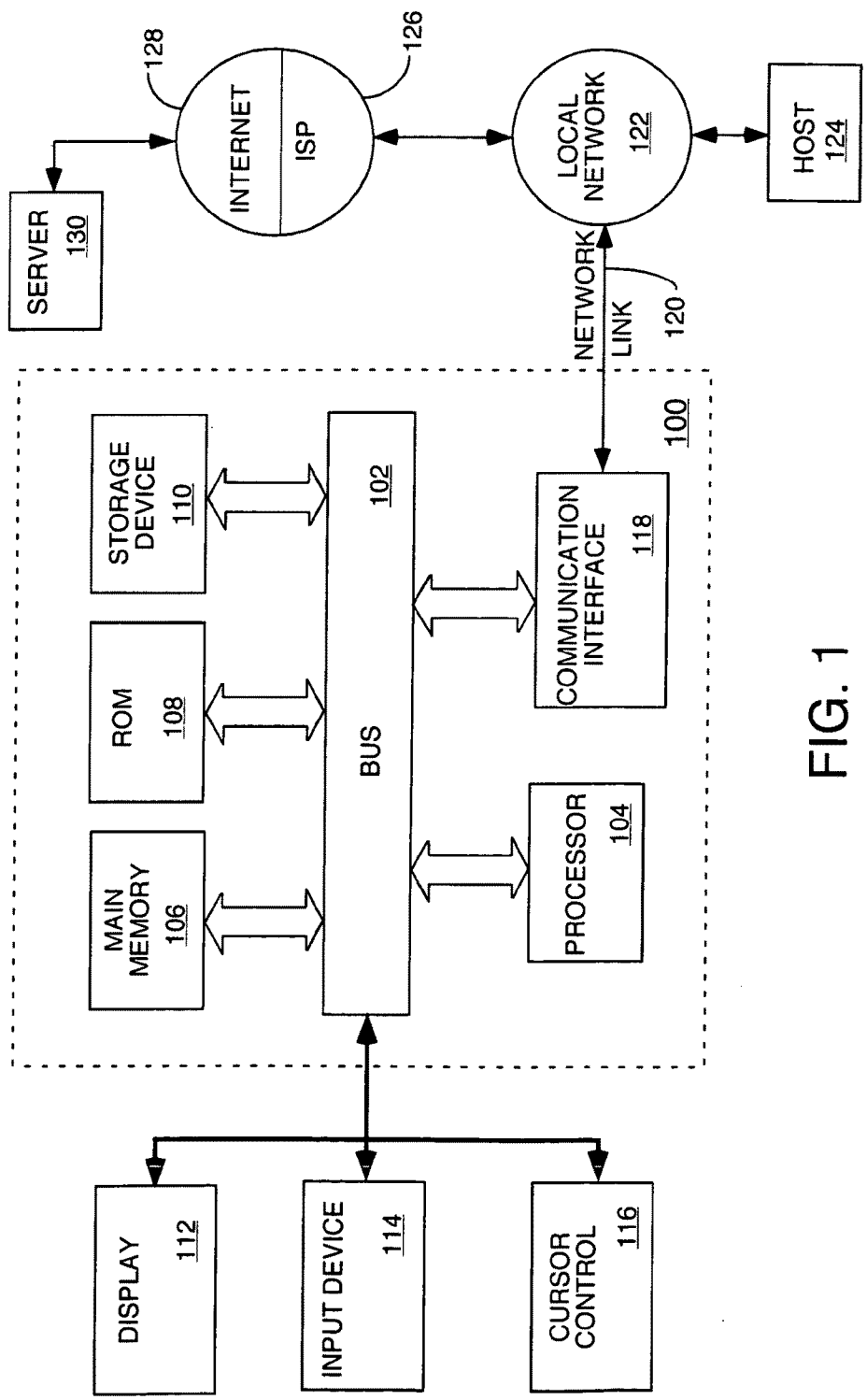
FIG. 1 depicts a computer system that can be used to implement an embodiment of the present invention.

These and other needs are addressed by the system disclosed herein.

There are at least three points of novelty that are embodied in separate subsystems or subgenus systems in an overall system employing the teachings of the invention.

The first point of novelty is the front end processing to create what is referred to herein as the Conceptual Model in a formal language or symbology (that can be represented by a data structure in a computer and which has rules that can be used for validation) that can be validated to make sure the Conceptual Model is syntactically complete, semantically correct and not ambiguous. That is, the validation process finds holes left in information needed to complete the Conceptual Model of the problem, makes sure everything in the formal specification makes sense (semantically correct) and makes sure no ambiguities exist. The Conceptual Model is typically written as statements in any known or new formal language which has rules of syntax and semantics (together referred to as grammar) which are known to the validator. It is these rules of syntax and semantics that the validator uses to verify the completeness, correctness and lack of ambiguity of the formal specification.

A formal language is a language wherein: 1) there is an agreed upon syntax to every statement defining the proper structure of the component parts of the statement; and 2) there is agreed upon semantics meaning that every term is defined and has one and only one meaning. An example of known formal language is Oasis. It is these characteristics of the formal language in which the Conceptual Model is recorded in a high level repository which allow the Conceptual Model to be validated. Validation is an important process in the front end processing, because it is validation which guarantees that the problem to be solved by the code to be written has been stated in complete, correct and non ambiguous terms, and it is these factors which lead to complete, correct and bug-free code.

Known formal languages do not have to be used, and some new symbology may be used to record the Conceptual Model. However, whatever symbology is used, it must have the two above defined characteristics of a formal language and therefore the symbology would be a new formal language of its own. Thus, the term formal language in the claims is intended to mean any known or new formal language which is defined by the following characteristics: 1) there is an agreed upon syntax to every statement; and 2) there is agreed upon semantics to every statement. Syntax is the fixed and agreed upon structure of statements in the model. In the non formal English language, syntax is defined in the American Heritage Dictionary as "The study of the rules whereby words or other elements of sentence structure are combined to form grammatical sentences." Alternatively, syntax is defined as "The pattern of formation of sentences or phrases in a language." Semantics is the meaning of various parts of the formal language or symbology statements. In a formal language or symbology that must be used to practice the invention, semantics means everything is defined and has one and only one meaning so there can be no ambiguity caused by multiple meanings for the same term.

The combination of syntax and semantics is referred to herein as the grammar of the formal language. A formal language may, in some ways, be thought of as mathematically based such that it can be mathematically validated to make sure that every needed concept, argument or value is present and there are no inconsistencies in the information gathered and the gathered information is not ambiguous.

In the preferred species described herein, the process of creating the Conceptual Model is done using a graphical user interface to represent the various objects, etc. that comprise the model visually. In other embodiments, the Conceptual Model may be drafted directly in a formal language using a plain old text-based interface or any word processing application. This is done by a SOSY modeler after determining the nature of the problem to be solved and all the other information needed to model the code to be written in a formal language. As long as the Conceptual Model is written in a formal language, it can be validated, and that validation process is a key factor in generating complete and error free code. This substantially reduces the time to market for the application's final code.

The applicants feel that the front end processing to generate a high level repository in a formal language that records the details of the Conceptual Model is an invention standing alone. This is because this high level repository can be coded manually and there will be far fewer errors caused by incomplete information, ambiguous terms, etc.

To automatically write a complete working program from the formal specification requires at least one translator program that controls said computer to process the formal specification into working code in some target computer language such as Visual Basic, C++, assembly code for any microprocessor, etc. At least a system logic translator is required to convert the requirements of the formal specification into working code that can be interpreted or compiled into a program that can control a computer to do the functions modeled in the Conceptual Model. In some applications where, for example, the program to be written is buried inside a big machine such as an MRI machine and there is no user interface and no data structure or persistence layer needed, the single translator may be enough.

However, the preferred species uses four translators which process the high level repository into working system logic code in the target language, a user interface, a database schema and documentation. In other words, regardless of how the Conceptual Model created by the front end processing is translated into working code, the process of creating the Conceptual model (comprised of the Object Model, the Dynamic Model, the Functional Model and the Presentation Model) and validating it is believed to be new.

It is the agreed upon syntax and semantics of the formal language or symbology in which the data elements in the Conceptual Model are expressed which allows the Conceptual Model of the problem to be solved to be validated. Validation means that there are no missing elements of data needed to complete the model, all mathematical expressions are well formed and make sense, and all statements in the model are semantically correct and made in the correct syntax, and that there are no ambiguities. For example, if a statement in the model attempted to add a floating point number to an alphanumeric string, that would be semantically incorrect, and would be detected in the validation process.

All species in the front end subgenus will share the characteristic of creating a Conceptual Model of the problem to be solved in an already known formal language or in a new language with agreed upon syntax and semantics such that the model can be validated as complete, correctly stated semantically speaking and not ambiguous.

The validation process does not confirm that the model created correctly models the problem. That is up to the SOSY modeler, also referred to herein as the "designer" (a person trained in creation of Conceptual Models and trained in the syntax and semantics of the formal language or symbology being used if a graphical user interface is not being used) that gathers the data and rules of the problem that get encoded into the Conceptual Model. The validation process simply applies all the rules of the syntax and semantics to the statements in the formal language that give the definition of every object and class to make sure all statements are complete, semantically correct and not ambiguous.

The second point of novelty subgenus relates to how the Conceptual Model is actually built by the SOSY modeler. In the preferred species within this first subgenus, the Conceptual Model is built by using a graphical user interface to define objects and relationships between objects, state transitions and most if not all the other items that go into the Conceptual Model that is encoded into the formal language. Each piece of requirements data so entered is converted automatically and on the fly into its formal language counterpart. This makes it easier for the SOSY modeler to use the formal language by alleviating the need for the SOSY modeler to know all the details of the syntax and semantics of the formal language. In other species within the first subgenus however, the SOSY modeler can use a text based interface or any other type of interface to record the statements which together comprise the Conceptual Model.

The only things that are essential to the invention of the first point of novelty are that the Conceptual Model be recorded in some formal language and that it be validated. Exactly how these events occur in a particular species within the first subgenus is not critical. For example, some validation processes within the first subgenus may start with one rule and apply it to every statement in the high level repository (the formal language statements that encode the Conceptual Model) in a first pass and then do the same thing for every other rule of syntax and semantics in the formal language definition. Other species may start with the first statement in the high level repository and apply all the rules against it and repeat this process for every statement. Other species may start at the first statement and process it to make sure it complies with every applicable rule and then repeat this process for every other statement.

The third point of novelty is the backend processing to convert the statements in the high level repository to working system logic code targeted for some specific platform, operating system and high level language, and a user interface (if applicable) and a database (if applicable) and documentation (if applicable). This is the work done by translators.

There are four translators used in most applications: a system logic translator; a user interface translator; a database generator; and a documentation generator. The system logic translator represents one or more processes that convert the statements in the high level repository into computer code that implements the system logic in the target language that makes the correct function calls to the target operating system to accomplish various functions required by the Conceptual Model. In other words, the system logic translator is a translator that writes the code that actually carries out the processing of all the services defined in the objects defined by the Conceptual Model to alter the values of attributes of various objects, call services of other objects, etc. to carry out the overall function of the program.

An object is a programming construct that has data in the form of attributes and services which are programs which control the computer to do whatever function the service is designed to do. The services defined for an object carry out processing appropriate to the existence and meaning of the object in the overall Conceptual Model and, generally, are invoked through application programmatic interfaces or APIs.

The details of the structure and operation of the translator species within the subgenus "system logic translator" vary from one input formal language and one output target language to the next, but all species within the "system logic translator" subgenus share certain characteristics. All species will have to: provide the object system view; identify the object server code that executes each service defined for each object; receive the service arguments; send a message to each object server; check the state transitions; check the preconditions; fulfill valuations defined in each object; check integrity constraints; and test trigger relationships. What these characteristics mean will be described in greater detail later herein.

There is also a translator that defines the structure of a database (referred to herein as a persistence) that stores the values of all the attributes of all objects thereby defining the state of every object. Although the details of various species vary with formal language of the input and the target database type, all species within this subgenus of database translators share the following characteristics: 1) all species will get the values of all attributes of all the objects in all the classes; and 2) all species will store these attribute values at any particular point in time in the desired form or data structure such that the value of any attribute of any object can be obtained by the system logic.

There is also a translator that creates documentation. Again, the details of the species within this subgenus vary from one type of target language and desired documentation to the next, but all species within this subgenus will share the following characteristics: 1) all species will go to the four models that are part of the Conceptual Model and copy the information from the models that is needed to generate the required documentation such as object definitions, class names and definitions, etc.; and 2) write the required documentation in a predetermined file format. In some species, the system will go to a data model or configuration data to determine which documentation to produce, and then perform steps 1 and 2 above.

Finally, there is also a genus of translators that create code to implement the user interface if a user interface is needed for the program being developed. However, some species of the overall system of the invention create code which works inside some apparatus in a manner which is not visible to the user so there is no user interface. Such system species do not need a user interface translator. All species within the subgenus of user interface translators will share the following characteristics: 1) all species will at least identify the user of the application program being designed; 2) provide a object system view that is appropriate to the user that logged in and only allows that user to perform functions within that user's privilege level; 3) write code to identify the correct object server(s), i.e., the computer program that implements the particular service(s) the user is allowed to and has elected to invoke; 4) write code to request and receive or retrieve from sources other than the designer the service arguments needed to invoke the service the user wishes to invoke and check whether the input received is valid or within a valid restricted range and to check for dependencies (if dependencies exist) between arguments and, if a dependency exists, and a user input triggers a dependency, to display the appropriate field to enter the needed to satisfy the dependency; 5) write code to invoke the service and send the service the appropriate arguments; and 6) wait for results and display an error message if an error has occurred, or, if no error has occurred, display any results which result from execution of the service and then wait for another user input.

Each species in a subgenus will do the generically stated functions that define the subgenus, but will do them in a different way which is dependent upon the target platform, operating system and high level language in which the output is to be generated.

The system of the example described below, both the front end and back end (translation) processing is implemented. The front end processing captures the system requirements graphically (e.g. through a graphical user interface), converts the four models so created into a formal specification, and validates a high level repository written in a formal language from the four models for correctness and completeness. In the back end processing, a translator is provided to automatically generate a complete, robust software application based on the validated formal specification.

By generating the application code from the validated formal specification, error-free source code strategies can be employed, freeing the developer from having to manually produce the source code or extend an incomplete prototype. Therefore, the error-prone, manual programming phase of the traditional software engineering process is eliminated, and the testing and debugging time is greatly reduced. In one example, the software development time of an application was reduced to 2.02% (or 8.5% worst case) of the original time. In other words, performance has been benchmarked by a reputable software tool evaluation company to be 12 to 47 times faster than similar projects using other competing software products. Software maintenance is also reduced, because the traditional coding, testing, and revalidation cycles are eliminated.

One aspect of the present invention springs from the insight that ambiguity is a major source of programming errors associated with conventional object-oriented and higher-order programming languages such as C++. Accordingly, an automated software production tool, software, and methodology are provided, in which a graphical user interface is presented to allow a user to input unambiguous formal requirements for the application computer program being designed. Based on the formal requirement data input for the application computer program being designed, a Formal Specification for the application is produced and validated, from which the application computer program is generated. By generating the application directly from an unambiguous, validated Formal Specification, the designer can avoid the programming errors associated with conventional programming languages, and instead work directly in the problem space. In one embodiment, error handling instructions are also produced when the software application is generated so as to create a robust, final software application.

Another aspect of the system described herein stems from the realization that a major source of inadequacy of conventional prototyping techniques is that these techniques lack the capability to specify the user interface aspects. Thus, such conventional prototypes have primitive user interfaces that are unacceptable for final, customer-ready software application. Accordingly, this aspect of the invention relates to an automated software production tool, software, and methodology that includes a formal specification of a Conceptual Model that specifies requirements for a software application. The Conceptual Model includes a presentation model that specifies patterns for a user interface of the software application. The Formal Specification, which also specifies the presentation model is validated; and the software application is then generated based on the validated formal specification. As a result, the generated software application includes instructions for handling the user interface in accordance with the patterns specified in the presentation model.

An automatic software production system is described in more detail below. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automatic software production. According to one embodiment of the invention, automatic software production is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for automatic software production as described herein. The received code may be executed by processor 104 as it is received, and/or stored in storage device 110, or other non-volatile storage for later execution. In this manner, computer system 100 may obtain application code in the form of a carrier wave.

Conceptual Overview

Figure 2:
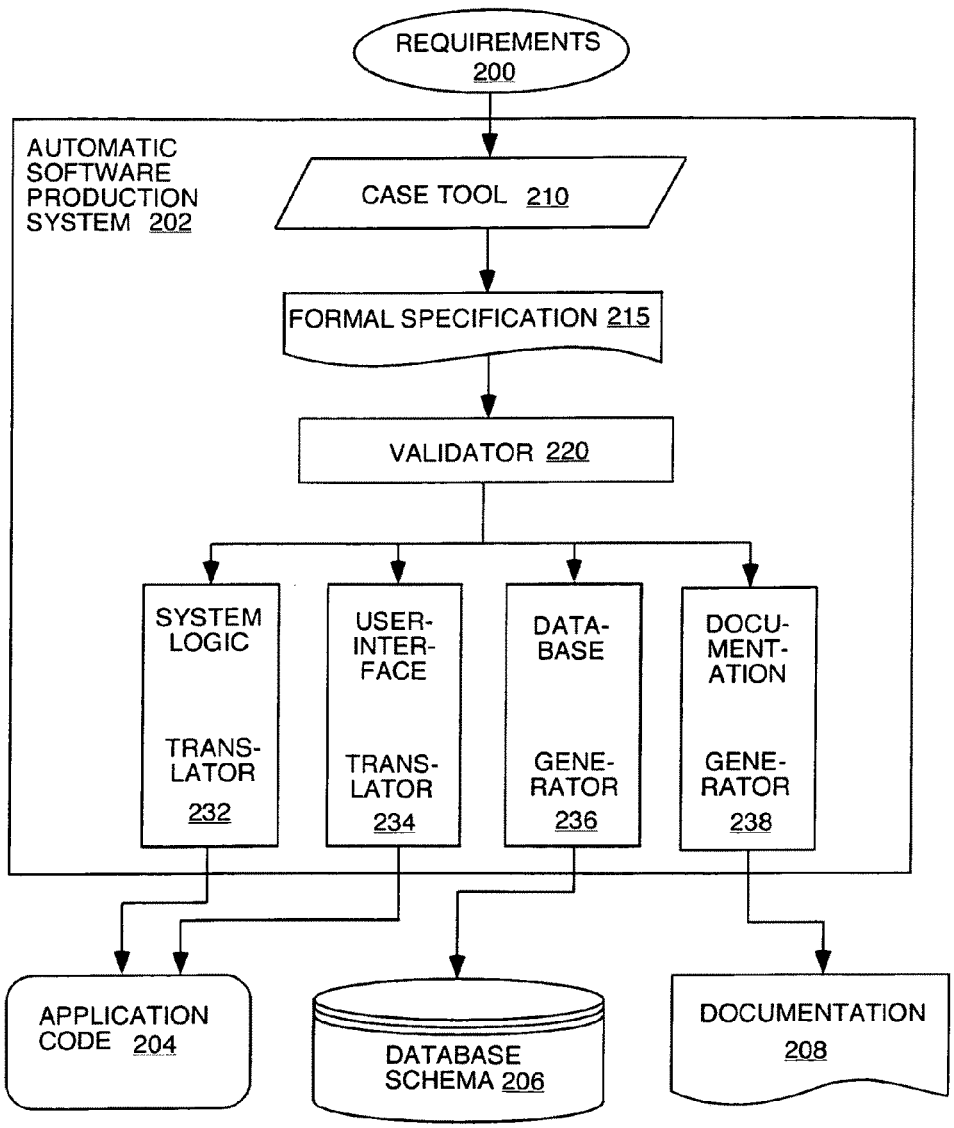
FIG. 2 is a schematic block diagram illustrating the high-level architecture and data flows of an automatic software production system in accordance with one embodiment of the present invention.

FIG. 2 is a schematic block diagram illustrating the high-level architecture and data flows of an automatic software production system 202. The automatic software production system 202 is configured to accept requirements 200 as input, and produce a complete, robust application 204 (including both system logic and user-interface code), a database schema 206, and documentation 208. In one implementation, the automatic software production system 202 includes a Computer Aided Software Engineering (CASE) tool 210 front end to allow a user to input the requirements, a validator 220 for validating the input requirements 200, and several translators to convert the validated input requirements 200 into a complete, robust application 204. These translators may include a system logic translator 232, a user-interface translator 234, a database generator 236, and a documentation generator 238.

During operation of one embodiment, requirements 200 specifying a Conceptual Model for the application are gathered using diagrams and textual interactive dialogs presented by the CASE tool 210. Preferably, the CASE tool 210 employs object-oriented modeling techniques to avoid the complexity typically associated with the use of purely textual formal methods. In one implementation, the Conceptual Model is subdivided into four complementary models: an object model, a dynamic model, a functional model, and a presentation model. These models are described in greater detail hereinafter. After gathering the requirements 200, the CASE tool 210 stores the input requirements as a formal specification 215 in accordance with a formal specification language, for example, the OASIS language, which is an object-oriented language for information systems developed at the Technical University of Valencia, Spain. Using extended grammar defined by the formal language, the validator 220 syntactically and semantically validates the formal specification 215 to be correct and complete. If the formal specification 215 does not pass validation, no application is allowed to be generated; therefore, only correct and complete applications are allowed be generated.

If, on the other hand, the formal specification 215 does indeed pass validation, automatic software production processes, some of the processes referred to as "translators" (system logic and user interface ones) are employed to implement a precise execution model that corresponds to the validated formal specification 215. In particular, translators 232 and 234 produce application source code 204 in a high-order language such as C++, Visual Basic or JAVA for the application's system-logic and user-interface, respectively. In one implementation, a database generator 236 also produces instructions in, for example, a Structure Query Language (SQL) scripting language to create the data model for the application in an industry-standard ANSI-92 SQL Relational Database Management System (RDBMS). However, in other embodiments, the database translator 236 just outputs a file having a file structure that is known to the system logic created by the system logic translator 232. Basically, the structure of the database or table or other data structure that database generator 236 creates is defined by the objects and classes defined in the Conceptual Model. The only thing that is necessary is that translator 236 provide at least a place to store the states of the objects in the system as defined by their attribute values and that the attribute values be stored in some format known to the system logic translator such that the values of attributes can be retrieved from whatever data structure is created by translator 236. In other species, the database generator creates a data structure defined by the Conceptual Model as well as for storing other data from other sources or entered by remote client computers for use by the code created by the system logic translator 232.

In addition, one implementation also employs a document generator 238 to automatically generate serviceable system documentation from the information introduced in the Conceptual Model.

CASE Modeler

As mentioned herein above, the CASE tool 210 preferably employs object-oriented modelling techniques to avoid the complexity typically associated with the use of purely textual formal methods. Rather, four complementary models, that of the object model, the dynamic model, the functional model and the presentation model, are employed to allow a designer to specify the system requirements. In contrast with conventional techniques, however, the CASE tool 210 actually captures a formal specification of the designer's system "on the fly" according to a formal specification language, while the designer is specifying the system with the CASE tool 210.

This feature enables the introduction of well-defined expressions in the specification, which is often lacking in the conventional methodologies. In particular, the CASE tool 210 enforces the restriction that only the information relevant for filling a class definition in the formal specification language can be introduced. The use of a formal specification, input by means of the CASE tool 210, therefore provides the environment to validate and verify the system in the solution space, thereby obtaining a software product that is functionally equivalent to the specification as explained hereinafter. Nevertheless this is always done preserving this external view which is compliant with the most extended modeling techniques, as stated before. In this way, the arid formalism characteristic of many conventional approaches is hidden from the designer, who is made to feel comfortable using a graphical modelling notation.

With respect to the notation, conceptual modelling in one embodiment employs diagrams that are compliant with the Unified Modelling Language (UML); thus, system designers need not learn another graphical notation in order to model an information system. In accordance with the widely accepted object oriented conceptual modeling principles, the Conceptual Model is subdivided into an object model, a dynamic model, and a functional model. These three models, however, are insufficient by themselves to specific a complete application, because a complete application also requires a user interface. Therefore, the CASE tool 210 also collects information about user-interface patterns, in a fourth model referred to as "Presentation Model", which will be translated into the code for the application. In one embodiment, the CASE tool 210 collects information organized around projects which correspond to different applications. Each project built by the CASE tool 210 can include information about classes, relationships between classes, global transactions, global functions, and views.

Each class contains attributes, services, derivations, constraints, transaction formulas, triggers, display sets, filters, population selection patterns, a state transition diagram and formal interfaces. In addition to the information in these lists, a class can also store a name, alias and a default population selection interface pattern. Extra information is stored as remarks that the designer can input information about why a class does exist in a model.

Each attribute can have the following characteristics: name, formal data type (e.g. constant, variable, derived), data type (real, string, . . . ), default value, whether the attribute is an identifier for distinguishing the objects of the class, length, whether the attribute is required when the object is created, whether the attribute can be assigned a NULL value, and a field to introduce some remarks about why the attribute has been created. Each attribute can also include a list of valuations, which are formulas that declare how the object's state is changed by means of events. Valuation formulas are structured in the following parts: condition (that must be satisfied to apply the effect), event and effect of the event to the particular attribute. An attribute may also include user interface patterns belonging to the presentation model to be applied in the corresponding services arguments related to the attribute.

Services can be of two types: events and transactions. Events are atomic operations while transactions are composed of services which can be in turn events or transactions. Every service can have the following characteristics: name, type of service (event or transaction), service alias, remarks and a help message. Events can be of three types: new, destroy or none of them. Events can also be shared by several classes of the project. Shared events belong to all classes sharing them. Transactions have a formula that expresses the composing of services. In addition to this information, services store a list of arguments whose characteristics are: name, data type, whether nulls are allowed as a valid value, whether the argument represents a set of objects (collection), default value, alias and remarks. Additionally, for each argument user-interface patterns related to arguments are: introduction pattern, population selection pattern, defined selection pattern and dependency pattern. The class can also store a list of derivations, and constraints. Each derivation specifies a list of pairs condition-formula, specifying which formula will be applied under every condition. Each constraint is a well formed formula plus the error message that will be displayed when the constraint was violated. For the dynamic constraints, the formula will be internally translated into a graph which constitutes the guide for its evaluation.

A class can also store triggers. Each trigger may be composed of trigger target specified in terms of self, class or object, trigger condition, triggered action (service plus a list of possible agents) to be activated and a list of default values associated with the arguments of the related service. A class can also have display sets, filters and population selection patterns as user-interface patterns of the presentation model affecting the class. Each display set can store elements of visualization (attributes to be displayed to the user). Each filter is composed of a well formed formula and a list of auxiliary variables that are useful to define the formula. The population selection pattern is related to a display set and a filter.Classes also have a State Transition Diagram which is a set of states and transitions between them. Each state transition is related to an action (service plus list of possible agents) that can change the state of the object. Actions may have preconditions and the corresponding error message (to be displayed if the precondition does not hold). Preconditions are formulas that need to be satisfied in order to execute the corresponding action. In case of non-deterministic transitions, determinism is achieved by means of labelling each transition with a control condition. A control condition is a formula that specifies which state transition will take effect. Finally, a class can store a list of interfaces. Each interface stores the list of services that an actor can execute (agents) and the list of attributes that can be observed.

The model also maintains information on relationships between classes, which can be of two types: aggregation and inheritance. Each aggregation relationship captures the information about cardinalities, whether the aggregation is static or dynamic, whether the aggregation is inclusive or referential, whether the aggregation has an identification dependence, and a grouping clause when the aggregation is multi-valued. Each inheritance relationship stores the name of the parent class, the name of the child class and whether the specialization is temporary or permanent. Finally, if the specialization is permanent it stores a well formed formula on constant attributes as specialization condition. If the specialization is temporary it stores either condition or the list of events that activate/deactivate the child role.

Finally, the project can also capture a list of global transactions in which the relevant characteristics to be stored include the name of the global interaction, the formula, and the list of arguments. A list of global functions can also be captured, in which each function stores a name, a data type of the returned value, a set of arguments (similar to services), and comments about the function.

A project may have a set of views, that constitute the particular vision that a set of selected agent classes has of the system. That is, the set of formal interfaces (attributes and services) allowed per agent class. Each agent class has a list of interfaces.

OBJECT MODEL

The object model is a graphical model that allows the system designer to specify the entities employed in the application in an object-oriented manner, in particular, by defining classes for the entities. Thus, the class definitions include, for example, attributes, services and class relationships (aggregation and inheritance). Additionally, agent relationships are specified to state which services that objects of a class are allowed to activate.

Figure 3:
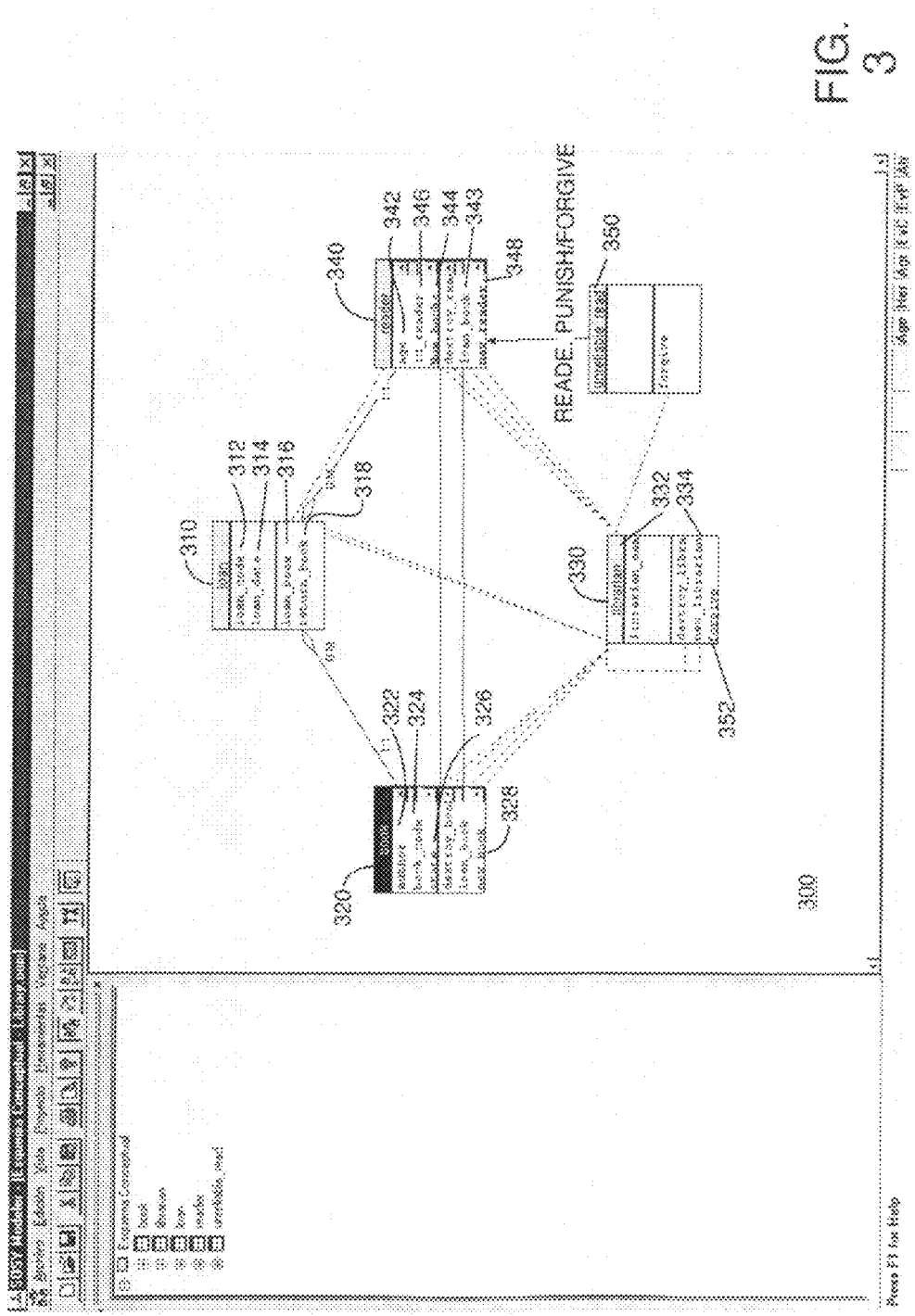
FIG. 3 illustrates an example of an object model for a library system with readers, books, and loans.

FIG. 3 illustrates an example of an object model diagram 300 for the library system example with readers, books, and loans which shows the agent relationships between classes. An agent relationship between classes means one class can invoke the services of another class. FIG. 3 is included here to show that classes have attributes and services and they have relationships to other classes. Classes, in the object model 300, are represented as rectangles with three areas: the class name, the attributes and the services. In the example, the object model 300 includes a loan class 310 with attributes to indicate a loan code 312 and a loan date 314 for when the loan was made. The loan class 310 also includes two services (methods) including one for loaning a book 316 and another for returning the book 318.

The object model 300 also includes a book class 320 having attributes that specify the author 322 of the book, a book code 324, and a state 326 (e.g. reserved, in circulation, checked out, etc.) and services such as new_book 328 for creating a new book. Another class is a librarian class 330, whose name 332 is specified by an attribute and whose creation is done by a new_librarian service 334.

Each reader belonging to the library is described with the reader class 340, whose attributes include the age 342, the number of books 344 checked out by the reader, and the name 346 of the reader. Readers may be created with a new_reader service 348. An unreliable reader class 350 is also part of the object model to indicate for those readers 340 who cannot be trusted (e.g. due to unpaid fees for overdue books). An unreliable reader 350 may be forgiven 352 by a librarian 330.

In an object model 300, inheritance relationships are represented by using arrows to link classes. For example, the unreliable reader class 350 is connected to the reader class 340 with an arrow; thus, the unreliable reader class 350 is specified to inherit from, or in other terms is a subclass of, the reader class 340. The arrow linking the subclass and the base class can be leveled with a specialization condition or an event that activates or cancels the child role. In the exemplary object model 300, the arrow between the unreliable reader class 350 and the reader class 340 is labeled with a "reader. punish/forgive" service. Thus, if a reader 340 is punished, that person becomes an unreliable reader 350. Conversely, if an unreliable reader 350 is forgiven 352, that person becomes a normal reader 340.

Aggregation relationships are represented in the object model 300 by using a line with a diamond.

The class which has a diamond closest to it is called the composite class and the other class is the component class. The aggregation determines how many components can be attached to a given composite and vice versa (cardinality is the minimum and maximum numbers of components and composites that can participate in the relationship). In the example, a book 320 and a reader 340 are aggregated in a loan 310, because a loan 310 involves lending a book 320 to a reader 340 of the library. The representation of aggregation also includes its cardinalities in both directions (i.e. minimum and maximum numbers), role names, and relationship name. In the example, the cardinality of the loan:book relationship from loan to book is 1:1 because exactly one book is the subject of a loan in this Conceptual Model, and from book to loan is 0:1 because a book can be lent or not in a certain moment.

Furthermore, agent relationships are represented by using dotted lines that connect the associated client class and services of the server class.

In the example, a librarian 330 is an agent of a forgive service 352 of the unreliable reader class 350; thus, there is a dotted line between the forgive service 352 and the librarian class 330. As another example, readers 340 are agents of the loan book 316 and return book 318 services.

Finally, shared events are represented by using solid lines that connect the associated events between two classes. In the example, the loan_book event is a shared event due to the solid line connecting said events in the book class 320 and the reader class 340.

Additional information in the object model is specified to complete the formal description of the class. Specifically, for every class in the object model, the following information is captured as shown in TABLE 1.

TABLE 1

| ITEM | DESCRIPTION |
| --- | --- |
| Attributes | All the aforementioned properties and/or characteristics |
| Services | All the aforementioned properties and/or characteristics |
| Derivations | derivation expressions for the derived attributes (those whose value is dependent on other attributes) |

TABLE 1-continued

| ITEM | DESCRIPTION |
| --- | --- |
| Constraints | well-formed formulas stating conditions that objects of a class must satisfy |
| Complex Relationships | specific information associated to aggregation and inheritance hierarchies |
| Agents | services that can be activated by this class |

Additional information associated with aggregation and inheritance is also collected. For aggregated classes, the additional information can specify if the aggregation is an association or a composition in accordance with the UML characterization, or if the aggregation is static or dynamic. For inheritance hierarchies, the additional information can specify if a specialization produced by the inheritance is permanent or temporal. If the specialization is permanent, then the corresponding conditions on the constant attributes must characterize the specialization relationship. On the other hand, if the specialization is temporary, then the condition based on variable attributes or the events that activate/deactivate the child role must be specified.

Some applications may require a large number of classes to fully specify. In this case, classes may be gathered into clusters. Clusters make it easier for the designer or system analyst to understand the application, one cluster at a time. Thus, clusters help reduce the complexity of the view of the object model.

Dynamic Model

The system class architecture is specified with the object model. Additional features, however, such as which object life cycles can be considered valid, and which interobject communication can be established, also have to be input in the system specification. For this purpose, a dynamic model is provided.

The dynamic model specifies the behavior of an object in response to services, triggers and global transactions. In one embodiment, the dynamic model is represented by two diagrams, a state transition diagram and an object interaction diagram.

The state transition diagram (STD) is used to describe correct behavior by establishing valid object life cycles for every class. A valid life refers to an appropriate sequence of states that characterizes the correct behavior of the objects that belong to a specific class. Transitions represent valid changes of state. A transition has an action and, optionally, a control condition or guard. An action is composed of a service plus a subset of its valid agents defined in the Object Model. If all of them are marked, the transition is labeled with an asterisk (*). Control conditions are well formed formulas defined on object attributes and/or service arguments to avoid the possible non-determinism for a given action. Actions might have one precondition that must be satisfied in order to accept its execution. A blank circle represents the state previous to existence of the object. Transitions that have this state as source must be composed of creation actions. Similarly, a bull's eye represents the state after destruction of the object. Transitions having this state as destination must be composed of destruction actions. Intermediate states are represented by circles labeled with an state name. Accordingly, the state transition diagram shows a graphical representation of the various states of an object and transitions between the states. FIG. 4A illustrates an exemplary state transition diagram 400 in accordance with one embodiment of the present invention. States are depicted in the exemplary state transition diagram 400 by means of a circle labeled with the state name. Referring to FIG. 4A, the "book0" state 404 is indicated by a circle with the name "book0." Before an object comes into existence, a blank circle 402 is used to represent this "state" of nonexistence, which is the source of the initial transition 410 labeled by a corresponding creation action. A bull's eye 406 is used to represent the state after which an object has been destroyed, as by a transition 416 occasioned by the [*]: destroy_book action.

Transitions are represented by solid arrows from a source state to a destination state. The middle of the transition arrow is labeled with a text displaying the action, precondition and guards (if any). In the example, transition 412 is labeled with a loan_book action associated with the transition 412 and a precondition 'if state="available". Thus, the system will only accept the execution of the action if the state attribute of the book is "available." In other words, the Conceptual Model requires that a book can only be loaned if the book is available. As another example, transition 414 is labeled with a return_book action associated with the transition 414 and a precondition 'if state="lent". In other words, the Conceptual Model requires that a book can only be returned if the book has been lent.

The object interaction diagram specifies interobject communication. Two basic interactions are defined: triggers, which are object services that are automatically activated when a pre-specified condition is satisfied, and global transactions, which are themselves services involving services of different objects and or other global transactions. There is one state transition diagram for every class, but only one object interaction diagram for the whole Conceptual Model, where the previous interactions will be graphically specified. An example of an Object Interaction Diagram is given in FIG. 4B.

In one embodiment, boxes labeled with an underlined name represent class objects. Trigger specifications follow this syntax: destination::action if trigger-condition. The first component of the trigger is the destination, i.e., the object(s) to which the triggered service is addressed. The trigger destination can be the same object where the condition is satisfied (i.e. self), a specific object, or an entire class population if broadcasting the service. Finally, the triggered service and its corresponding triggering relationship are declared. Global Transactions are graphically specified by connecting the actions involved in the declared interaction. These actions are represented as solid lines linking the objects (boxes) that provide them.

Figure 4B:
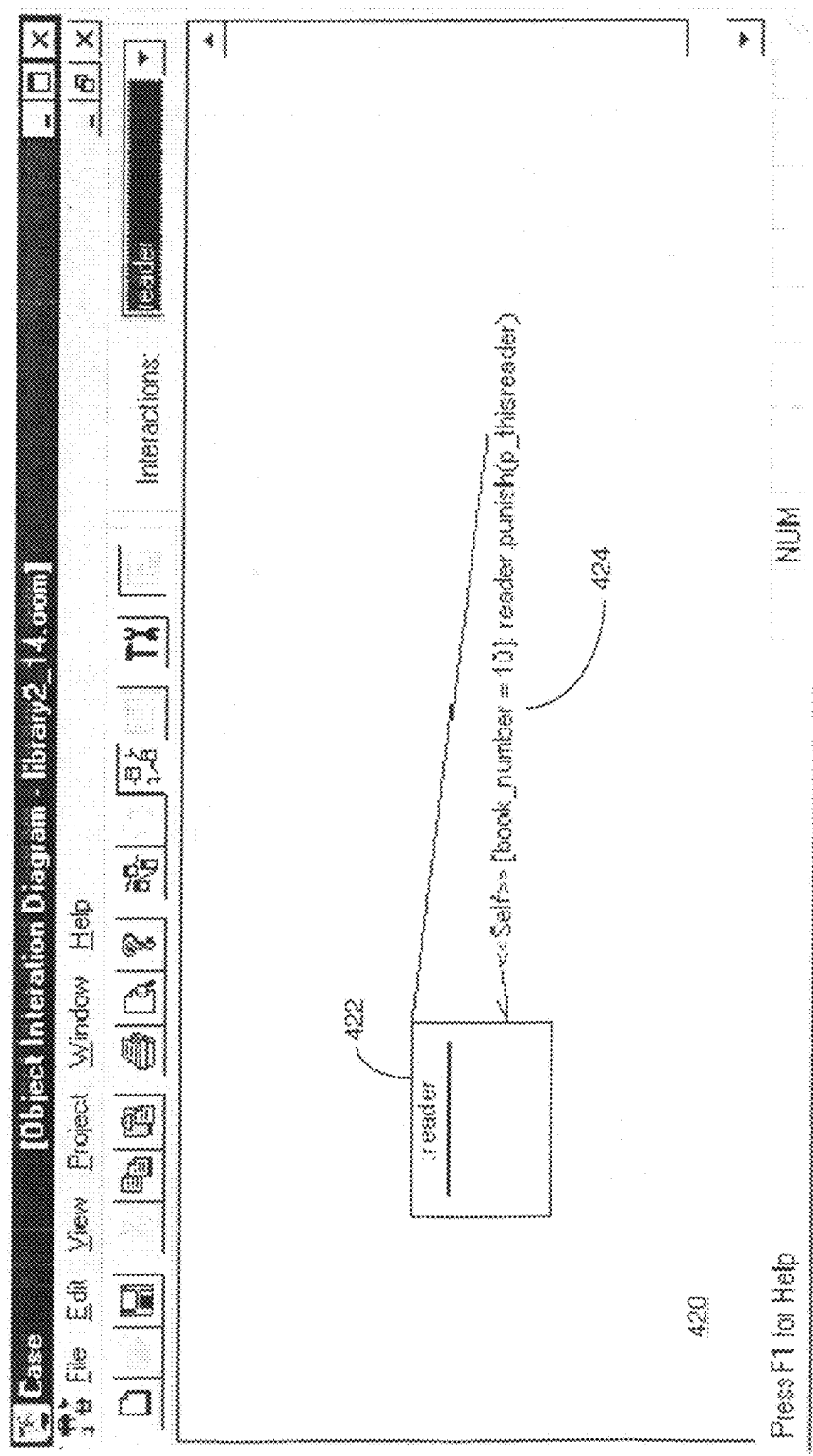
FIG. 4B illustrates an exemplary object interaction diagram in accordance with one embodiment of the present invention.

Accordingly, communication between objects and activity rules are described in the object interaction diagram, which presents graphical boxes, graphical triggers, and graphical interactions. FIG. 4B illustrates an exemplary object interaction diagram 420 for the library example in accordance with one embodiment.

In the object interaction diagram 420, the graphical interactions is represented by lines for the components of a graphical interaction. Graphical boxes, such as reader box 422, are declared, in this case, as special boxes that can reference objects (particular or generic) such as a reader. Graphical triggers are depicted using solid lines that have a text displaying the service to execute and the triggering condition. Components of graphical interactions also use solid lines. Each one has a text displaying a number of the interaction, and the action that will be executed. In the example, trigger 424 indicates that the reader punish action is to be invoked when the number of books that a reader is currently borrowing reaches 10.

Functional Model

Many conventional systems take a shortcut when providing a functional model, which limits the correctness of a functional specification. Sometimes, the model used breaks the homogeneity of the object-oriented models, as happened with the initial versions of OMT, which proposed using the structured DFDs as a functional model. The use of DFD techniques in an object modeling context has been criticized for being imprecise, mainly because it offers a perspective of the system (the functional perspective), which differs from the other models (the object perspective). Other methods leave the free-specification of the system operations in the hands of the designer, which leads to inconsistencies.

One embodiment of the present invention, however, employs a functional model that is quite different with respect to these conventional approaches. In this functional model, the semantics associated with any change of an object state is captured as a consequence of an event occurrence. Basically, the functional model allows a SOSY modeler to specify a class, an attribute of that class and an event of that class and then define a mathematical or logical formula that defines how the attribute's value will be changed when this event happens. An "event" as used in the claims means a single service and not a transaction which is defined as a composed or complex service (which means more than one service executes). In the preferred embodiment, a condition-action pair is specified for each valuation. The condition is a single math or logic formula which specifies a condition which results in a value or logical value which can be mapped to only one of two possible values: true or false. The action is a single math or logical formula which specifies how the value of the attribute is changed if the service is executed and the condition is true. In other embodiments, only a single formula that specifies the change to the attribute if the service is executed is required.

Figure 5:
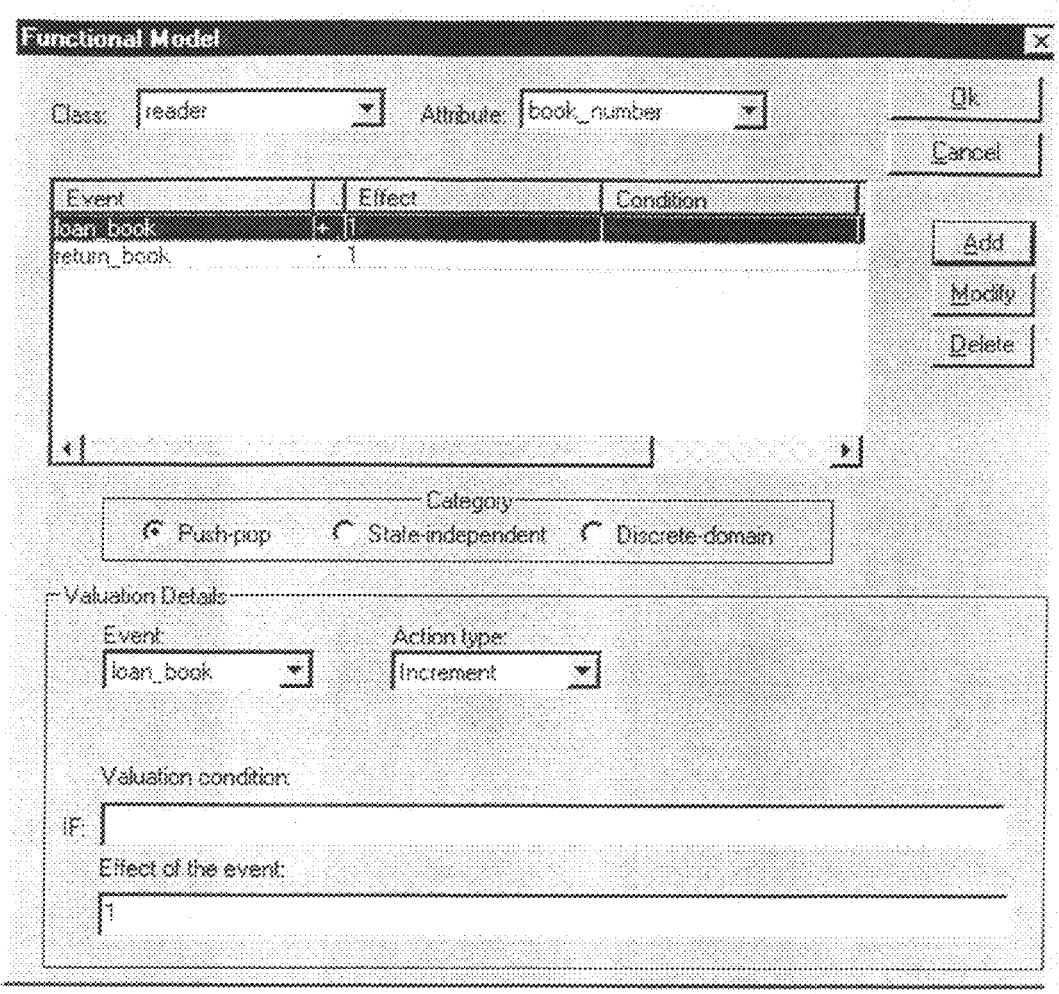
FIG. 5 illustrates an exemplary dialog for receiving input for the functional model.

The functional model is built in the preferred embodiment by presenting a dialog box, an example of which is shown in FIG. 5, that allows the user to choose a class, an attribute of that class and a service of that class and then fill in one or more formula or logical expressions (condition-action or only action) which controls how the value of that attribute will be changed when the service is executed. The important thing about this is that the user be allowed to specify the mathematical or logical operation which will be performed to change the value of the attribute when the service is executed, and it is not critical how the user interface is implemented. Any means to allow a user to specify the class, the attribute of that class and the service of that class and then fill in a mathematical or logical expression which controls what happens to the specified attribute when the service is executed will suffice. Every one of these mathematical expressions is referred to as a valuation. Every valuation has to have a condition and action pair in the preferred embodiment, but in other species, only an action need be specified. The condition can be any well formed formula resulting in a Boolean value which can be mapped to only one of two possible conditions: true or false. The action specified in the pair is any other well-formed mathematical and/or logical formula resulting in a new value for the variable attribute, said new value being of the attribute's same data type (type of data of action must be compatible with the type of data of the attribute). This valuation formula can be only mathematical or only a Boolean logical expression or a combination of both mathematical operators and Boolean logical expressions.

Regardless of the user interface used to gather data from the user to define the valuations in the functional model, all species will generate a data structure having the following content: data defining the valuation formula which affects the value of each variable attribute (the data that defines the valuation formula identifies the service and the attribute affected and the mathematical and/or logical operations to be performed and any operands needed). This data structure can be any format, but it must contain at least the above identified content.

To define the functional model, the following information is declaratively specified by the SOSY modeler: how every event changes the object state depending on the arguments of the involved event, and the object's current state. This is called "valuation".

In particular, the functional model employs the concept of the categorization of valuations. Three types of valuations are defined: push-pop, state-independent and discrete-domain based. Each type fixes the pattern of information required to define its functionality.

Push-pop valuations are those whose relevant events increase or decrease the value of the attribute by a given quantity, or reset the attribute to a certain value.

State-independent valuations give a new value to the attribute involved independently of the previous attribute's value.

Discrete-domain valuations give a value to the attributes from a limited domain based on the attribute's previous value. The different values of this domain model the valid situations that are possible for the attribute.

To illustrate these features, TABLE 2 shows a functional model for a "book number" attribute 344 of the reader class 340, in a Conceptual Model representing a typical library.

TABLE 2

CLASS: Reader
ATTRIBUTE: book_number
CATEGORY: push-pop

| Event | Quantity | Effect |
|---|---|---|
| loan( ) | 1 | Increase |
| Return( ) | 1 | Decrease |

These valuations are categorized as a push-pop because their relevant events increase or decrease the value of the book_number attribute 344 by a given quantity (1). In the example, its related event loan( ) has the increasing effect and return( ) has the decreasing effect.

This categorization of the valuations is a contribution of one aspect of the present invention that allows a complete formal specification to be generated in an automated way, completely capturing a event's functionality Accordingly, the functional model is responsible for capturing the semantics of every change of state for the attributes of a class. It has no graphical diagram. Textual information is collected through an interactive dialog that fills the corresponding part of the Information Structures explained before. FIG. 5 illustrates an exemplary dialog for receiving input for the functional model.

Presentation Model

The presentation model is a set of pre-defined concepts that can be used to describe user interface requisites. These concepts arise from distilling and abstracting repetitive scenarios in developing the user interfaces. These abstractions of the repetitive scenarios are called patterns. A set of patterns is called a pattern language.

In this sense, the presentation model is a collection of patterns designed to reflect user interfaces requirements. A pattern is a clear description of a recurrent problem with a recurrent solution in a given restricted domain and giving an initial context. The documented patterns abstract the essence of the problem and the essence of the solution and therefore can be applied several times to resolve problems that match with the initial context and domain. The pattern language is composed of a plurality of patterns. The preferred embodiment is not limited to any particular list of patterns, but the following is a brief description of some user interface patterns that have been found to be useful: Service Presentation pattern, Instance Presentation pattern, Class Population Presentation pattern, Master-Detail Presentation pattern and Action Selection Presentation pattern.

A Service Presentation pattern captures how a service will obtain data from the final user. This patterns controls the filling out of service arguments and contains actions to launch the service or to exit performing no action. It is based on other lower level patterns that refer to more specific interface tasks like:

An Introduction pattern that handles restrictions to input data that must be provided to the system by the final user (i.e., the user who employs the final application). In particular, edit-masks and range-values are introduced, constraining the values that can validly be input in the interface. In this manner, the user-entry errors are reduced. This pattern can be applied to arguments in services or to attributes in classes to improve data input process through validating input arguments.

A Defined Selection pattern that specifies a set of valid pre-specified values for an argument. When the input data items are static, are a few, and are well known, the designer can declare by enumeration a set containing such valid values. This pattern is similar to those that define an enumerated type and an optional default value. Accordingly, the final user can only select an entry from the pre-specified set of valid values, thereby reducing error prone input. For example, one representation of this pattern could be a Combo-Box. This pattern can be applied to arguments in services or to attributes in classes to improve data input process.

A Population Selection pattern that handles the situation of observing and selecting objects in a multiple objects society. Specifically, this pattern contains a filter, a display set, and an order criterion, which respectively determine how objects are filtered (Filter Expression), what data is displayed (Display Set), and how objects are ordered (Order Criteria). This pattern may be thought of as an SQL Select statement and can be applied to object-valuated arguments in services whenever it is possible to select an object from a given population of living objects.

A Dependency Pattern, that is a set of Event-Condition-Action (ECA) rules allowing the specification of dependency rules between arguments in services. When arguments are dependent on others, these constraints use these kind of rule.

A Status Recovery pattern is an implicit pattern that recovers data from object attributes to initialize service arguments. This can be modeled as an implicit set of dependency patterns. For example, to change the data associated of a Customer object, a form to launch the change service appears. If the user provides the Customer OID (Object Identifier), the interfaces can use this OID to search the object and recover the data associated to the Customer, such as name, telephone, address, etc.

A Supplementary Information pattern handles feedback data that must be provided to final users in order to assure they choose or input the correct OID (object identified) for an existent object. For example, to select a Customer, an OID must be provided. If the name of the Customer is automatically displayed as an answer to an OID input, the user receives a valuable feedback data that assures him in selection or corrects the input data. The supplementary information pattern is applicable to object-valuated arguments.

An Argument Grouping Presentation pattern captures how to group the requested service arguments according to the user wishes.

An Instance Presentation pattern captures how the properties of an object will be presented to the final user. In this context, the user will be able to launch services or to navigate to other related objects. The Instance Presentation pattern is a detailed view of an instance.

A Class Population Presentation pattern captures how the properties of multiple objects of one class will be presented to the final user. In this context, once an object is selected, the final user will be able to launch a service or to navigate to other related objects. The objects can also be filtered.

A Master-Detail Presentation pattern captures how to present a certain object of a class including other related objects that may complete the full detail of the object. To build this pattern the following patterns are used: Instance Presentation, Class Population Presentation and, recursively, Master-Detail presentation. In this manner, multi-detail (multiples details) and multi-level master-detail (multiples levels recursively) can be modeled. For example, one scenario involves an invoice header followed by a set of invoice lines related to the invoice.

An Action Selection pattern captures how the services are going to be offered to final users following the principle of gradual approach. This pattern allows, for example, generating menus of application using a tree structure. The final tree structure will be obtained from the set of services specified in the classes of the Conceptual Model. The user could launch services or queries (observations) defined in the Conceptual Model.

A Filter Expression is a well-formed formula that evaluates to a Boolean type. This formula is interpreted as follows: the objects that satisfy the formula pass the filter; the ones that do not fulfill the condition do not pass the filter. Consequently, the filter acts like a sift that only allows objects that fulfill the formula to pass. These formulas can contain parameters that are resolved at execution time, providing values for the variables or asking them directly to the final user. A filter pattern may be thought of as an abstraction of a SQL where clause, and is applied in a population selection pattern.

A Display Set is an ordered set of attributes that is shown to reflect the status of an object. A Display Set may be thought of as an abstraction of the columns in a SQL clause, and is applied in a Population Selection pattern.

The Order Criterion is an ordered set of tuples that contain: an attribute and an order (ascending/descending). This set of tuples fixes an order criterion over the filtered objects. An order criterion pattern may be thought of as an abstraction of an order by SQL clause, and is applied in a Population Selection pattern.

Formal Specification

The CASE tool 210, after presenting a user interface for capturing system requirements 200, converts the system requirements into a formal specification 215 in a formal language having a syntax and semantics that are known to the validator 220. Although the formal specification 215 must be in a formal language, it need not be in a known formal language, and any formal language including newly invented formal languages will suffice. The only thing that is necessary to practice the invention is that the syntax and semantics of whatever formal language in which Formal Specification 215 is written be known to the validator 220 so that it may validate the Formal Specification for completeness, mathematical and semantic and syntactical correctness and lack of ambiguity. In particular the CASE tool 210 builds upon the previously described models as a starting point and automatically generates a corresponding formal and object-oriented specification 215, which acts as a high-level system repository. In a preferred embodiment, the formal language being employed is OASIS, in its version 2.2, published in October 1995 by the "Servicio de Publicaciones de la Universidad Politecnica de Valencia" (legal deposit number: V-1285-1995).

Conversion of captured system requirements 200 into a formal language specification 215 is performed in the preferred embodiment: each piece of information introduced in the conceptual modeling step has a corresponding formal language counterpart, which is represented as formal language statements having syntax and semantics known to the validator. The graphical modeling environment associated with one embodiment of the invention may be thus viewed as an advanced graphical editor and composition tool to allow a SOSY modeler to graphically generate images and data structures through a graphical user interface which are then converted (on a real time basis) into a formal language specification which may be validated.

As an example of syntax and semantics of formal languages and how the validator 220 can validate such a formal language specification, consider Table 3 below. Table 3 is a formal specification in the OASIS formal language of the reader class of the hypothetical library management application detailed above. TABLE 3 shows a formal specification 215 for the reader class that was automatically obtained from the Conceptual Model:

TABLE 3

CONCEPTUAL SCHEMA library
domains nat,bool,int,date,string
class reader
identification
by_reader_code: (reader_code);
constant_attributes
age : String ;
reader_code : String ;
name : String ;
variable_attributes
book_count : Int ;
private_events
new_reader( ) new;
destroy_reader( ) destroy;
punish( );
shared_events
loan( ) with book;
return( ) with book;
constraints
static book_count < 10;
valuation
[loan( )] book_count= book_count + 1;
[return( )] book_count= book_count – 1;
preconditions
librarian:destroy_reader ( ) if
book_number = 0 ;
triggers
Self :: punish( ) if book_count = 10;
process
reader = librarian:new_reader( ) reader0;
reader0= librarian:destroy_reader( ) +
loan ( ) reader1;
reader1= if book_count=1 return( ) reader0
+ (if book_count > 1 return( )
+ if book_count < 10 loan( )) reader1;
end_class Consider the following statement from the high level repository formal specification of Table 3:

[loan( )] book_count=book_count+1;

The semantics of this formal language statement indicate by the 0 that loan is a service which performs the mathematical computation represented by the equation outside the square brackets. This mathematical formula means that the value of the attribute book_count will be incremented by 1 when this service is executed. The formula could be any other formula where one attribute is set equal to the value of another attribute plus the value of some other attribute or user input value. However, to be semantically correct, an integer or floating point number cannot be added to an alphanumeric string or any other type of attribute which has no meaning when attempting to add it to an integer or floating point number.

As another example of validation of the semantics of the formal language specification, when an integer is added to a floating point number, the result must be a floating point number and not an integer.

Another example of validation of the semantics involves verifying that for every attribute that has been defined as a variable, there is a service which changes the value of that attribute.

Another example of semantic validation is verifying that for every constant attribute, there is no service which attempts to change its value. Another example of semantic validation is if a service "destroy" erases or eliminates an attribute, it makes no sense to modify the attribute after it no longer exists. The validator would flag as an error any formal specification statement which attempted to do so.

One of the functions of the validator is to check the semantics of every statement to make sure that no mathematical formulas attempt to combine entities that are not mathematically combinable, that combining different types of numbers results in the correct type of output number, that nothing gets divided by zero, and that other operations that are mathematically undefined are not required by the formal specification. Stated another way, one function of the validator is to make sure that every formula is well formed, complete and consistent.

The validator has a number of rules stored in it that are dependent upon the semantics and syntax of the formal language in use. These rules are used to accomplish the purpose of the validator 220. That purpose is to semantically and syntactically validate every statement of every class definition in the formal specification as well as verifying that the interclass actions between any of the classes are semantically meaningful and syntactically correct. Any process which checks all the formal language statements in the formal specification against at least the pertinent rules to accomplish the above stated purpose will suffice. This can be accomplished after iterative passes or all on one pass. As long as this purpose is accomplished, the details of how it is accomplished are not critical.

The meaning of the different sections that integrate the formal description of the exemplary reader class specification is as follows. A class in OASIS is made up of a class name "reader", an identification function for instances (objects) of the class, and a type or template that all the instances share.

The identification function by_reader_code, characterizes the naming mechanism used by objects and yields a set of surrogates belonging to a predefined sort or to a sort defined by the user (the so-called domains in OASIS). These domains are imported in the class definition.

The most usual are predefined as int, nat, real, bool, char, string and date. They represent numbers, boolean values, characters, strings and dates in a particular format. New domains can be introduced in a specification by defining the corresponding abstract data type.

A type is the template that collects all the properties (structure and behavior) which are shared by all the potential objects of the class being considered. Syntactically, the type can be formalized as a signature, which contains sorts, functions, attributes and events to be used, a set of axioms, which are formulas in a dynamic logic, a process query as a set of equations with variables of a sort process that are solved in a given process algebra. When these variables are instantiated, we have the ground terms that represent possible lives of instances (objects).

A class signature contains a set of sorts with a partial order relation. Among this set of sorts is the sort of interest (the class name) associated with the class being defined. A class signature also contains a set of functions including those functions included in the definition of the (predefined) sorts and the identification function whose sort is the ADT (Abstract Data Type) for identities implicitly provided with a class specification. The identification function provides values of a given sort to identify objects in order to assure that any object of a given class has a unique identity. For specification purposes, an identification is an introduced mechanism comprising a declaration of one or more key maps used as aliases for identifying objects. The key maps are similar to the candidate key notion of the relational model. From a given key value, these maps return an associated object identity. Key maps will be declared as (tuples of) constant attributes.

A class signature also contains a set of (constant, variable, and derived) attributes, see constant_attributes and variable_attributes sections in TABLE 3. These attributes all have the sort of the class as domain, and the given sort associated to the attribute being considered as codomain.

A set of events is also contained in the class signature (see private events and shared events in TABLE 3), with the sort of the class as the domain, plus any additional sort representing event information, and with the sort of the class (sort of interest) as the codomain. This so-called sort of interest can be seen as a subsort of a general sort process when objects are viewed as processes.

Each event occurrence is labeled by the agent that is allowed to activate it. When dealing with this actor notion, if the agent x initiates event a is written x:a and called an action; x could be the environment or any object of a system class. In one embodiment, an event always is associated with an agent. When defining an event, the designer is therefore forced to state which agent will be able to activate it. Consequently, a set A of actions may be defined and obtained from and attached to the initial set of events.

In this way, the notion of the set of object services can be represented as an interface that allows other objects to access the state. The object services can be events (server view) or actions (client view) depending on whether these services are offered or requested. Actions become services requested by an object, by which the object can consult or modify states of other objects (or its own state).

In OASIS, there are the following kinds of dynamic formulas (set of class axioms):

Evaluations are formulas whose semantics is given by defining a function that, from a ground action [a] returns a function between possible worlds. In other words, being a possible world for an object any valid state, the function determines which transitions between object states are valid after the execution of an action [a]. In the example, there are the following evaluations:

[loan( )] book_count=book_count+1;

[return( )] book_count=book_count−1;

Derivations are formulas that define derived attributes in terms of the given derivation condition. Derivations basically differ from the evaluation formulas in that this derived evaluation is done in a unique state.

Integrity constraints are formulas that must be satisfied in every world. Static and dynamic integrity constraints may be distinguished. Static integrity constraints are those defined for every possible world. They must always hold. On the other hand, dynamic integrity constraints are those that relate different worlds. They require the use of a temporal logic, with the corresponding temporal logic operators.

Preconditions are formulas where the formula is one that must hold in the world previous to the execution of action [a]. Only in the worlds where the precondition holds, is [a] allowed to occur. If the precondition holds, the occurrence of [a] gives no state as successor. We have the following precondition in the reader specification:

book_number=0 [librarian:destroy_reader0] false;

or, in a more convenient way for specification purposes, we can write librarian:destroy_reader( ) if book_number=0

Triggers are formulas of the form $\beta[-[a]]$false, where $[-[a]]$ is the action negation. This formula means that [a] does not occur, and what does occur is not specified. If $\beta$ holds and an action other than [a] occurs, then there is no successor state. This forces [a] to occur or the system remains in a blocked state. For instance, using the appropriate dynamic formula where we include in the triggered service information about the destination (according to the trigger expressiveness presented when the object interaction diagram 420 was introduced), we will declare:

book_count=10 [Self::punish( )] false

This trigger may be written in an equivalent but more conventional way for specification purposes as:

Self::punish( ) if book_count=10;

Thus, triggers are actions activated when the condition stated holds. The main difference between preconditions and triggers comes from the fact that in triggers there is an obligation to activate an action as soon as the given condition is satisfied. In this way triggers allow us to introduce internal activity in the Object Society that is being modeled.

In OASIS, an object is defined as an observable process. The process specification in a class allows us to specify object dynamics and determines the access relationship between the states of instances. Processes are constructed by using events as atomic actions. However, the designer also has the choice of grouping events in execution units, which are called transactions.

The molecular units that are the transactions have two main properties. First, they follow an all-or-nothing policy with respect to the execution of the involved events: when a failure happens during a transaction execution, the resultant state will be the initial one. Second, they exhibit the non-observability of intermediate states.

We will finish this section introducing the process specification of the reader class in TABLE 4:

TABLE 4 reader = librarian:new_reader( ) •_reader_0;
reader_0 = librarian:destroy_reader( ) + loan( )
 •_reader_1;
reader_1 = if book_count=1 return( ) • reader_0
 + (if book_count > 1 return( )
 + if book_count < 10 loan( )) •_reader_1;

The execution of processes are represented by terms in a well-defined algebra of processes. Thus, possible object lives can be declared as terms whose elements are transactions and events. Every process can be rewritten to a term in a basic process algebra BPA_____, with the · (sequence) and +(alternative) process operations. This provides an implementation of concurrency based on arbitrary interleaving.

After having presented the Conceptual Model and the OASIS formal concepts associated with them in accordance with one embodiment of the present invention, the mappings will now be discussed that generate a textual system representation 215 (that is a specification in OASIS) taking as input the graphical information introduced in the Conceptual Model. This formal specification 215 has in fact been obtained using CASE tool 210, and constitutes a solid system documentation to obtain a final software product which is compliant with the initial requirements, as represented in the source Conceptual Model.

According to the class template introduced in the previous section, the set of conceptual patterns and their corresponding OASIS representation.

The system classes are obtained from the object model. For each class, there are a set of constant, variable or derived attributes; a set of services, including private and shared events and local transactions; integrity constraints specified for the class; and derivation expressions corresponding to the derived attributes. For a complex class (those defined by using the provided aggregation and inheritance class operators), the object model also provides the particular characteristics specified for the corresponding complex aggregated or specialized class.

The information given by the object model basically specifies the system class framework, where the class signature is precisely declared. The dynamic model uses two kind of diagrams, the state transition diagram and the object interaction diagram. From the state transition diagram, the following are obtained: event preconditions, which are those formulas labeling the event transitions; the process definition of a class, where the template for valid object lives is fixed. From the object interaction diagram, two other features of an OASIS class specification are completed: trigger relationships and global transactions, which are those involving different objects.

Finally, the functional model yields the dynamic formulas related to evaluations, where the effect of events on attributes is specified. Having thus clearly defined the set of relevant information that can be introduced in a Conceptual Model in accordance with an embodiment of the present invention, the formal specification 215 corresponding to the requirements 200 provides a precise system repository where the system description is completely captured, according to the OASIS object-oriented model. This enables the implementation process (execution model) to be undertaken from a well-defined starting point, where the pieces of information involved are meaningful because they come from a finite catalogue of conceptual modeling patterns, which, furthermore, have a formal counterpart in OASIS.

Model Validation

Automatic software production of a complete, robust application from a Conceptual Model to an implementation language (such as a third generation languages like C, C++, or Java) requires the Conceptual Model to be both correct and complete. In this section, the terms "correct" and "complete" have the following meanings dependent on the specific needs for the automated software production process system as:

A Conceptual Model is "complete" when there is no missing information in the requirements specification. In other words, all the required properties of the Conceptual Model are defined and have a value. This means that every concept introduced during the modeling process will be fully specified in all its properties or the validator will reject it.

A Conceptual Model is "correct" when the information introduced in the Conceptual Model is syntactically and semantically consistent and not ambiguous. In other words, all the properties defined in the Conceptual Model have a value and that value is valid.

There is a partial validation process each time an element is added, modified or deleted to the Conceptual Model and is converted to a portion of the formal specification. During the partial validations that occur as elements are added, modified and deleted, no error messages are generated (because that would drive the modeler crazy), but portions of the Formal Specification are marked as rendered invalid by changes that have been made. When the Conceptual Model is completed, the SOSY modeler requests full validation. At this point, every statement and formula in the Formal Specification is revalidated, and error messages and warnings are generated for any element which is syntactically or semantically incomplete or incorrect or ambiguous.

Referring back to FIG. 2, the validator 220 receives as input the formal specification 215 of the Conceptual Model using an Object-Oriented Formal Specification Language (such as OASIS) as high level data repository. From a formal point of view, a validated OASIS specification 215 is correct and complete because the specification 215 is formally equivalent to a dynamic logic theory, using a well-defined declarative and operational semantics.

Formal specification languages benefit from the ability of formal environments to ensure that formal specifications 215 are valid or can be checked to be valid. Formal languages define a grammar that rules language expressiveness.

Two procedures are used for Conceptual Model validation. For completeness, validation rules are implemented by directly checking the gathered data for the Conceptual Model, e.g., a class must have name, one attribute being its identifier and one service. Completeness of the formal language specification of the Conceptual model, as checked by the validation process, means that: 1) there is no missing information in the formal specification detailing the requirements the code must meet; 2) stated in another way, all the required properties of the Conceptual Model encoded in the formal language specification are defined and they have a value. Correctness of the formal language specification of the Conceptual model, as checked by the validation process, means that: 1) when the statements in the formal language specification of the Conceptual model are both syntactically and semantically consistent and not ambiguous; 2) stated in another way, all the properties introduced in the conceptual model have a valid value. For correctness, an extended formal specification language grammar (syntax plus semantics) is implemented in order to validate the syntax and meaning of all the formulas in the Conceptual Model.

Completeness

More specifically, for completeness, the validator functions to ensure that all the elements in a formal specification language have a set of properties that both exist and have a valid value. Most of the properties are strictly implemented to have a full definition and valid values. However, the CASE tool 210 allows, for easy of use during a model inputting, to leave some properties incomplete or with invalid values. These properties will be checked by the validator 220 to be complete (and correct) prior to any automatic software production process.

The elements which are used to validate a Conceptual Model are described next. For each element it is stated if validation will be strict (e.g. when all his properties have to exist and must have a valid value at creation time) or flexible (e.g. validation will be accomplished at a later time). Some properties are optional, (e.g. that may not exist) but if they are defined, they must be validated. These elements are given in TABLE 5:

TABLE 5

| | |
|---|---|
| Class | |
|     Name. | Strict |
|     ID function | Flexible |
|     Attributes (at least one) | Flexible |
|     Services (at least Create service). | Flexible |
|     Static and Dynamic Integrity Constraints (optional) | |
|         Their formula | Strict |
| Attribute | |
|     Name. | Strict |
|     Type (Constant, Variable, Derived). | Strict |
|     Data-type (Real, integer, etc). | Strict |
|     Default Value. | Strict |
|     Size (if proceeds) | Strict |
|     Request in Creation service. | Strict |
|     Null value allowed. | Strict |
|     Evaluations (variable attributes). | Flexible |
|     Derivation formula (derived attributes). | Flexible |
| Evaluation | |
|     One variable attribute of a class | Strict |
|     One service of the same class | Strict |
|     Condition (optional). | Strict |
|     Formula of evaluation. | Strict |
| Derivation | |
|     Formula. | Strict |
|     Condition (optional). | Strict |
| Service | |
|     Name. | Strict |
|     Arguments. | |
|         argument's name | Strict |
|         data-type | Strict |
|         default value (optional) | Strict |
|         null value | Strict |
|         size (if proceeds) | Strict |
|     For a transaction, its formula. | Flexible |
| Preconditions of an action | |
|     Formula. | Strict |
|     Agents affected by condition | Strict |
| Relationship: Aggregation | |
|     Related classes (component &composite) | Strict |
|     Relationship name. | Strict |
|     Both directions Role names. | Strict |
|     Cardinality. | Strict |
|     Inclusive or referential. | Strict |
|     Dynamic. | Strict |
|     Clause "Group By" (Optional). | Strict |
|     Insertion and deletion events (if proceed) | Strict |
| Relationship: Inheritance | |
|     Related classes (parent & child) | Strict |
|     Temporal (versus permanent) | Strict |
|     Specialization condition or events | Strict |
| Relationship: Agent | |
|     Agent class and service allowed to activate. | Strict |
| State Transition Diagram (STD) | |
|     All states of class (3 at least). | Flexible |
| State in STD | |
|     Name. | Strict |
| Transition in STD | |
|     Estate of origin. | Strict |
|     Estate of destination. | Strict |
|     Service of class. | Strict |
|         Control condition (optional). | Strict |
| Trigger | |
|     Condition. | Strict |
|     Class or instance of destination. | Strict |
|     Target (self, object, class) | Strict |
|     Activated service. | Strict |
|     Service arguments' initialization (Optional) | |
|         Arguments' values | Strict |

TABLE 5-continued

| | |
|---|---|
| Global Interactions | |
|     Name. | Strict |
|     Formula. | Strict |
| User exit functions | |
|     Name. | Strict |
|     Return data-type | Strict |
|     Arguments, (Optional) | |
|         Argument's name | Strict |
|         Argument's data-type | Strict |

Correctness

Some properties of components in formal specification languages are "well formed formulas" that follow a well defined syntax. It is therefore, a requirement to ensure that all introduced formulas in the Conceptual Model were both syntactical and semantically correct.

Not all formulas used in the Conceptual Model have the same purpose. Therefore, there will be several types of formulas. Depending of formula's type, the use of certain operators and terms (operands, like: constants, class attributes, user-functions, etc.) are allowed. A process and a set of rules in grammar to validate every type of formula in the Conceptual Model also exists.

More specifically, the Conceptual Model includes formulas of the following types as shown in TABLE 6:

TABLE 6

Default Value Calculation of
    Class Attributes (Constant and Variable)
    Service and Transaction Arguments
Inheritance: Specialization condition
Static and Dynamic Integrity Constraints
Derivations and Valuations:
    Calculation formula (Derived or Variable attributes respectively)
    Conditions (optional)
Preconditions for actions (Services or Transactions)
Control Conditions for transitions in State Transitions Diagram
Triggering conditions
Local and Global Transactions formulas These formulas are validated at the time they are introduced, by preventing the designer from leaving an interactive textual dialog if formula is not syntactically and semantically correct.

In general, every formula must be syntactically correct; every class must have an identification function; every class must have a creation event; every triggering formula must be semantically correct (e.g. self triggers to an unrelated class are forbidden); and every name of an aggregation must be unique in the conceptual schema. If these conditions are not satisfied, then an error is raised.

A warning may be raised, on the other hand, if any of the following do not hold: every class should have a destroy event; every derived attribute should have at least a derivation formula; every service should have an agent declared to execute it; and every argument declared in a service should be used.

Validation process will also be invoked every time the designer performs a change into the model that may invalidate one or more formulas. As mentioned earlier, for ease of use, certain type of formulas are allowed to be incorrect, which the designer will have to review at a later time. The automatic software production process in accordance with one embodiment of the present invention, however, will not continue to code generation, if not all the formulas are correct. Each time the designer introduces a modification in the Conceptual Model specification, all affected formulas will be checked. As a result, the following cases may happen:

1. If any of the affected formulas makes reference to a "Strict" property, the change will be rejected. An error will be raised to inform the designer.

2. If none of the affected formulas references a "Strict" property, modification to Conceptual Model will be accepted. An action-confirmation dialog is showed before any action is taken.

3. If there is no affected formula, modification is performed straightaway. In order to validate the user interface information, the validator 220 checks the following for errors: the patterns defined must be well constructed with no essential information lacking; the attributes used in filters must be visible from the definition class; the attributes used in order criteria must be visible from the definition class; the formula in a filter must be a well-formed formula using the terms defined in the model; the action selection pattern must use as final actions objects defined in the Conceptual Model; and the set of dependency patterns must be terminal and have confluence. Warnings may be generated under the following conditions: if a pattern is defined but not used (applied), if an instance pattern is duplicated.

Automatic software production from Conceptual Models requires these Conceptual Models to be correct and complete. Applying the characteristics and properties of formal specification languages makes it possible to effectively validate a Conceptual Model. The validation process is based on the grammar defined by the formal specification language, and partial validation is to be invoked any time the designer introduces modifications to the Conceptual Model specification. Prior to any automatic software production process, Conceptual Model will be validated in a full validation as a prerequisite.

Working Example of how to Use the Invention to Create a Conceptual Model for a Software Program to Manage Expense Reporting by Employees, Expense Report Approvals and Payments Requirements: the Problem to be Managed by the Computer Program to be Automatically Generated The system will manage the expense reporting of employees, expense approvals and payments.

Expenses Will Reflect Both: Pattern Currency and its Equivalent to Other Currency. Expense Line for User Input of an Expense Will Only Allow Input in the Pattern Currency.

Employees may present an expense report when they have supported expenses on behalf of the company. Typically, the expenses are associated to a certain project or specific task.

At presenting the expense report, supporting tickets and receipts will be attached and prior expense advances will be reflected. Advances must be discounted out from the expense report balance.

The expense report, once presented, must be authorized by a manager responsible for payment of expenses. The authorization process will allow rejection of the expenses if there is the appearance of impropriety.

Once authorized, the expense report will be approved for payment by a person in accounting responsible for writing checks. Once paid, it will be marked as so.

The Procedure will be as follows:
  Prior to any expense, the employee may request money in advance. This will not be reflected in the Expenses Management System program to be written.
  The employee will provide receipts for all expenses and advances to the system operator (may be himself). It will include explanations for expenses when required.
  Once all the expenses are entered, the employee will issue the expense report thereby closing the expenses report. Then the expense report will be in a status of pending approval.
  A person responsible for expenses will authorise the expense report if the expenses appear legitimate, and the expense report will transition to a state pending payment. If the report is not approved, it will be rejected with a comment indicating why it has been rejected. The expenses report will be then put back in an open status to be modified.
  Accounts payable will approve the payment. Once approved, the expense report will be marked as paid and locked. Only accounts payable will be able to unlock the expense reports in case of error.
  Once the payment has been done, the Expenses Report is marked as paid indicating date and payment media. If balance was debit, i.e., advances were bigger that expenses, a warning message will require confirmation of payment.

Detailed Information to be Captured

Expense:

Header and Footer: General Information of the Expense.
  Employee: Code and Name.
  Trip cause, visit to or general expense cause.
  Project to charge expenses to.
  Total advanced amount. Both currencies
  Total expenses. Both currencies
  Balance. Both currencies
  Date of Expenses Report issuing.
  Expenses approval date.
  Payment date and media.
  Payment comments, if paid.
  Rejection cause, if rejected.

Expense Line:
  Each line details a certain expense.
Including:
  Expense date.
  Expense Type: (Car usage in Km, allowance, etc.) Some expense types will have a fixed price, some will perform a calculation, other will let operator to include the amount from figures on ticket or receipt.
  Units. The meaning will depend on expense type. Some types will not allow operator to use this.
  Prize to apply. Prize per unit in pattern currency. Depends on expense type.
  Expense description.
  Expense Line total. Both currencies Employee:
  Employee code. This must be unique in the system.
  Name and First name
  Site, phone numbers, email.

Querying and Reporting Facilities:
  The results of any search in the application may be considered as a report so it must be possible to be printed as well as exported to Office tools like Word, Excel. It would be desirable to be ordered by any column while it is in the screen and exported or printed in that order.
  The Expense Reports will be selected under any of the following criteria or a combination of them: by project, employee, issuing date, authorization date and payment date. Dates searching facilities will be better introduced as a period.
  The Expense Report will show the following information:
  Project
  Employee name
  Status Approval Date Paid Payment Date Total expenses Balance The Expense Report will be printed under specific format including the Expense lines.

Employees will allow to be searched by a combination of any data contained in Employee definition.

Modelling with SOSY Modeler

Phase 1: Classes identification. The process of class identification is a process of finding relevant entities that will hold the System information. These will be obtained from Requirements definition above defining what the program to be written must be able to do. The following chart has class identifications underscored:

The system will manage the expense reporting of employees, expense approvals and payments.

Expenses will reflect both: pattern currency and its equivalent to other currency. Expense line will only allow input in pattern currency.

Employees may present an expense report when they have supported expenses on behalf of the company. Typically, the expenses are associated to a certain project or specific task.

At presenting the expense report, associated tickets or receipts will be attached and advances will be reflected. Advances must be discounted out from the expense report balance.

The expense report, once presented, must be authorized by a person responsible for the expenses. The authorization process will allow rejection of the expenses if necessary.

Once authorized, the expense report will be approved for payment by a person responsible for accounting, Once paid, it will be marked as paid.

The Procedure will be as follows:

Prior to any expense, the employee may request money in advance. This will not be reflected in the Expenses Management System program.

The employee will provide all expenses and advances tickets to the system operator (may be himself). It will include explanations for expenses when required.

After entering expenses in the system, the employee will issue the expense report closing the expenses report. Then it will be pending approval status.

A responsible of expenses (employee's manager) will authorise the expense report if the expenses appear legitimate, and it will thereafter be in a pending payment status. If no approval is granted, the expense report will be rejected with a comment indicating why it has been rejected. The expenses report will then be set back to an open status to be modified.

Payments responsible (an accounts payable person) will approve the payment. Once approved, the expense report will be marked as paid and locked. Only payments responsible will be able to unlock the expenses reports in case of error.

Once the payment has been done, the Expenses Report is marked as paid indicating date and payment media. If balance was debit, advances were bigger that expenses, a warning message will require confirmation of payment.

Detailed Information to be Captured

Expense:

Header and Footer: General Information of the Expense.

Employee: Code and Name.

Trip cause, visit to or general expense cause.

Project to charge expenses to.

Total advanced amount. Both currencies

Total expenses. Both currencies

Balance. Both currencies

Date of Expenses Report issuing.

Expenses approval date.

Payment date and media.

Payment comments, if proceeds.

Rejection cause, if proceeds.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this.

Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word, Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:

Project

Employee name

Status

Approval Date

Paid

Payment Date

Total expenses

Balance

The Expense Report will be printed under specific format including the Expense lines.

Employees will allow to be searched by a combination of any data contained in Employee definition.

Figure 9A:
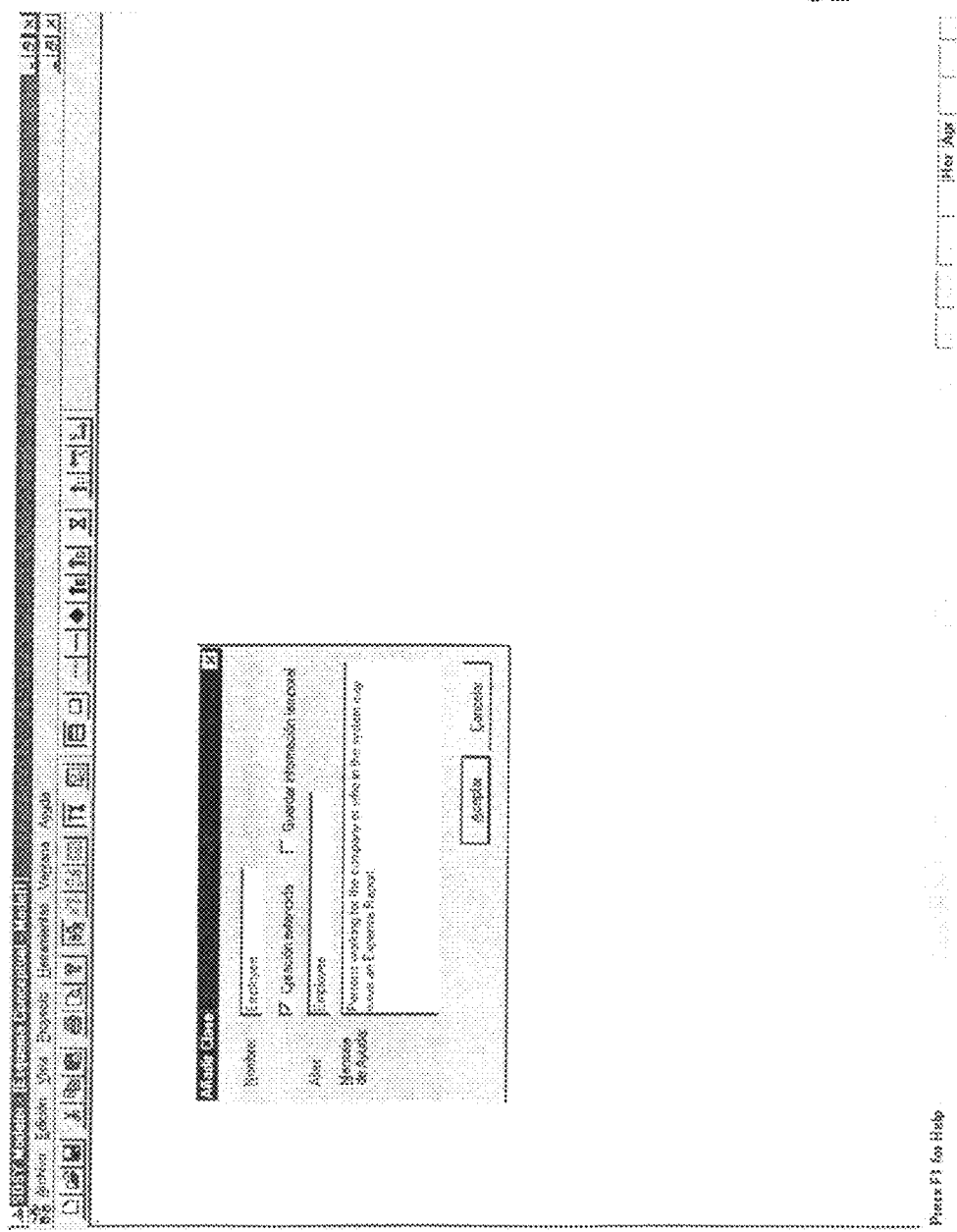
FIG. 9A is a screenshot of the dialog box to create the class which simply involves giving it a name.

FIG. 9A is a screenshot of the dialog box to create the class which simply involves giving it a name.

FIG. 9B is screenshot of a graphic interface box showing the classes that have been defined to store the pertinent information and provide the pertinent services to implement a computer program that meets the above defined requirements. Defining these classes starts the process of building the Formal Specification in the high level repository.

Figure 9C:
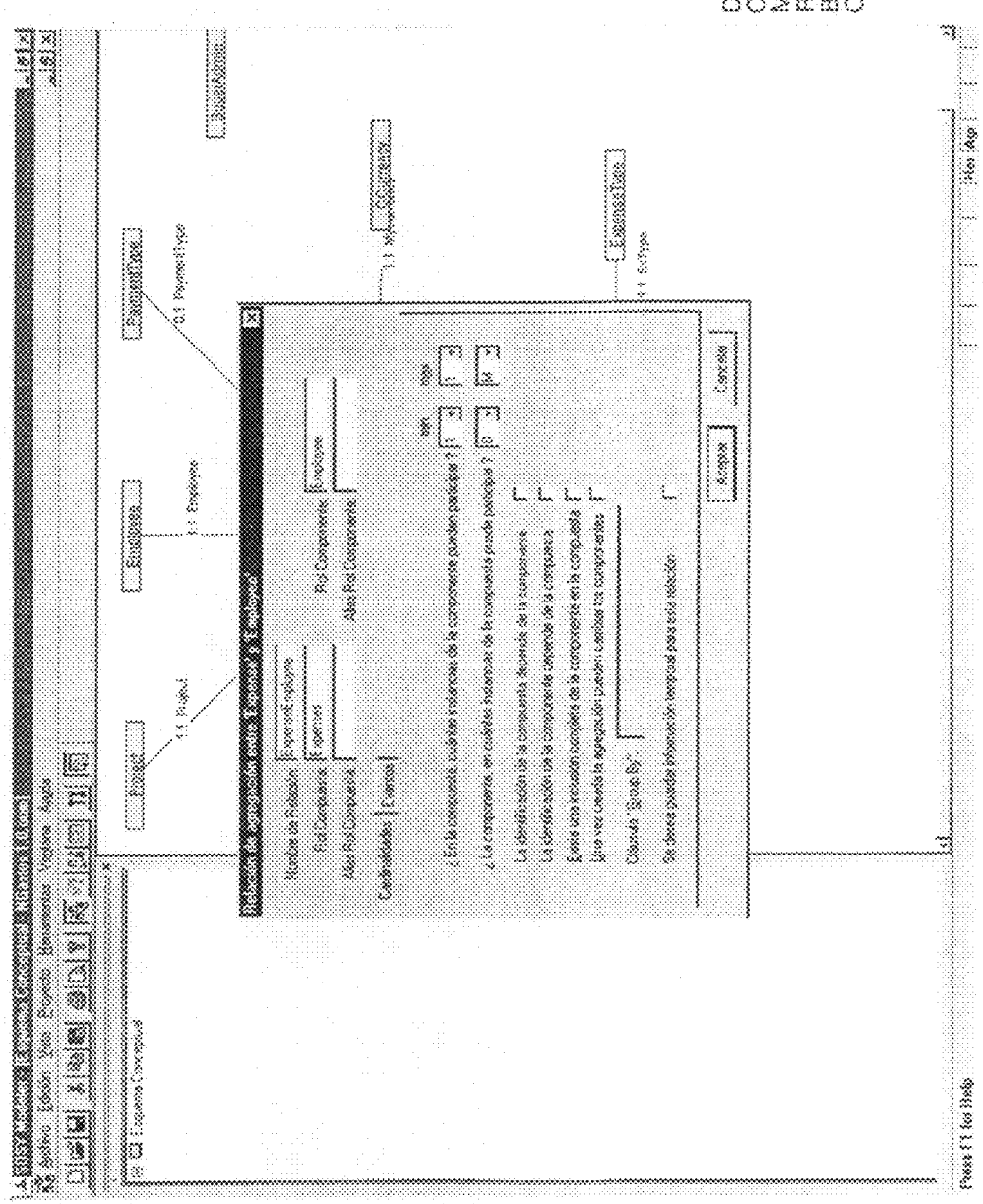
FIG. 9C is a screenshot of the dialog box to modify the properties of an aggregation relationship between any two classes specified in the dialog box.

FIG. 9C is a screenshot of the dialog box to modify the properties of an aggregation relationship between any two classes specified in the dialog box. Both inheritance and aggregation relationships have to have been previously created using a dialog box similar to FIG. 9A.

Phase 2: Relationships between classes. This process involves finding Aggregations and Inheritances including their properties.

Figure 10:
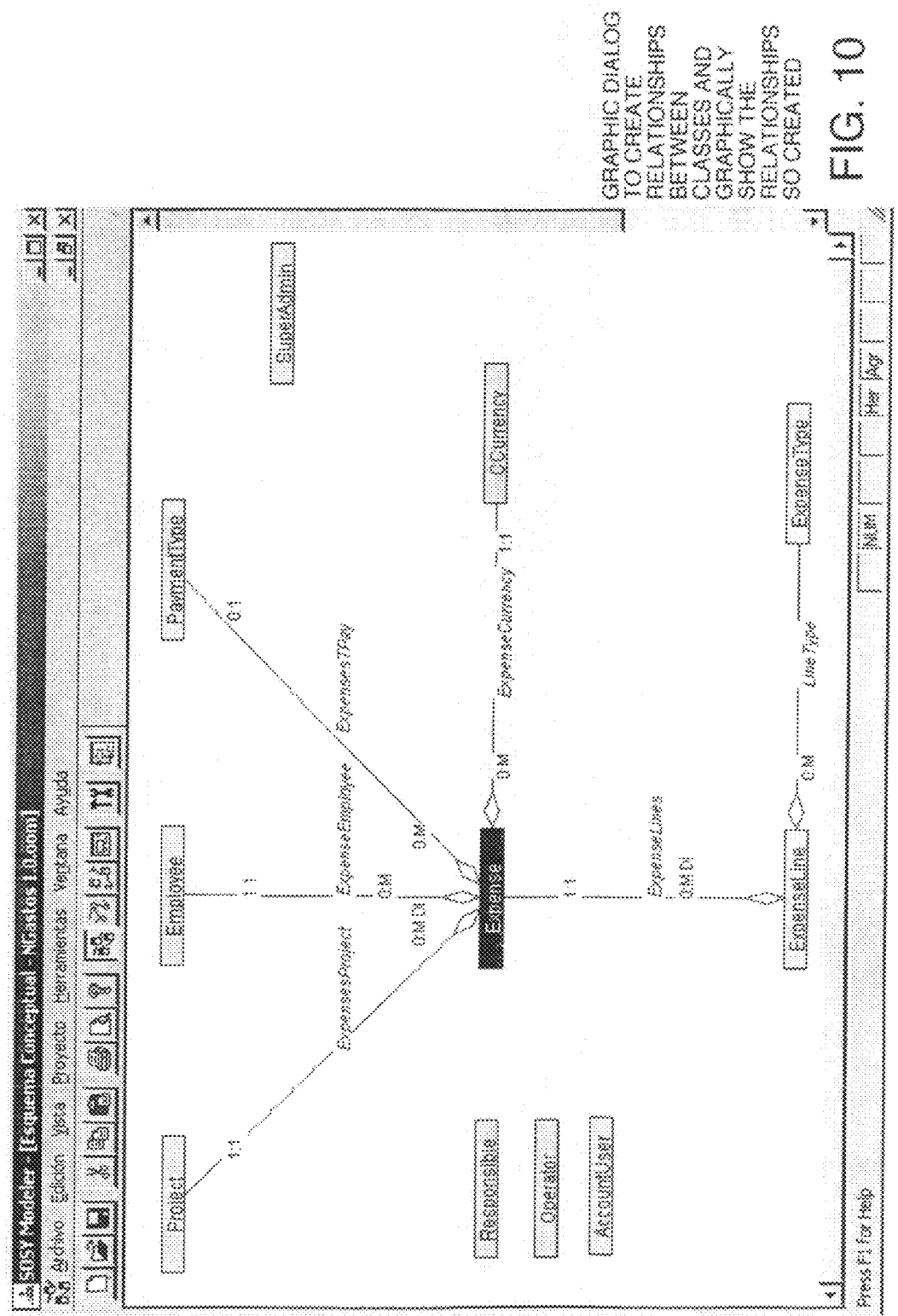
FIG. 10 is a dialog box to create the relationships between specified classes and which graphically shows the relationships so created and all the properties of those relationships.

The following chart will underscore these relationships:
The system will manage the expense reporting of employees, expense approvals and payments.
Expenses will reflect both: pattern currency and its equivalent to other currency. Expense line will only allow input in pattern currency.
Employees may present an expense report when they have supported expenses on behalf of the company. Typically, the expenses are associated to a certain project or specific task.
At presenting the expense report, associated tickets or receipts will be attached and advances will be reflected. Advances must be discounted out from the expense report balance.
The expense report, once presented, must be authorized by a responsible of the expenses (employees manager typically). The authorization process will allow rejection of the expenses if necessary.
Once authorized, the expense report will be approved for payment by a responsible of accounting, Once paid, it will be marked as so.
The Procedure will be as follows:
  Prior to any expense, the employee may request money in advance. This will not be reflected in the Expenses Management System.
  The employee will provide all expenses and advances tickets to the system operator (may be himself). It will include explanations for expenses when required.
  Once introduced the information in the system, the employee will issue it closing the expenses report. Then it will be pending to be approved.
  A responsible of expenses will authorise the expenses if proceeds and it will be pending to be payment approved. If not, it will be rejected with a comment indicating why it has been rejected. The expenses report will be then back open to be modified.
  Payments responsible will approve the payment. Once approved, it will lock to be marked as paid. Only payments responsible will be able to unlock the expenses reports back in case of error.
  Once the payment has been done, the Expenses Report is marked as paid indicating date and payment media. If balance was debit, advances were bigger that expenses, a warning message will require confirmation of payment.
Detailed Information to be Captured
Expense:
Header and Footer: General Information of the Expense.
Employee: Code and Name.
Trip cause, visit to or general expense cause.
Project to charge expenses to
Total advanced amount. Both currencies
Total expenses. Both currencies
Balance. Both currencies
Date of Expenses Report issuing.
Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some expense types will have a fixed price, some will perform a calculation, other will let operator to include the amount as figures in ticket.
Units. The meaning will depend on expense type. Some types will not allow operator to use this.
Prize to apply. Prize per unit in pattern currency. Depends on expense type.
Expense description.
Expense Line total. Both currencies
Employee:
Employee code. This must be unique in the system.
Name and First name
Site, phone numbers, email.
Querying and Reporting Facilities:
The results of any search in the application may be considered as a report so it must be possible to be printed as well as exported to Office tools like Word, Excel. It would be desirable to be ordered by any column while it is in the screen and exported or printed in that order.
The Expense Reports will be selected under the following criteria or a combination of them: by project, employee, issuing date, authorization date and payment date. Dates searching facilities will be better introduced as a period.
The Expense Report will show the following information:
  Project
  Employee name
  Status
  Approval Date
  Paid
  Payment Date
  Total expenses
  Balance
The Expense Report will be printed under specific format including the Expense lines.
Employees will allow to be searched by a combination of any data contained in Employee definition.
No inheritance relationship used in this model.
FIG. 10 is a dialog box to create the relationships between specified classes and which graphically shows the relationships so created and all the properties of those relationships.
Phase 3: Filling in all classes' details. This process involves dentifying attributes, services and integrity constraints for each class. We will focus in Expense class, mark attributes by underscore and mark services in italics.
  The system will manage the expense reporting of employees, expense approvals and payments.
  Expenses will reflect both: pattern currency and its equivalent to other currency. Expense line will only allow input in pattern currency.
  Employees may present an expense report when they have supported expenses on behalf of the company. Typically, the expenses are associated to a certain project or specific task.
  At presenting the expense report, associated tickets will be attached and advances will be reflected. Advances must be discounted out from the expense report balance.
  The expense report, once presented, must be authorized by a responsible of the expenses. The authorization process will allow reject the expenses if necessary.
  Once authorized, the expense report will be approve for payment by a responsible of accounting, Once paid, it will be marked as so.
  The Procedure will be as follows:
    Prior to any expense, the employee may request money in advance. This will not be reflected in the Expenses Management System.
    The employee will provide all expenses and advances tickets to the system operator (may be himself). It will include explanations for expenses when required.
    Once introduced the information in the system, the employee will issue it closing the expenses report. Then it will be pending to be approved.

A responsible of expenses will authorise the expenses if proceeds and it will be pending to be payment approved. If not, it will be rejected with a comment indicating why it has been rejected. The expenses report will be then back open to be modified.

Payments responsible will approve the payment. Once approved, it will lock to be marked as paid. Only payments responsible manager will be able to unlock the expenses reports in case of error.

Once the payment has been done, the Expenses Report is marked as paid indicating data and payment media. If balance was debit, advances were bigger that expenses, a warning message will require confirmation of payment.

Detailed Information to be Captured

Expense:

Header and Footer: General Information of the Expense.

Employee: Code and Name.

Trip cause, visit to or general expense cause.

Project to charge expenses to.

Total advanced amount. Both currencies.

Total expenses. Both currencies.

Balance. Both currencies.

Date of Expenses Report issuing.

Expenses approval date.

Payment date and media.

Payment comments, if proceeds.

Rejection cause, if proceeds.

Expense Line:

Each line details a certain expense.

Including:

Expense date.

Expense Type: (Car usage in Km, allowance, etc.) Some expense types will have a fixed price, some will perform a calculation, other will let operator to include the amount as figures in ticket.

Units. The meaning will depend on expense type. Some types will not allow operator to use this. Prize to apply. Prize per unit in pattern currency. Depends on expense type.

Expense description.

Expense Line total. Both currencies

Employee:

Employee code. This must be unique in the system.

Name and First name

Site, phone numbers, email.

Querying and Reporting Facilities:

The results of any search in the application may be considered as a report so it must be possible to be printed as well as exported to Office tools like Word, Excel. It would be desirable to be ordered by any column while it is in the screen and exported or printed in that order.

The Expense Reports will be selected under the following criteria or a combination of them: by project, employee, issuing date, authorization date and payment date. Dates searching facilities will be better introduced as a period.

The Expense Report will show the following information:

Project

Employee name

Status

Approval Date

Paid

Payment Date

Total expenses

Balance

The Expense Report will be printed under specific format including the Expense lines.

Employees will allow to be searched by a combination of any data contained in Employee definition.

Figure 11A:
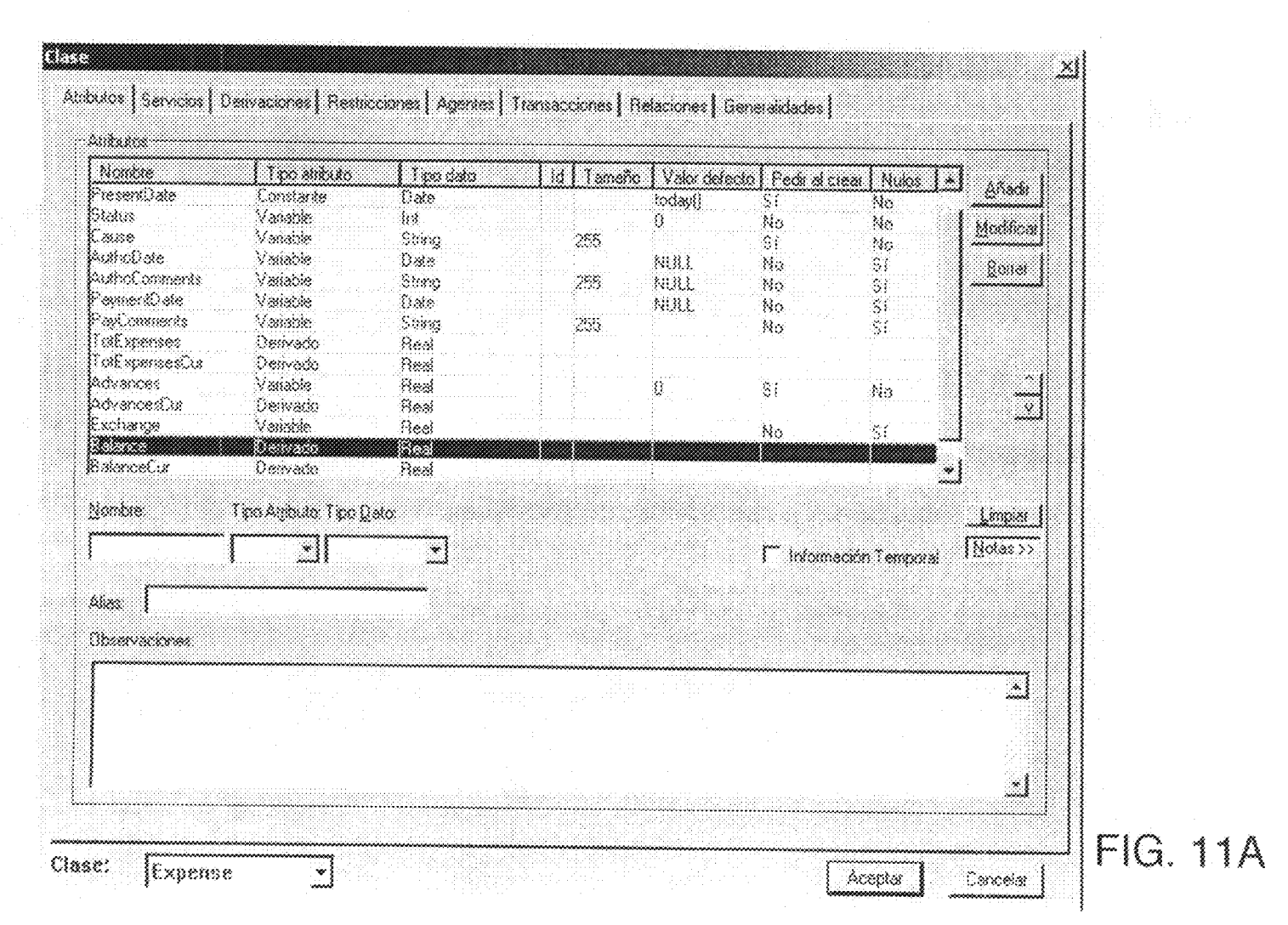
Figure 11B:
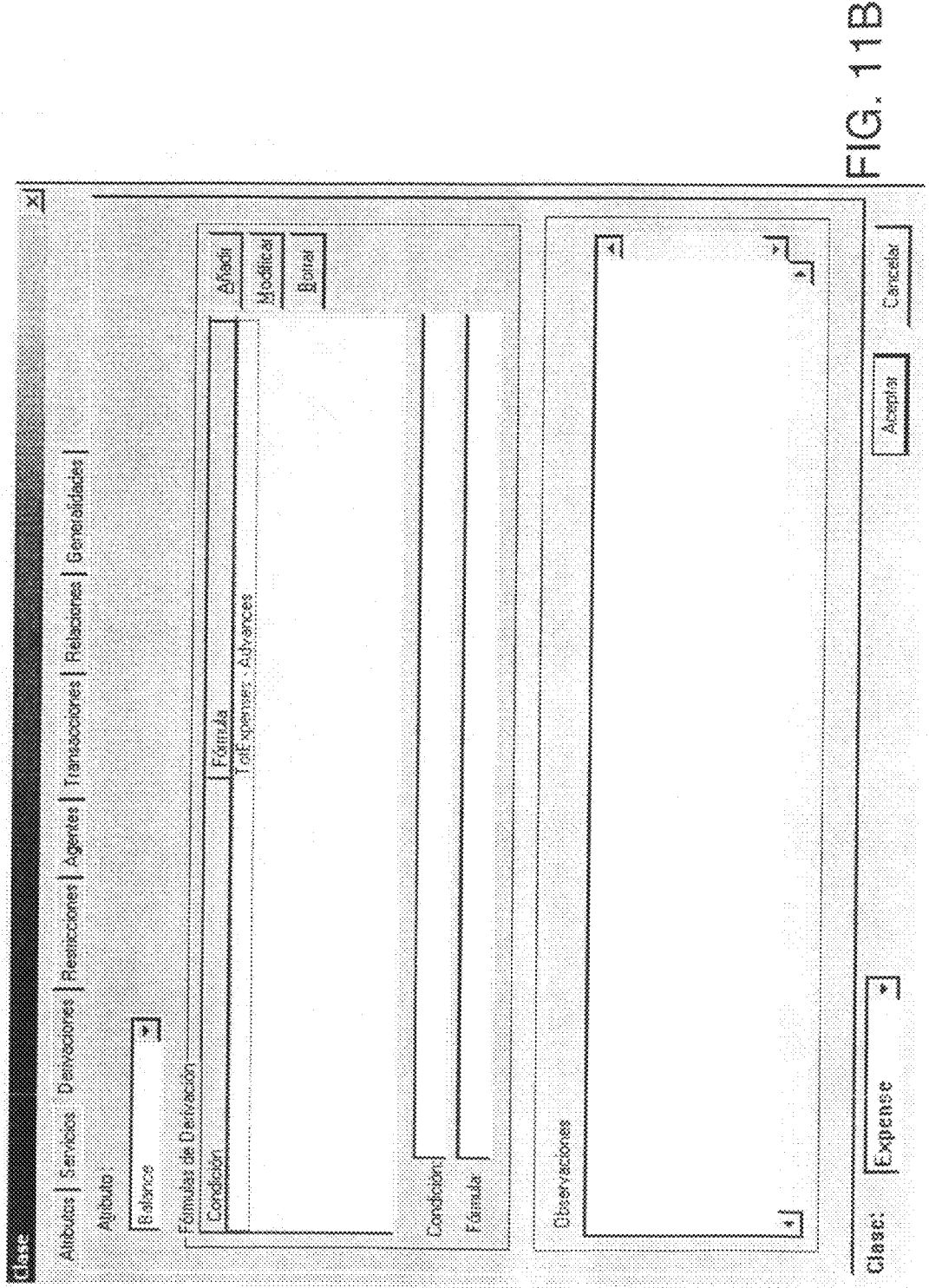
FIG. 11(B) is the dialog box used to fill in the formulas used for derivation of the values of attributes of classes from the values of other attributes.

FIG. 11 is comprised of FIG. 11(A) and FIG. 11B. FIG. 11(A) shows the dialog box used to define the attributes for the Expense class with their properties. This dialog box is used to define whether each attribute is constant, variable or derived, the type of data it contains and other things. FIG. 11B is the dialog box used to fill in the formulas used for derivation of the values of attributes of classes from the values of other attributes. The difference between the derivation formulas and the formulas defined in the functional model dialog box is that the formulas defined using the functional model dialog box change the values of attributes when services are performed while derivation formulas change the value of attributes only when the values of the other attributes used in the derivation formula change. That is, the formulas defined using the functional model relate services to the values of attributes they operate upon. Formulas defined by the derivation dialog box relate the value of one or more attributes to the values of other attributes.

Note that some services force the existence of an attribute. Note also that items above that seem to the reader to be attributes probably are attributes but not for the expense class and therefore were not marked.

The value of some attributes depends on the value of other attributes of the class Expense. These attributes are called Derived. For example the attribute Balance is derived from the attributes Total Expenses and Total Advances and has the formula: Balance=Total expenses−Total Advances, as illustrated in FIG. 11(B) which is a dialog box in which the formula to derive this attribute is defined by the modeler.

We will model the status of a expense report according to the marked situations with one attribute called "Status" which has arbitrarily decided possible values of: 0=Open (modifying the expense report), 1=Closed (pending to be authorized), 2=Authorized (pending to be approved), 3=Rejected (not authorized), 4=Payment pending (payment approved but not paid), 5=Payment Rejected (not allowed to be paid) and 6=Paid (the expense has been paid)

FIG. 1 shows a dialog box which a SOSY modeler uses to define the services of the Expense class with their arguments.

Single services detected, known as events:

newexpense: Allows to create a new Expense Report. It's a special service marked as "New" event.

delexpense: Allows to delete an existing Expense Report. It's a special service marked as "Destroy" event.

modify: Allows to change some data of an existing Expense Report. It will change the value of the attributes Cause, Advances and Exchange.

eclose: Mark an existing Expense Report as ready to authorize.

authorize: Mark an existing Expense Report as authorized and ready to be approved.

approve: Mark an existing Expense Report as approved for payment.

pay: Mark an existing Expense Report as paid indicating the date and optional comments.

rejectautho: Reject the authorization for an existing Expense Report marking it as "Rejected" with optional comments.

rejectpayment: Reject the payment for an existing Expense Report with optional comments cancelapprove: Unlocks the expenses report Complex services detected, marked as local transactions:

TNEW: Create an new Expense Report. It will use the "newexpense" event, that will be marked as internal (the interface will not offer the service marked as "internal"). This service has not be expressed in Requirements but it's necessary according to the aggregation relationship with the "PaymentType" class. The properties of this relationship allows to "New" event to set the relationship with "PaymentType", it has no sense until it has been paid. Encapsulating the "New" event we can set the value of this relationship to Null.

DELETEALL: Delete an existing Expense Report and all its lines. It will use the "deleteexpense" event, that will be marked as internal (the interface will not offer the service marked as "internal"). This service has not been expressed in Requirements but it's necessary according to the aggregation relationship with the "ExpenseLine" class. The properties of this relationship express that an existing Expense Report can not be delete while having lines.

TRAY: According to the requirement "Once the payment has been done, the Expenses Report is marked as paid indicating date and payment media" we need to encapsulated several services.

Figure 13:
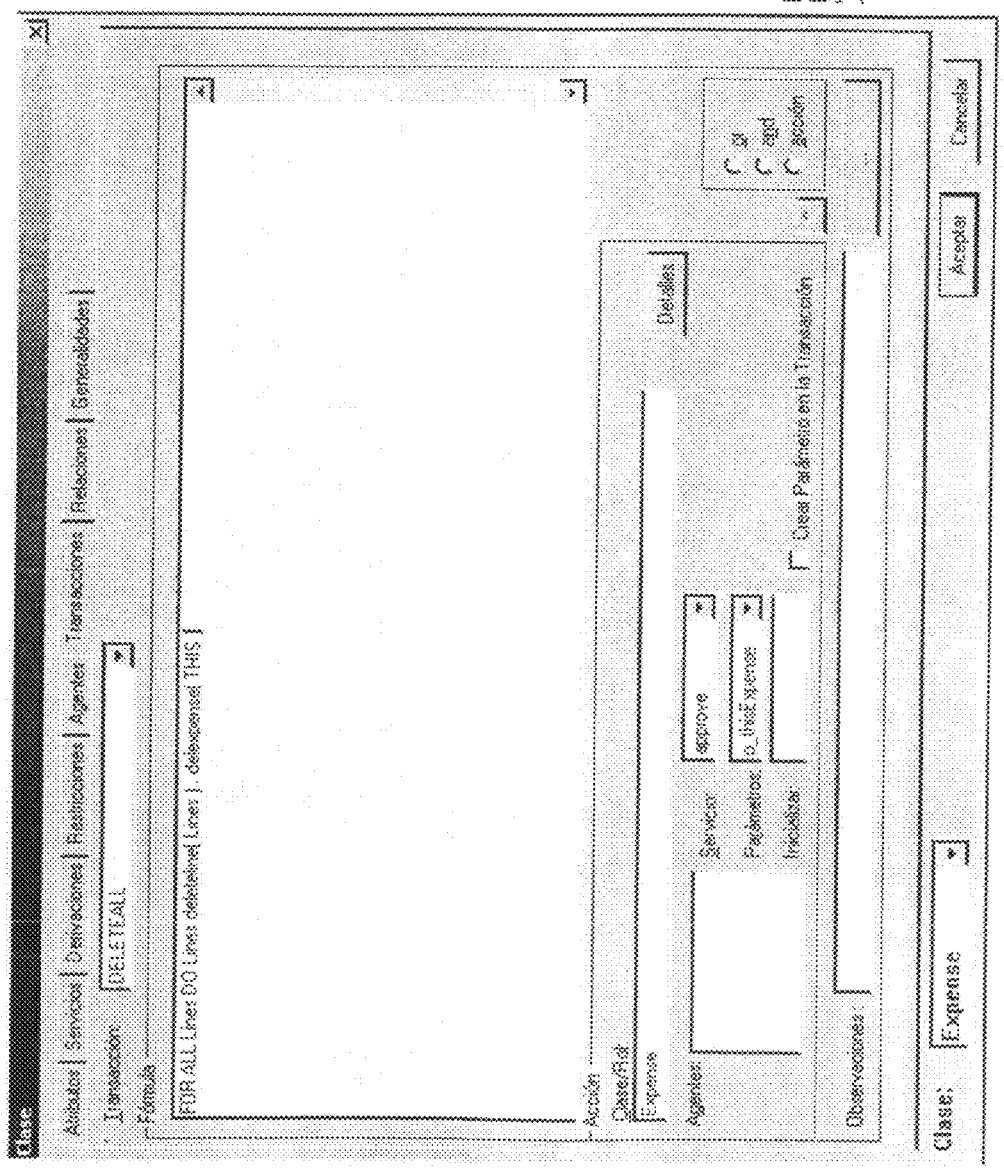
FIG. 13 is a screenshot of the dialog box used to create one formula in a local transaction carried out by a composed service (single services are called events, and composed services are called local transactions).

FIG. 13 is a screenshot of the dialog box used to create one formula in a local transaction carried out by a composed service (single services are called events, and composed services are called local transactions).

Figure 14:
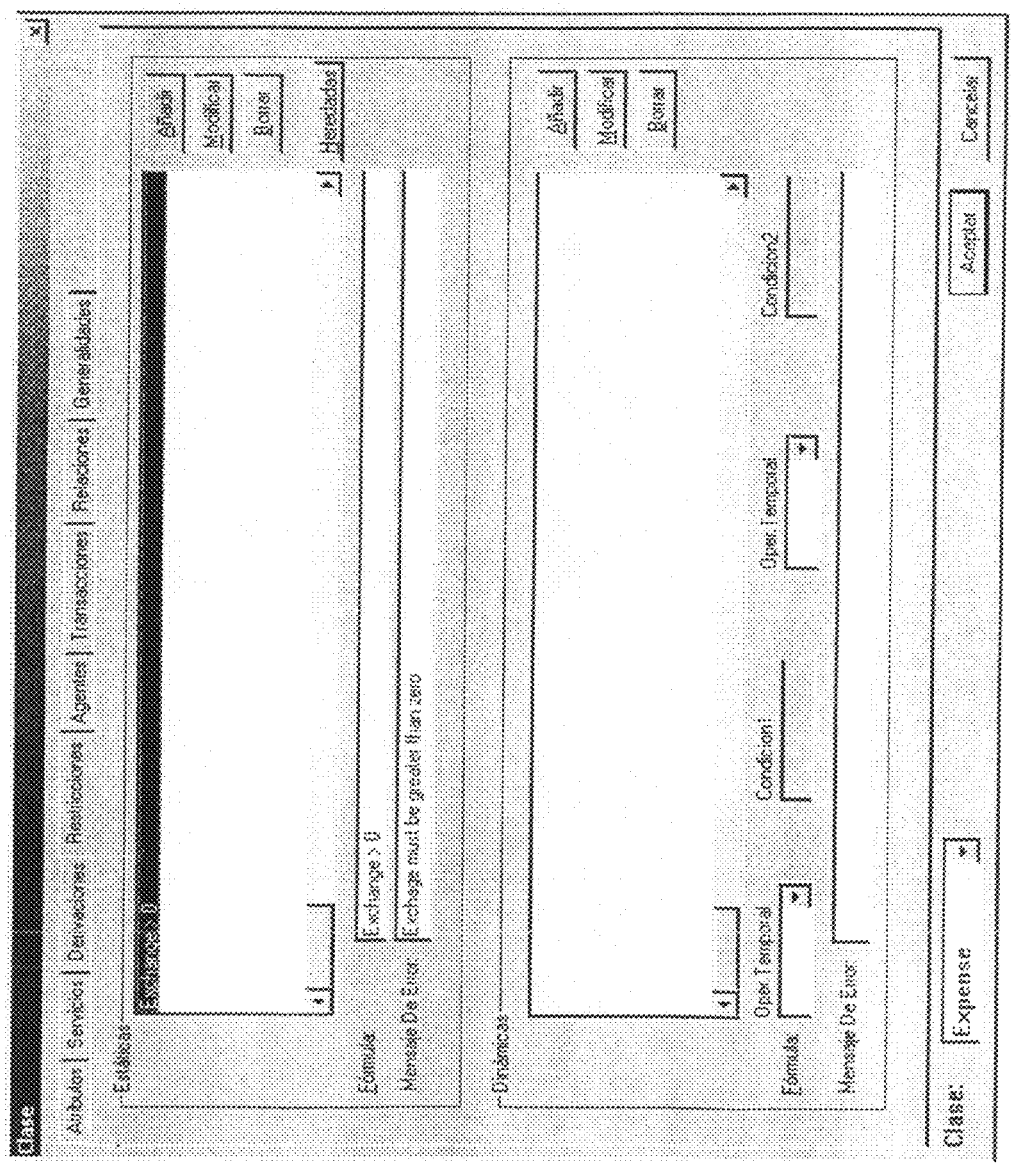
FIG. 14 a dialog box used by the modeler to enter the integrity constraint formula and error message text of "Expense" class.

FIG. 14 a dialog box used by the modeler to enter the integrity constraint formula and error message text of "Expense" class.

It's obvious, the value of the attribute "Exchange" always must be greater than zero. FIG. 14 is a screenshot of the dialog box the SOSY modeler uses to define the formula that encodes the integrity constraint and the corresponding error message.

Phase 4: Express evaluations. During this phase, one or more dialog boxes are presented to the SOSY modeler wherein he or she expresses evaluations of what will be the effect of all event for each variable attributes of each class.

This is the process of building the functional model portion of the Conceptual Model. The value change of an attribute when an event happens is known as "evaluation".

Figure 15:
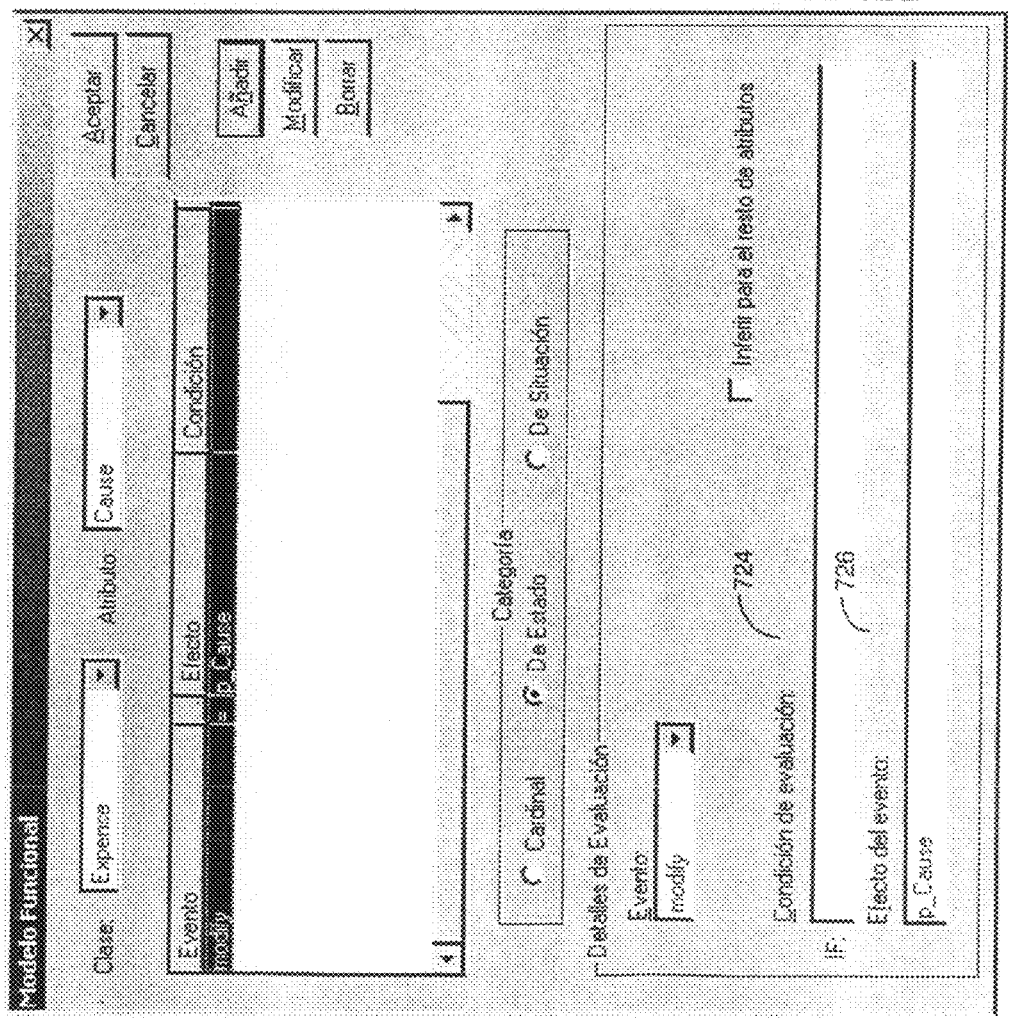
FIG. 15 is a dialog box to enter the functional model formulas that define evaluation of the attribute "cause" with the "modify" event (an event is a single service). The functional model relates services mathematically through well-formed formulas to the values of attributes these services act upon.

FIG. 15 is a dialog box to enter the functional model formulas that define evaluation of the attribute "cause" with the "modify" event (an event is a single service). The functional model relates services mathematically through well-formed formulas to the values of attributes these services act upon. Note that at box 724, the SOSY modeler has not filled in an evaluation formula that could be encoded in the final code to do a calculation to change the value of "cause" when the modify event occurs. Instead, as seen from box 726, the value of "cause" will be changed to whatever the value of the argument "p_cause" of the event "modify" when "modify" is executed.

Figure 16:
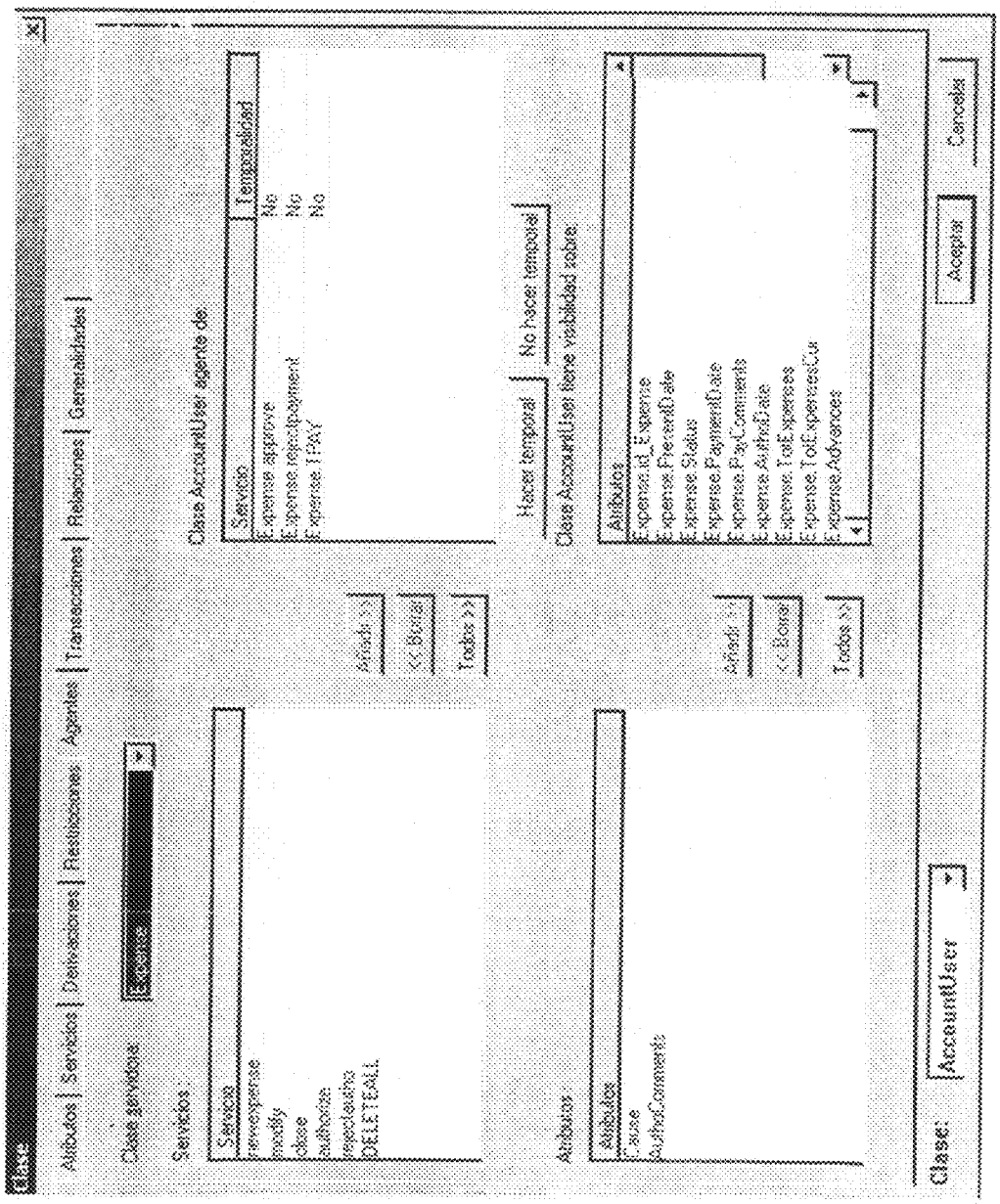
FIG. 16 is a dialog box which can be used by the SOSY modeler to establish the services the user "accountuser" can access and the visibility of class attributes for this user on the user interface.

Phase 5: Agent relationships. A big benefit of our Modeler is that the users of the system are part of it. Users are active objects (request services of other classes) and the different "profiles", i.e., users, are represented as agent classes. We must express which services of any class can be executed by every "profile". Also, we must express the visibility of class attributes for every "profile" so that the object system view can be presented properly by the user interface when the user logs in FIG. 16 is a dialog box which can be used by the SOSY modeler to establish the services the user "accountuser" can access and the visibility of class attributes for this user on the user interface.

Phase 6: State transition diagram. It's required for proper construction of the Conceptual Model to express the correct life cycle for every class of the model, indicating the correct order of execution for all the class services. Also, we can express conditions that must be satisfied in order to allow the execution of a service, which are called "preconditions".

Figure 17:
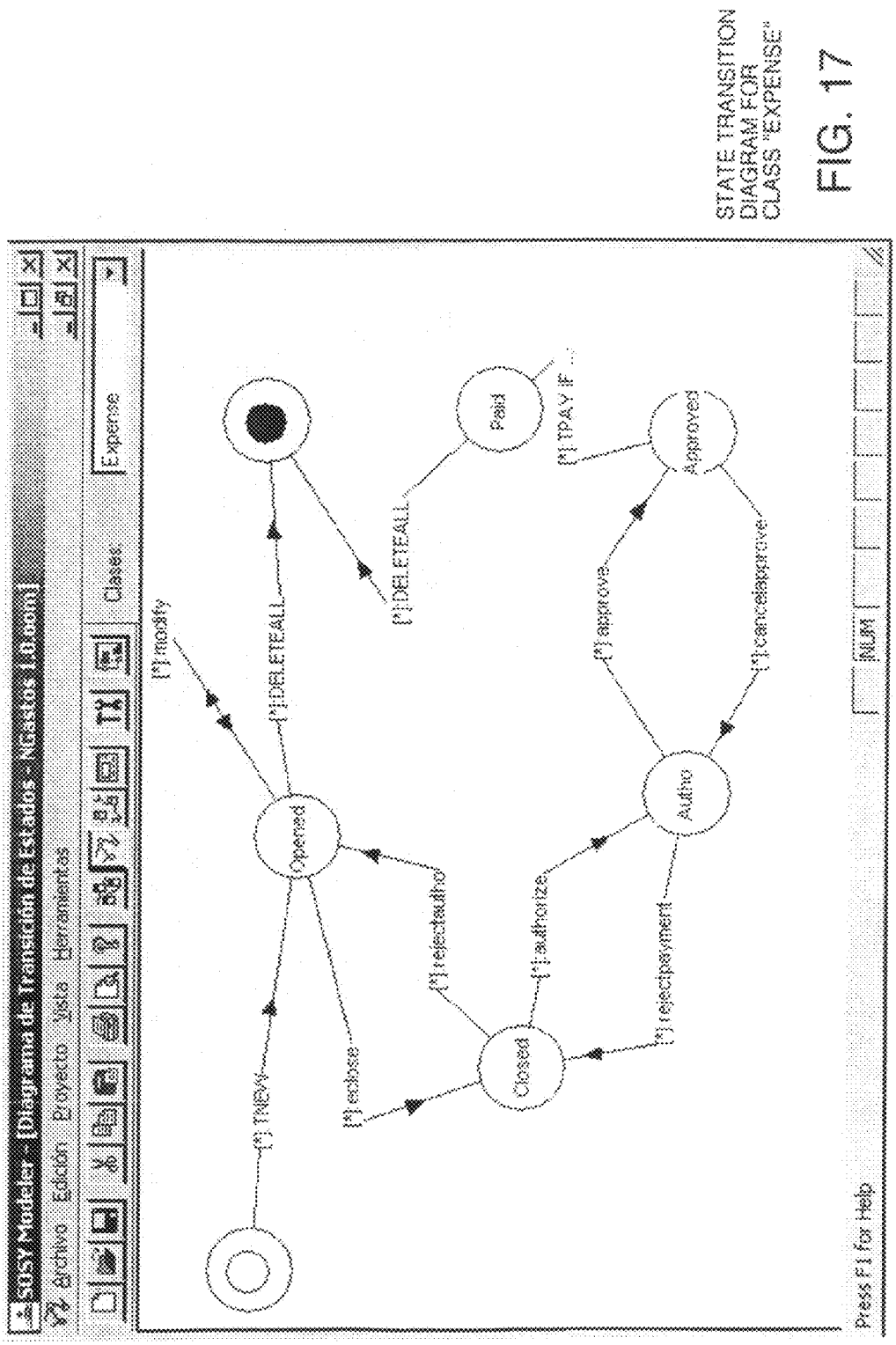
FIG. 17 is one of the two graphical user interface diagrams of the dynamic model on which the SOSY modeler has drawn a graphic illustrating the state transitions for the "expense" class.

FIG. 17 is one of the two graphical user interface diagrams of the dynamic model on which the SOSY modeler has drawn a graphic illustrating the state transitions for the "expense" class. Each state in the state transition diagram represents a valid state for the object and represents one of the "valid lives" and really is one of the unseen attributes of the expense class. An object can only enter one of the displayed states if the corresponding service has been thrown to transition to it from a previous state.

Figure 18:
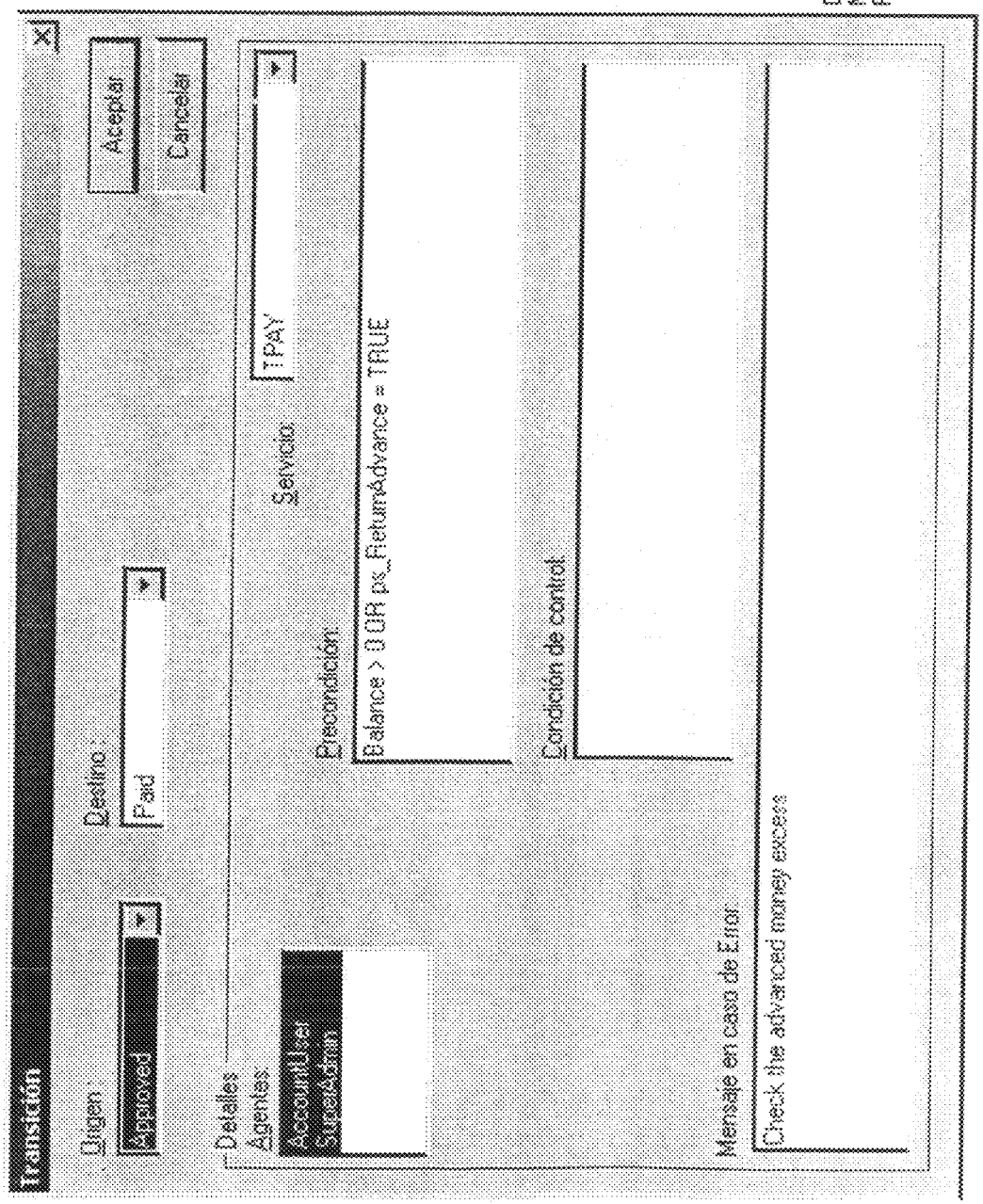
FIG. 18 is a dialog box used by the SOSY modeler to establish this precondition.

According to last paragraph of the Procedure in the requirements, if the Advances are greater than total expenses, the system must force the confirmation of the account user. It is expressed as a precondition in the "TPAY" transaction. FIG. 18 is a dialog box used by the SOSY modeler to establish this precondition.

Phase 7: Presentation Model. Finally, we can complete the Conceptual Model with the user interface requirements. We focus on Expense class. The following chart will mark by underscore the set of attributes to be displayed and will mark the searching criteria by setting them off in italics The system will manage the expense reporting of employees, expense approvals and payments.

Expenses will reflect both: pattern currency and its equivalent to other currency. Expense line will only allow input in pattern currency.

Employees may present a expense report when they have supported expenses on behalf of the company. Typically, the expenses are associated to a certain project or specific task.

At presenting the expense report, associated tickets will be attached and advances will be reflected. Advances must be discounted out from the expense report balance.

The expense report, once presented, must be authorized by a responsible of the expenses. The authorization process will allow reject the expenses if proceed.

Once authorized, the expense report will be approved for payment by a responsible of accounting, Once paid, it will be marked as so.

The Procedure will be as follows:

Prior to any expense, the employee may request money in advance. This will not be reflected in the Expenses Management System.

The employee will provide all expenses and advances tickets to the system operator (may be himself). It will include explanations for expenses when required.

Once introduced the information in the system, the employee will issue it closing the expenses report. Then it will be pending to be approved.

A responsible of expenses will authorise the expenses if proceeds and it will be pending to be payment approved. If not, it will be rejected with a comment indicating why it has been rejected. The expenses report will be then back open to be modified.

A payments responsible will approve the payment. Once approved, it will locked to be marked as paid. Only a payments responsible will be able to unlock the expenses reports back in case of error.

Once the payment has been done, the Expenses Report is marked as paid indicating date and payment media. If balance was debit, advances were bigger that expenses, a warning message will require confirmation of payment.

Detailed Information to be Captured

Expense:

Header and Footer: General Information of the Expense.

Employee: Code and Name.

Trip cause, visit to or general expense cause.

Project to charge expenses to.

Total advanced amount. Both currencies

Figure 6:
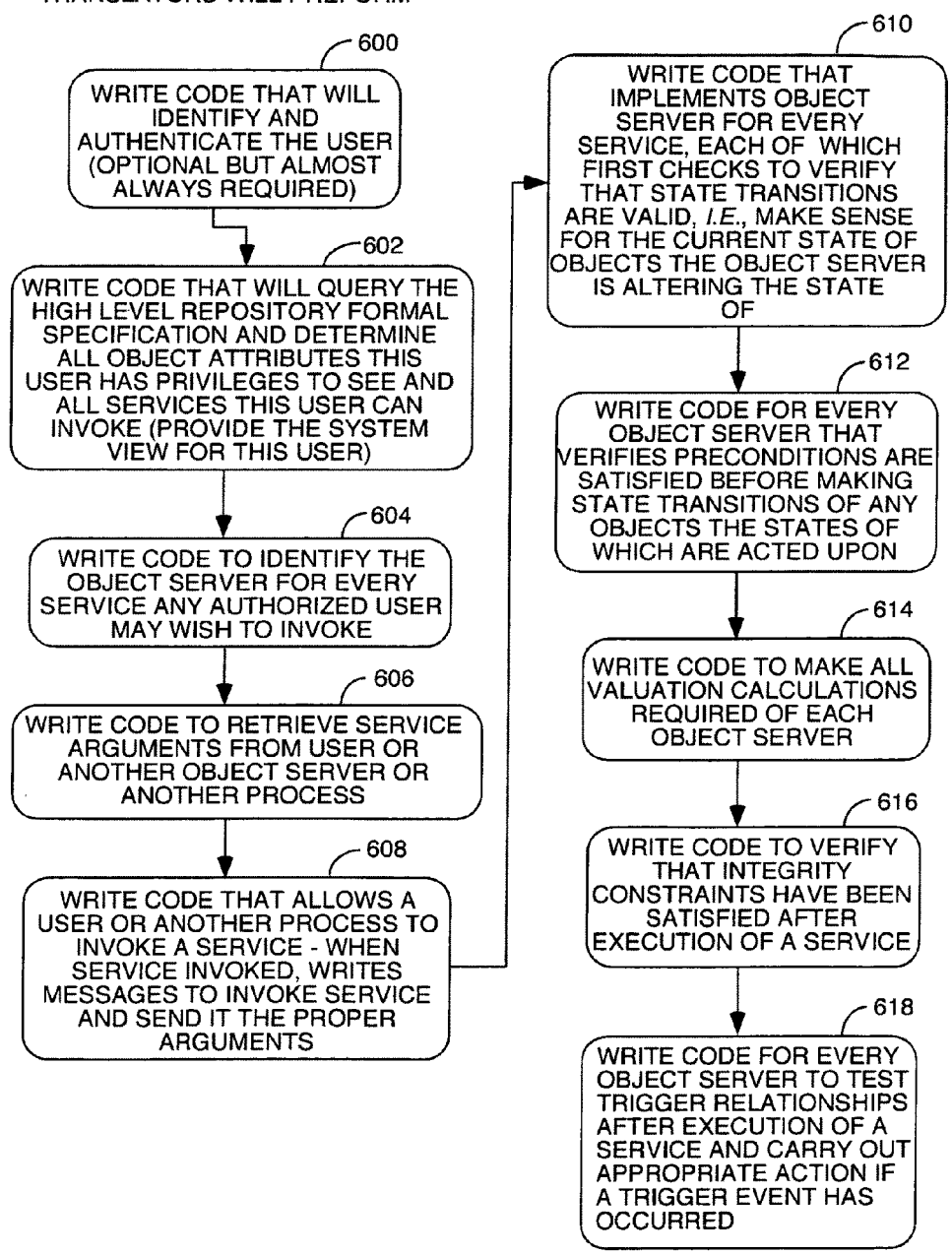
FIG. 6 is a flow diagram illustrating the high level view of the operation of translating a formal specification into a full application by following what it is referred to as "execution model".
Figure 19:
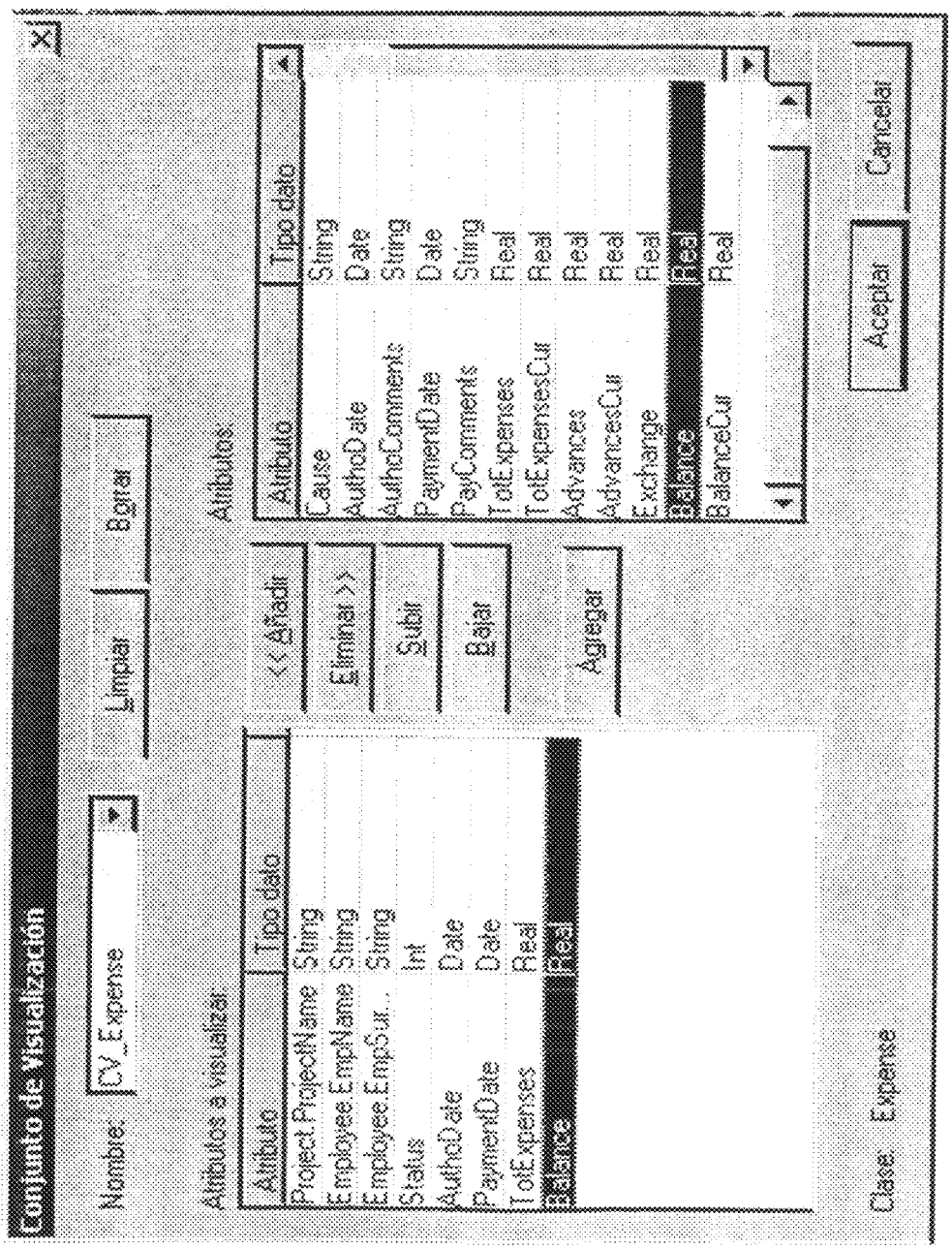
FIG. 19 is a dialog box used by the SOSY modeler to establish the set of attributes which will be displayed for the "expense" class.
Figure 20:
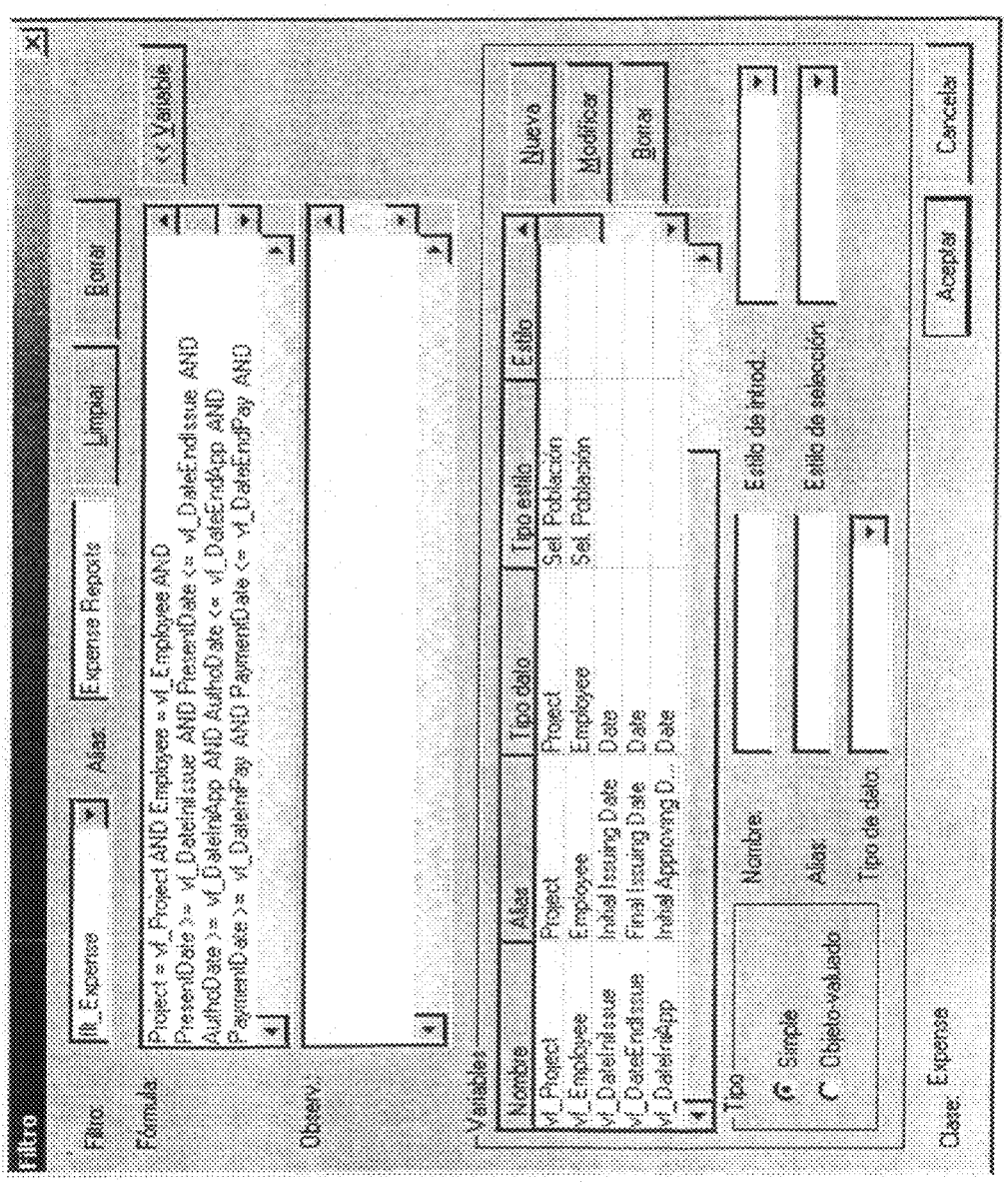
FIG. 20 shows the dialog box used by the SOSY modeler to establish the searching criteria for the expense class, and indicate the filter formula to use and which variables to request from the user.

Total expenses. Both currencies
Balance. Both currencies
Date of Expenses Report issuing.
Expenses approval date.
Payment date and media.
Payment comments, if proceeds.
Rejection cause, if proceeds.
Expense Line:
Each line details a certain expense.
Including:
Expense date.
Expense Type: (Car usage in Km, allowance, etc.) Some
  expense types will have a fixed price, some will perform
  a calculation, other will let operator to include the
  amount as figures in ticket.
Units. The meaning will depend on expense type. Some
  types will not allow operator to use this.
Prize to apply. Prize per unit in pattern currency. Depends
  on expense type.
Expense description.
Expense Line total. Both currencies
Employee:
Employee code. This must be unique in the system.
Name and First name
Site, phone numbers, email.
Querying and Reporting Facilities:
The results of any search in the application may be consid-
  ered as a report so it must be possible to be printed as
  well as exported to Office tools like Word, Excel. It
  would be desirable to be ordered by any column while it
  is in the screen and exported or printed in that order.
The Expense Reports will be selected under the following
  criteria or a combination of them: by project, employee,
  issuing date, authorization date and payment date. Dates
  searching facilities will be better introduced as a period.
The Expense Report Will Show the Following Informa-
  tion:
  Project
  Employee name
  Status
  Approval Date
  Paid
  Payment Date
  Total expenses
  Balance
The Expense Report will be printed under specific format
  including the Expense lines.
Employees will allow to be searched by a combination of
  any data contained in Employee definition.
FIG. 19 is a dialog box used by the SOSY modeler to
  establish the set of attributes which will be displayed for
  the "expense" class.
FIG. 20 shows the dialog box used by the SOSY modeler to
  establish the searching criteria for the expense class, and
  indicate the filter formula to use and which variables to
  request from the user.
Translation Overview The validated formal specification 215 is the source for an execution model that handles the implementation-dependent features associated with a particular machine representation. To implement the specified system, the way in which users interact with system objects is predefined. FIG. 6 is a flow diagram illustrating the high level view of the operation of translating a formal specification into working system logic computer code to what it is referred to as "execution model" by the system logic translator 232 in FIG. 2. FIG. 6 does not set out the details of any specific translator to translate the high level repository for any specific formal specification into any specific target language working computer. Instead, FIG. 6 defines the steps or functions that all species in the subgenus of system logic translators would carry out in one way or another, maybe not in the same exact sequence. But at least these functions must be performed. The applicants believe that the translators alone may be novel in generating error-free output files from a validated formal language specification. The novelty of this system logic translator subgenus is this collection of functions working together to create a working computer program and not the details of how the functions are actually performed for a particular source formal language and a particular target language source code output, although such details are believed to be separately patentable for every formal language and target source code combination.

System Logic Translator Genus Defined

The process starts by logging the user into the system and identifying the user (step 600). Although this step might be optional in some embodiments, and thus should not be considered a defining characteristic of the subgenus, most applications require the user to be identified and authenticated so that privilege or access privileges can be implemented to code the system logic to block unauthorized users from performing certain functions.

An object system view is provided (step 602), determined by the set of object attributes and services that the user can see or activate. In other words, step 602 represents the process of writing code that will query the high level repository formal specification and determine all the objects and attributes thereof this user has privileges to see and all the services of those objects this user has privileges to invoke.

After the user is connected and has a clear object system view, he can then activate any available service in the user's worldview. Among these services, there will be observations (object queries), local services, and/or transactions served by other objects.

Any service activation requires two steps: build the message to send to the object server including the values for the arguments needed by the service, and then send the message to the appropriate object server. The object server is a piece of computer code that actually controls the computer to perform the service. In order to build the message, code must be written to identify the object server for every service any authorized user may wish to invoke (step 604). Steps 608 through 618 actually write the code of the object servers that will execute each available service. The existence of the object server is an implicit condition for executing any service, except for the service new.

Services need arguments to execute. These arguments may come from the data structure stored attribute values. Also, the user may need to introduces through the input devices of the computer to fill in service arguments for the service being activated. In the library loan example, the service loan needs the arguments as to the identity of the borrower, the title of the book loaned, and the date of the loan. So to build the service activation message, step 606 writes code to retrieve the appropriate service arguments from the requestor (which may be the user or another service) for each service. Thus, the arguments will be supplied from another object server, another program or will be from the user, typically via an interprocess data transfer path from the user interface code written by the user interface translator. Note, in some embodiments, the system logic translator might be combined with the user interface translator, so step 606 represents the process of writing code to gather the arguments from the user directly or from another process. Step 606 also writes code to write the service invocation messages that are directed to the proper object server and which contain the proper arguments such that each service may be properly invoked when a request to do so is received.

Step 608 represents the process of writing code that allows a user or another process to invoke a service, and when the service is invoked, writes a message with the proper arguments needed by the service and sends it to the object server that carries out the service. Once the message is sent, the service execution is characterized by the occurrence of the following sequence of actions in the server object which are the actions that the code written by steps 610 through 618 must control the computer to perform in implementing the object server. In other words, steps 610 through 618 write object servers that have the following behaviors. First, the state transitions of every object which the object server can alter are checked so as to verify that a valid transition exists for the current object state in the formal specification for the selected object(s). In other words, step 610 represents the step of writing object server code for every service which verifies state transitions can be validly made (make sense) for the current state of every object the object server is altering the state of before actually altering the state of the object.

Second, step 612 writes code for every object server which checks preconditions to ensure their satisfaction before acting upon an object to making a state transition thereof. In other words, the code written by step 612 makes sure the precondition associated with each service are satisfied before the service can be invoked to change the state of the object(s). If either of these events is true (a state transition does not make sense, or a precondition has not been satisfied), the code written by steps 610 and 612 ignores the service invocation message, and the service will not be executed.

Next, step 614 writes codes that computes all the valuation calculations required of each object server. To ensure that the service execution leads the object to a valid state, the integrity constraints (step 616) are verified in the final state. In other words, step 616 writes code for every object server which verifies that any integrity constraints on results are satisfied, and takes some appropriate action if they are not such as flagging an error, etc. If the constraint does not hold, an exception will arise in the code written, and the code written will control the computer such that the previous change of state is ignored.

Step 618 writes code for each object server that will test for the occurrence of trigger events after an object's state has been changed and take appropriate action if a trigger event has occurred. In other words, the code written by step 618 will have the following behavior. After a valid change of state occurs, the set of condition-action rules (triggers) that represents the internal system activity are verified. If any of them hold (a trigger event is satisfied), the specified service in the condition-action rules will be triggered.

Accordingly, the steps illustrated in FIG. 6 guide the implementation of any program to assure the functional equivalence between the object system specification collected in the Conceptual Model and its implementation in an actual programming environment.

In one embodiment, several translators may be used to complement the CASE tool 210 to constitute an automatic software production system. In one implementation, for example, the translators produce an application in accordance with a three-tiered architecture. Particularly, three different translators arise, corresponding to each tier: a system logic translator 232, a user-interface translator 234, and a database generator 236. In addition, a fourth translator is used, specifically, a documentation generator 238. These different translators are characterized by the output produced and, though potentially having the same input, each translator focuses on a particular subset of information in the above mentioned high level repository 215.

System Logic Translation: the Details

The system logic translator 232 automatically generates code for a third generation programming language from information in the high level repository. The output of the system logic translator 232 corresponds with the middle-tier in a three-tiered architecture.

In one embodiment, the system logic translator 232 produces source code that covers the following: (1) communications subsystem, (2) access to and communication with the persistence layer (the database or other file structure in which the values of all attributes of all objects are stored), (3) standard query services for reading the persistence layer contents, and (4) error handling produced by the persistence layer and client communications.

The communications subsystem is configured to: receive requests from a client, invoke internal methods, return replies to requestors that verify the requestor's existence and authorization to perform the requested service; verify the existence and validity of the requested server instance; create a copy of the requested server instance in memory accessing the persistence layer for persistent attributes or calculate the value of derived ones; validate any state transition for the requested service as specified in the state transition diagram 400 in the Conceptual Model; verify that the requested service's preconditions hold; perform all valuations related to the requested service as specified in the functional model; verify constraints for the new state achieved by the requested server instance; check trigger conditions to execute the corresponding actions; and make changes in the requested server instance persistent, i.e. state in the data structure stored in a memory.

In addition, code is generated for access to and communication with the persistence layer, service standard queries to read persistence layer contents, and handle errors produced by the persistence layer and communicate with the client.

In one embodiment, the first phase of code generation is the retrieval of information from the Conceptual Model 215 and storage of this information in code generation structures in memory. Three kinds of elements guide the retrieval of information: classes, global transactions, and global functions. Relevant information to be obtained from classes in the Conceptual Model include: name, constant attributes (name, type, requested upon creation, and initialization value formula), variable attributes (name, type, requested upon creation, initialization value formula, and null values admittance), derived attributes (name, type, and derivation formula), identification function, events (name, arguments: name and type, and precondition formula), transactions (name, type, arguments: name and type, precondition formula, and transaction formula), valuation formulae, state transitions (initial state, final state, service name, valid agents, and transition condition formula), static constraints formulae, dynamic constraints formulae, trigger conditions formulae, ancestor class (name), specialized classes (name, specialization condition formula, precondition redefinitions, and valuation redefinitions), aggregation relationships (related class, cardinalities, static or dynamic, and role names), and population selection patterns (filter: name and filter variables, order criteria).

Relevant information to be obtained from global interactions in the Conceptual Model include: name, arguments (name and type), and global interaction formula. Relevant information to be obtained from global functions in the Conceptual Model: include: name, return type, and arguments (name and type).

Generated code follows a component-based structure, based on the main unit of information that is found in the Conceptual Model, that is: the class. Each class in the Conceptual Model yields, in a first approach, several software components. For example, one component, referred to as a "server component" has an interface comprising a method for each service present in the signature of the corresponding class. Another component, whose interface comprises the methods necessary to query the population of the corresponding class, is called a "query component." A particular kind of executive component is the component relating to global interactions defined in the Conceptual Model, whose interface consists of a method per global interaction.

These components constitute the two access points the second or middle tier offered to the first or presentation tier. Server components receive requests from the presentation tier that relate to the execution of services, and query components receive requests from the presentation tier that relate with querying the persistence tier. Nevertheless these are not the only components generated.

Another generated component directly related to a class of the Conceptual Model is called the "Executive Component". This entity is responsible for resolving or executing each of the services in the signature of the corresponding class. This component receives requests from its corresponding server component or from other executive components.

Since a main purpose of the executive component is to resolve the services offered in the class signature, the interface presented by the executive component to the other components comprises a method per service. Each of these methods is structured according to the execution model.

In other words, the executive component is responsible for the following operations: verify the existence and validity for the requested server instance; create a copy of the requested server instance in memory accessing the persistence layer (by means of the above mentioned corresponding query component) to retrieve the values of constant and variable attributes; validate the state transition for the requested service and the present state of the requested server instance as specified in the corresponding state transition diagram in the Conceptual Model; verify the satisfaction of the requested service preconditions; modify the value of the instance variable attributes by performing all valuations affected by the service as specified in the functional model of the Conceptual Model, thus changing the state of the requested server instance; validate the new state achieved by the requested server instance by verifying its static and dynamic restrictions; check trigger conditions to determine which actions should be triggered if needed; communicate with the persistence layer for all persistent attributes of the requested server instance. Additionally, if the class is an agent of any service, another method is added to the interface whose purpose is that of validating the requestor's existence.

Another kind of executive component is a component related to global interactions defined in the Conceptual Model, whose interface consists of a method per global interaction.

If the class belongs to an inheritance hierarchy, all executive components of the same hierarchy are grouped into a single, special executive component. Nevertheless there would still be one server component per class in the hierarchy.

Another component to which a class in the Conceptual Model gives rise is a component called the "T component". This component is used to store a copy of the constant and variable attributes of an instance of the corresponding class, as well as the methods to calculate the value of its derived attributes. The corresponding query component implements a collection whose items are T components.

Another component to which a class in the Conceptual Model may give rise is a component called "P component". This component is used to store in memory the values needed to initialize the constant and variable attributes of the corresponding class when creating an instance of it, or just the values of the attributes that constitute the class identification mechanism. Such a component appears whenever the corresponding class is a multi-valued component of an aggregation relationship.

Another component to which a class in the Conceptual Model may give rise is a component called "PL component". This component implements a collection whose items are P components, as well as the methods needed to add and get items from the collection, and get the number of items in the collection. Such a component appears whenever the corresponding class is a multi-valued component of an aggregation relationship.

Another component to which a class in the Conceptual Model may give rise is a component called "C Components". This component is used to store in memory the values needed to initialize the constant and variable attributes of the corresponding class when creating an instance of it. Such a component appears whenever the corresponding class is a temporal or permanent, condition-based, specialization.

Additional components includes a CC component, an error component, a trigger component, a trigger list component, an instance list component, and condition, disjunction, and conjunction components.

The CC component appears whenever there is, at least one temporal or permanent, condition-based, specialization in the Conceptual Model. The CC component implements a collection whose items are C components, a pair of methods to add and get items to the collection (one pair per C component generated), and a method to get the number of items in the collection.

The error component always appears and is used to store information about the success or failure of a service execution. The trigger component stores information about a satisfied trigger condition so that the corresponding action can be later executed. The trigger list component implements a collection whose items are trigger components, as well as the methods to add an item to the collection, get any item from the collection, get the first item and get the number of items in the collection.

The instance list component implements a collection whose items are executive components playing in the execution of a given service. In addition to methods used to add an item to the collection, get an item, and get the number of items in the collection, this component implements a method to empty the collection and another one to look for an instance by its identification function.

The condition, disjunction and conjunction Components are always generated and support the construction of complex boolean expressions, used to query the persistence layer, structured as a conjunction of disjunctions. The condition component stores information about a simple boolean condition, that is: two operands and an operator (+, −, *, /, =, <>, <, <=, >=, > . . . ). The disjunction component implements a collection whose items are condition components (that is, a disjunction of conditions), as well as methods to add and get a condition from the collection and a method to get the number of conditions in the collection. The conjunction component implements a collection whose items are disjunction components (that is, a conjunction of disjunctions), as well as methods to add and get a disjunction from the collection and a method to get the number of disjunctions in the collection.

In addition, two modules are also generated: a global module for grouping attributes and methods shared through the generated code, and a global functions module that groups the code of all global functions defined in the Conceptual Model.

Translation Strategy and Architecture

In accordance with one embodiment, code generation is driven by the information retrieved from the high level repository 215. The translation process can be divided into four phases: validation of the Conceptual Model (performed by validator 220), translation of the corresponding data model into a relational database management system (performed by database generator 236), retrieval of information from the Conceptual Model and storage of this information in memory structures and finally, generation of files from the information stored in memory (e.g. reading the information in memory structures to generate code in the target programming language).

Validation of the Conceptual Model is mandatory in the preferred embodiment, while data model translation is optional, but both can be considered as prerequisites to the other two phases which are the ones strictly related to code generation. Translation structures are designed to store input information from the Conceptual Model and all have a method that uses this information to generate source code in the target programming language.

These translation structures include: a class to store information needed to generate server components (server class), a class to store information needed to generate server components for global interactions (global interactions server class), a class to store information needed to generate executive components (analysis class), a class to store information needed to generate executive components for global interactions (global interactions analysis class), a class to store information needed to generate executive components for inheritance hierarchies (inheritance hierarchy analysis class), a class to store information needed to generate query components (query class), a class to store information needed to generate T components (T class), a class to store information needed to generate C components (C class), a class to store information needed to generate CC component (CC class), a class to store information needed to generate P components (P class), a class to store information needed to generate PL components (PL class), a class to store information on the arguments for every service of every class in the Conceptual Model (arguments list class), a class to store information on the identification function of every class in the Conceptual Model (analysis class list class), classes to generate the methods needed to resolve a service in executive components (event class, shared event class, transaction class, interaction class), classes to generate the auxiliary methods needed to resolve a service in both executive components and executive components for inheritance hierarchies (precondition class, static constraints class, dynamic constraints class, . . . etc.). classes to generate methods needed in query and T components (T & Q method classes), a class to generate inheritance-specific methods (inheritance method class), and a class to monitor the generation process (code generation class).

The code generation class is responsible for retrieving all the information needed to generate code and for doing so in the appropriate order, for writing to files the generated code and organizing it into files properly according to the component-based structure. The code generation class maintains lists of the above mentioned generation structures in memory in which information retrieved from the Conceptual Model is to be stored and it later loops through these lists to write the appropriate files.

The information retrieval process basically comprises a series of loops through the classes in the Conceptual Model to gather all information needed, a loop trough global interactions and a loop through global functions in the Conceptual Model.

The last phase in the code generation process covers writing to files according to the component-based structure presented herein. This process comprises: looping through the lists of instances above described that maintain the information needed to generate components and their attributes and methods, and call each element's code generation method; generating global interactions executive component; generating global interactions server component; generating global functions module; and generating standard components.

For each global function in the Conceptual Model, a method is generated in this module that: has a global function name, has an argument. For each argument in that global function with the same name and whose type is translated into the corresponding one in the target programming language, and its return type is translated too.

User-Interface Translation

The user-interface translator 234 automatically generates source code for a third generation programming language from information in the high level repository. Its output corresponds with the presentation tier in a three-tiered architecture. Thus, the user-interface translator 234 provides as output the source code of a component that implements the user interface functionality. This component is automatically generated without human intervention. The user-interface translator 234 uses as input data a validated Conceptual Model 215 and offers as output data, source code in a third generation language that implements an equivalent functional prototype related to the Conceptual Model the component is derived from.

In one embodiment of the present invention, the user-interface translator 234 produces source code to perform the following: a communications subsystem able to send requests to a business component, and receive replies; a logon to system for user authentication; and a menu of available services for specific authenticated user. For each available service, frame, screen or data collection dialog of all service arguments, the user-interface translator 234 generates code that sets initial values for arguments, validates introduced data (type, range, object existence, etc.), and calling to server activation. In addition, the user-interface translator 234 generates code for standard query services that list all instances status in a class and error handling.

Additionally, code is generated for a wider and flexible user-interface operation. In a query service frame, form or screen, the following functionality will be available when a certain instance has been selected: navigation through relationships with related selected object. This navigation is used to browse among related data items following its related links. Additional functionality includes services activation for selected object; advanced query services including: filters (population selection), views (status selection), and sorting criteria; and context keeping for filling-in known services arguments. Context keeping is a user-facility. Context is data associated to the working user environment. This data is useful to provide default values for service arguments.

For its input, the user-interface translator 234 reads specification 215 of a Conceptual Model and stores this kind of information in intermediate structures in memory. The user-interface translator 234 is independent of the input medium in which the Conceptual Model is provided. In this way, the intermediate structures can be loaded from different data sources. The model is iterated in several passes to extract the relevant information in each phase of the translation process from the formal specification, including information about classes, aggregation relationships, inheritance relationships, agent relationships, global interactions, user defined functions, and interface patterns.

Translated applications are composed by forms that contain the user-interface offered to the final user. A form, in abstract sense, is the interaction unit with the final user. Forms are translated depending on capabilities of the target environment to match the requirements: e.g. windows dialogues for Windows environments, HTML pages in Web platforms, applets in Java, etc.

Figure 7:
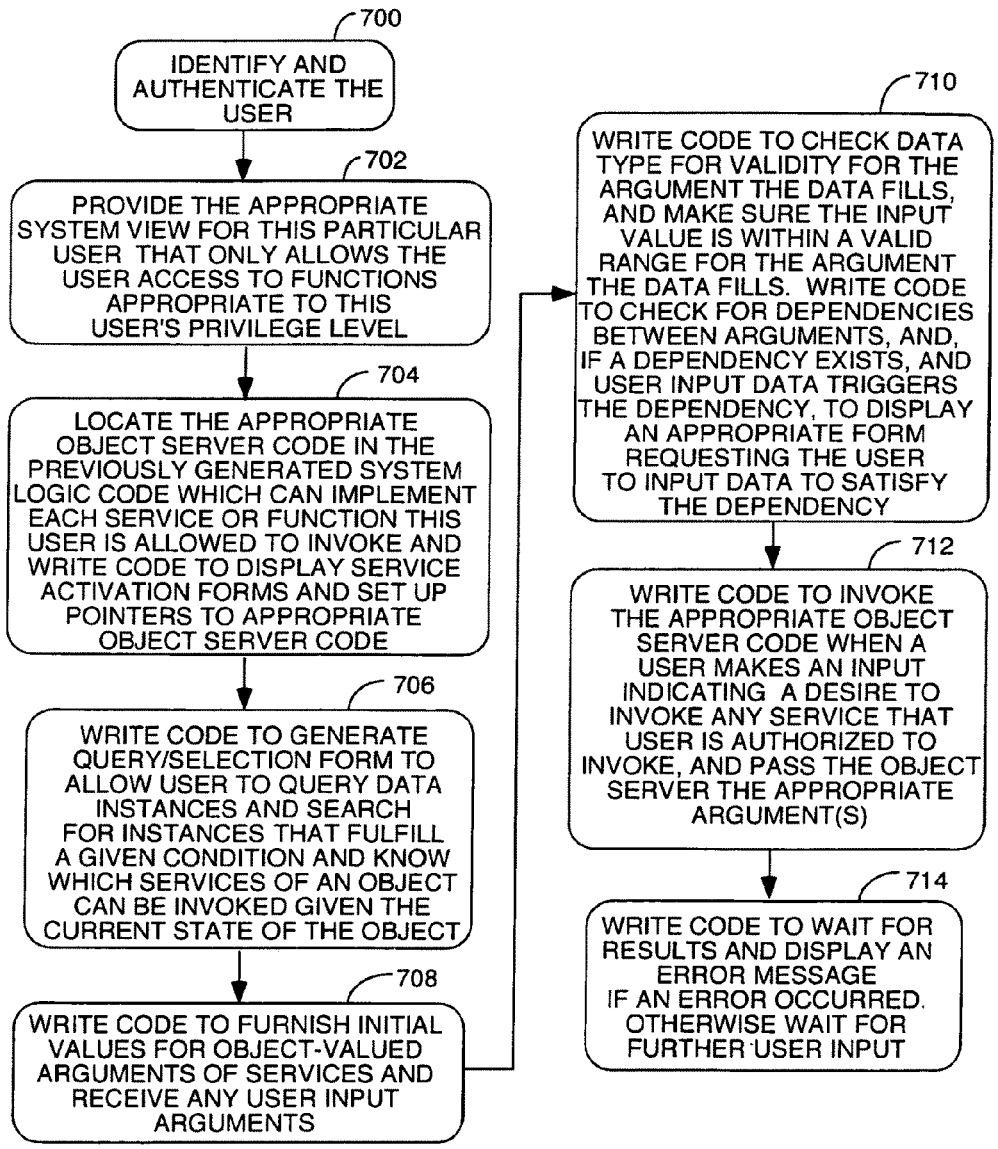
FIG. 7 is a flow diagram representing the sequence of functions that all translators in the subgenus of user interface translators will perform.

FIG. 7 is a flow diagram representing the sequence of functions that all translators in the subgenus of user interface translators will perform. The details of how each function is performed will vary from one target source code type to the next, but all species will share the characteristics of performing the functions of FIG. 7, possibly not in the same order.

Translated applications supply the user connection to the system. The user connection is resolved using an access form to identify and authenticate the user, block 700. In addition, the translated application provides a system user view, block 702. A user must be able to access services the user can launch, but should be presented with a system view that is appropriate to the user's privilege level. Block 702 represents the process of looking up the user's privilege level and determining which objects the user can have access and presenting a system view to the user which only allows the user to invoke functions that are appropriate to the user's privilege level. The main form is designed to accomplish this task.

For each service that can be executed by a user, the translated application locates the appropriate object server code in the system logic code previously generated, and generates an activation service form which points to the appropriate object server for each service the user can invoke, block 704.

For each class, the translated application generates a query/selection form. This form allows users to query data instances, search instances that fulfill a given condition, observe related instances and know which services can be launched for a given object in its current state, block 706. For each service, the translated application furnishes initialization values for object-valued arguments. Initial data is provided too by managing information obtained from the browse made by the user, and any user input arguments for services are checked to make sure they are valid data types for the arguments the data is intended to supply, and within valid ranges for the arguments the user input data is intended to fill. Blocks 708 and 710. The process represented by block 710 also represents the process of writing code to check for dependencies between arguments. If this code finds that a dependency exists, and a user input triggers a dependency, it displays an appropriate form requesting the user to input data to satisfy the dependency and check that data for valid data type and within an acceptable range.

Block 712 represents the process of writing code to invoke the appropriate object server code when a user makes an input indicating a desire to invoke any service that the user is authorized to invoke, and to pass to that object server the appropriate arguments. Block 714 represents the process of writing code to wait for results and display an error message if an error occurred. If no error occurred, the code waits for further user input.

The user encounters different scenarios interacting with the application. These scenarios lead to defining different types of forms. In the next section, each kind of form will be described.

In the Conceptual Model 215, some classes are defined as agents of services classes (called agent classes). That is, if an object is a service agent it is allowed to request the service. Each agent object must be validated, i.e., authenticated before trying to request services. The Access Form authenticates by requesting selection of an agent class (selected from a list of valid agents classes), requesting an object identifier and requesting a password. The data collected is used to verify if there exists a valid agent object that is allowed to access the system. This is how users of the target program (each user is an agent class) are authenticated.

The Application Main Form contains a menu, where user can view the services he is allowed to execute. The source code required to implement each action requested by user is automatically generated.

For each accessible service for at least one agent, a Service Form is generated. These forms have an introduction field for each argument the user must provide. This argument's fields have attached code to validate data-types, sizes, value-ranges, nulls, etc. (block 710 process). Object-valued fields provide facilities to search the object browsing information and filter it. Code is generated to accomplish this task.

Each service argument can take its initial value in three different ways:

1. By Initial values. In the Conceptual Model, the designer can provide default values for attributes and arguments. If such value exists, code must be generated to supply the value (block 708).

2. By Context. Context information (for example, a list of recently observed objects) is useful to suggest values to object-valued arguments that have the same type as collected ones. A function is generated to search appropriate values in the recently visited objects list.

3. By Dependency Pattern. In the Conceptual Model, the system designer can define Dependency Patterns. The Status Recovery pattern is an implicit set of dependency patterns too. In both cases, the change on an argument can affect values in other arguments. So, the processing of block 710 is performed.

Data Validation (block 710) can occur just after data input, interactively warning the user and just before sending data to system-logic. Object-valued arguments validation requires checking object existence. To support validation, a function is generated for each service argument. The function is invoked before sending a request to system-logic.

The code written by one species of the user interface translator works in the following way. When the user requests service execution, the service arguments are validated by the code written by block 710. If the service arguments are valid, system logic is invoked to accomplish the service by code written by the process of block 712. The message built to invoke the system-logic uses the formal order to sort the arguments.

After executing the service, the user is informed whether the service succeeded or not (block 714). Accordingly, code to validate arguments and code to invoke the system-logic with necessary arguments in the formal order are generated. Furthermore, possible errors are returned to inform the user.

The Query/Selection Form permits the querying of objects (that can be restrained by filters) and the selection of an object. When an object is selected, the user can browse to other data items related to the object. In the same way, the user can launch a service of the selected object.

These query/selection forms include graphic items representing filters. A visual component is used to filter the population of a class. Filters may contain variables. In such cases, fields for the variables are requested to users in order to form the condition of the filter. For example: Find cars by color, by type and model.

These query/selection forms also include a visual component to show objects. Inside this component objects that fulfill the filter condition (or every class population if filters are not defined) appear. The attributes displayed in the component are fixed by a Display Set.

These query/selection forms also include a visual component to launch services. For example: given a car, the user can launch services in order to rent the car, return, or sell it. This task is achieved by a function that determines which service to launch of what object. The corresponding Service Form is invoked for each exposed service. These query/selection forms also include a component to initiate browsing. For example: given a car, the user can view the driver, the driver's sons, etc. When the user navigates (follows a link from an object) a new query/selection form is displayed. In the same way that the previous component, there exists code to invoke the next form to display when user browses objects. When a query/selection form is reached by navigation, the form receives information about the previous object in order to display only the data related to that initial object.

In the applications, visited objects and navigation paths followed by users are stored in some embodiments. This information is named Context Information. When the user browses data between query/selection forms, the path followed is stored. Finally, when the user tries to invoke a service and a service form is needed, the application can provide, as an extra input to the service form, this contextual information. Then, the Service Form uses this data to provide initial values for object-valuated arguments.

User-Interface Translator Architecture

Using the Conceptual Model 215 used as input, the user-interface translator 234 can retrieve information from memory structures, a relational database, using a query API or any other input source. An intermediate structure in memory is filled with the Conceptual Model data relevant for translating the user-interface component. Intermediate structure follows an architecture to the one defined in the Conceptual Model schema in which can be queried for classes, services, and attributes for a specific Conceptual Model.

When data is loaded in the intermediate structure, the real translation phase begins. Inside the source code files of the generated application, two types of files can be distinguished. One type of file is a set of files having fixed contents. These files correspond to structures or auxiliary functions widely used that are always produced in the same way. These files are generated by dumping byte streams directly from the translator to final files in order to create them. Other files strongly depend from the Conceptual Model that is being processed. Therefore, although these files have a well-defined structure (detailed in the previous section), they have variable parts depending on the processed model. The user-interface translator 234 iterates the Conceptual Model to extract the relevant data to generate these variable parts.

The translation process for the user-interface translator 234 has the following tasks for the preferred species as part of the genus processing symbolized by FIG. 7:

1. Generate the fixed files, e.g. headers, definitions, constants, and auxiliary functions to its respective files.
2. Generate auxiliary widgets (controls or Java Beans) depending on the application 3. For each class, generate a query/selection form, an instance selection component, a specialization component (if class is specialized from other class and requires extra initialization). For each service class, also generate a service form.
4. Generate an access form (identification).
5. Generate a main form containing the menu application (block 702).
6. Generate communication functions to reach system-logic server (block 704). These functions encapsulate the invocation of services available in the prototypes.

The Access Form generated as by the code written by block 700 is a little dialog box containing: a list of agent classes (from this list, the user chooses one), a field where the user provides OID for a valid object instance belonging to the previously selected class and a field for password. This form is mostly generated in a fixed way. The only varying section for each model is the mentioned agent classes list. By iterating over the model classes list and by checking which classes are agents such agent classes list can be obtained.

In order to provide access to the application's functionality (block 704), the services are arranged in an access-hierarchy to be converted to menu bars (Visual Basic client), HTTP pages (Web client) or any other structure that allows browsing. By default, the hierarchy is built by iterating the classes and services in the Conceptual Model. The hierarchy can be seen as an access tree to the application. For each class, a tree item is built labeled with class alias. For each built-in item, this mode has the following items as descendents: an item labeled as 'Query' to access a query form; an item for each service defined in the current class labeled with the service alias; and, in the case of inheritance relationship with other classes, an item is built for each direct subclass labeled with subclass alias. Recursively, the same algorithm is applied until the inheritance tree is fully explored.

A Service Form requires the following input data extracted from the Conceptual Model: Service to generate, service class, arguments list, interface patterns linked to arguments. For each service, a form is generated that contains a graphic part and a functional part. The graphic part includes a widget attached to each argument that needs input from the user and a pair of widgets to accept or cancel the service launch. The functional part includes code to implement the event-drivers for the previous widgets, to initialize the properties of these widgets with default values, to validate introduced values, and to invoke the service in the system-logic component.

A detailed explanation of how to generate a Service Form follows. First, two argument lists are obtained. The first one corresponds to the arguments defined in the service declaration (FL, Formal List). In this list, the arguments are sorted by its formal declaration order. The second one contains the same arguments sorted by the presentation order (PL, Presentation List). Both orders are specified in the Conceptual Model.

Iterating through the Formal List and for each argument: create a widget for each argument that has to be obtained from the user (block 708) and set relevant properties to arguments like: type, size, can be null, Introduction Pattern, Defined Selection Pattern or Population Selection Pattern Widgets are added for OK and Cancel commands, and graphic positions of widgets are arranged so they do not overlap. In one implementation, the form is divided in a logical grid of n columns by n rows and assign positions from left to right and from top to bottom to conveniently arrange the widgets. The logical positions are translated to physical position in the target language and rearrange action commands in the bottom-right corner of the form. Finally, the form is resized to adjust the size of data contained therein.

For output, the standard header of a form is dumped to a file. This step is dependent of the target language selected. Then, the graphic part of form is dumped to the file, including the definition of basic form properties, the definition of each widget, and the widgets' actions.

Finally, the source code attached to this form is translated and dumped. This process includes translating generic functions to manage events in the form, such as open and close events and produce code to assign and free resources. Also, functions to handle the Status Recovery Pattern and dependencies between widgets are translated. Depending on the Status Recovery Pattern attached to the service, and possible Dependency Patterns defined in the service, code for changing argument values must be generated and the code that triggers such dependencies. The validation code is translated too. There are validation methods to check the values gathered in the widgets are right. Finally, a function to invoke the appropriate object server of the system-logic services is generated. The function built contains: a reference to system-logic object where the service is going to be executed; the invocation to a method that implements the service in the system-logic; and the arguments necessary to such function, constructed from values supplied from the user through widgets (block 712).

In order to generate a query/selection form, the following Conceptual Model information is required: a class and its properties (alias), and the list of the Population Selection interface patterns defined for the class. Each pattern contains: a display set, a filter, and a sort criterion. In case there is no visualization set defined, the list of attributes belonging to the class is assumed. If a class lacks a Population Selection interface pattern, the following default values will be assumed: every attribute defined in the class is considered as part of the display set, and neither a filter (in this case the whole population of the class is returned) nor a sort criteria are attached.

Generating a query/selection form also requires information about the relationships of the class. For every class, a form is generated based on this information and contains a tabular representation of the display sets of the class, a set of grouped filters that allow a user of the application to restrict search through the population, and a pop-up menu including navigability links to the classes related to the first one and available services to be launched over instances of the class.

The generated software component, which has been described before, provides the user-interface client functionality that includes all the required functionality for both validating and executing a prototype compliant to the Conceptual Model it has been derived from. The applications of the component are: prototyping, to validate the Conceptual Model before the user for capturing new requirements; testing to validate the Conceptual Model by the analysts to verify that the model faithfully reflects the requirements; and ultimate application production, once the process of requirements capture is completed, the generated component can be considered as a final version implementing a functionally complete and ergonomic user interface. The component can be edited to customize the application to users desires with very little effort.

Data Model Translation

In the preferred species, the database generator 236 automatically defines a data model in a Relational Database Management System (RDBMS) according to the validated specification in the high level repository 215. In other species, any data structure that at least stores the values of all object attributes in a manner that allows at least the system logic code and, preferably, the user interface code to retrieve them at will may be coded. The output of the database generator 236 corresponds with the persistence tier (database or shared data structure) in a multi-tiered architecture. In one embodiment this may be true, but it is not mandatory that the persistence tier in a multi-tiered architecture corresponds with a Relational Database Management System.

Figure 8:
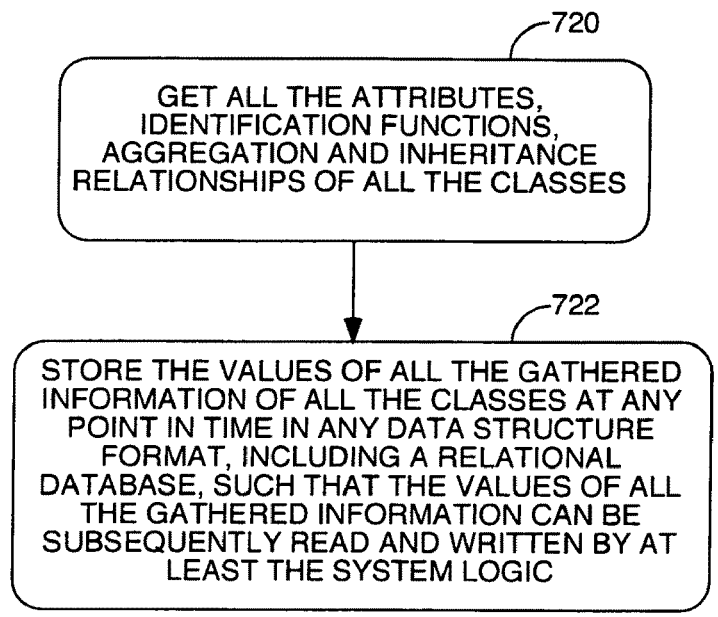
FIG. 8 is a flowchart of the functions that all species of the subgenus database translator 236 must perform.

Referring to FIG. 8, there is shown a flowchart of the functions that all species of the subgenus database translator 236 must perform. The details regarding how each function is performed will depend upon the formal language of the high level repository, the source code type of the system logic, the operating system in use and the data structure being created, but all species will perform the two basic functions of FIG. 8. Block 720 represents the process of getting the values of all the attributes of all the classes at the initial time. Block 722 represents storing the values of the attributes so obtained in any data structure format, which could include a relational database. The only thing that is important is that a data structure be created that stores the entire initial state of all attributes in a structure which can be used by the system logic to subsequently read and write the values of these attributes.

From the information in the high level repository about a given Conceptual Model, scripts are generated in order to create and delete tables, constraints (primary and foreign keys) and indexes. Scripts can optionally be executed in a Relational Database Management System to effectively create said data model.

From the point of view of relational databases, data is stored in tables with relationships between them. However, from the object oriented programming point of view, data is stored in object hierarchies.

Although the automatic software production system in accordance with one embodiment is based on an object oriented methodology, it is necessary to find a physical data storage system to permanently store data managed by generated applications. Relational databases are preferred, because they are the industry-standard way to store data and, consequently, use of tables instead of objects would be desirable. Nevertheless, many object-oriented applications, like those produced in accordance with an embodiment of the present invention, can be compatible with the Relational Model, since the static aspects of objects can be stored in tables following a translation process.

The generated data model comprises a set of tables and the corresponding relationships, as well as constraints on primary and foreign keys and indexes. The generated data model reflects system data with the attributes defined in the classes specification and other class instances properties like their state, and role if they are agents.

Information, gathered from the high level repository 215 and needed to produce the corresponding data model, focuses on classes and includes the name, constant attributes (either emergent or inherited); variable attributes (either emergent or inherited); identification function; inherited identification function; aggregation relationships (either emergent or inherited); and agent information.

Preferably, the generated scripts follow a standard: ANSI SQL 92. This fact means that the generated data model can fit any database management system based on ANSI SQL 92, particularly most well known relational database management systems.

The process to obtain the data model follows these steps: For each elemental class of the Conceptual Model, a table in the selected relational database is created. For each constant or variable attribute in the class specification, a field in the table corresponding to the class is created. The field data type depends on Conceptual Model attribute data type translated into the target relational database. Derived attributes are not stored in the database since their value will be calculated upon request by special methods in the server code generated.

Primary keys are determined by attributes marked in the Conceptual Model as being identification attributes. Thus table fields corresponding to these attributes will constitute the primary keys of the table. As a particular case, tables corresponding to specialized classes, in addition to fields representing emergent attributes, have fields that correspond to attributes that constitute the primary key of the table representing their ancestor class. If a specialized class does not have an identification function of its own, these fields, copied from the ancestor class, constitute the specialized table primary key. At the same time, they constitute the foreign key to the parent class table. On the other hand, if a specialized class has its own identification function, these fields only constitute a foreign key to the parent class table.

Aggregation case is more complicated, because aggregation has more dimensions. The aggregation relationship dimensions determine its cardinalities which in turn determine representation in the database: If the relationship is multivalued (maximum cardinality set to M) in both senses a new table is added in order to represent this aggregation relationship. This table has a field for each one that constitutes the primary key of related tables. The set of all these fields constitutes the primary key and, individually, fields coming from each related table's primary key, constitute foreign keys to each related table.

If the relationship is univalued (maximum cardinality set to 1) in one sense, the class related with only one instance of the other one copies the fields of the primary key of the other one. These fields constitute a foreign key to the related class table.

If the relationship is univalued in both senses, any of the tables could have the foreign key to the other. The adopted option in this case is that the aggregate class has the reference to the component class. With respect to minimum cardinalities, if minimum cardinality is 0 then the corresponding field will take null values. Otherwise it will not. If identification dependence exists between two classes then fields of the primary key of the non-dependent class are copied to the table corresponding to the dependent class. They will be part of its primary key, and be a foreign key to the table of the non-depending class.

Indexes may be generated to optimize searches and reduce response time. For each foreign key, an index will be generated so foreign keys will also be search indexes.

So far the static aspects of an object have been covered, but some dynamic aspects need also be discussed. The occurrence of services characterize the evolution in an object's life for an object's state changes whenever a service happens since the value of its attributes characterize its state. The state transition diagram determines valid lives for an object. In order to monitor state transition, a new field will be added to each table corresponding to a class, to store the name of the state in the state transition diagram in which an object is at a given instant.

Generated applications must perform user authentication by requesting identification and password to agents logging on to the system. A new field will be added to tables corresponding to classes that are agents of any service in the system, to store the password of said agent.

Documentation Translation

The CASE tool 210 allows for additional information to be introduced at analysis time, which can be used to generate system's documentation. Accordingly, the documentation generator 238 automatically produces a set of documents including the formal specification, full Conceptual Model details documentation, user's help, and others, from information in the high level repository 215.

Figure 21:
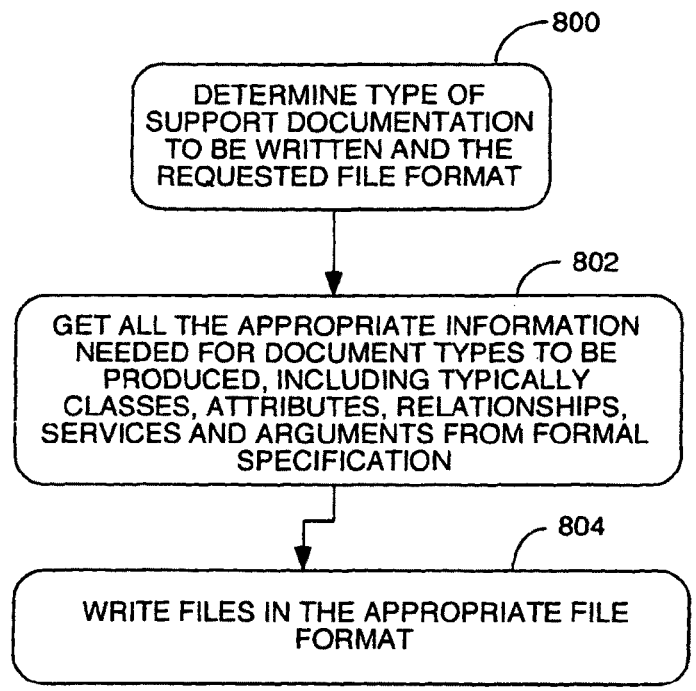
FIG. 21 is a flow diagram defining the characteristics that all species in the genus of user documentation translators will share.

FIG. 21 is a flowchart of the processing steps that every species in the subgenus documentation translators will have to perform. Step 800 represents the process of determining from configuration data or other user input which types of support documents are going to be generated. Step 802 represents the process of getting from the Formal Specification all the appropriate information needed for the requested documents. Typically the information gathered is classes, attributes, relationships, services, arguments, etc. Step 804 represents the process of writing the support documentation in files of the appropriate format.

Due to their different nature, there is a specific generation process for the formal system specification. The rest of produced documents are based in a generic data process. This process allows to obtain the same documents in different formats and define any new type of document.

CASE tools must provide multiple documents that can be automatically generated from Conceptual Models previously gathered. The documentation generator 238 answers the need for information requests and queries performed on a Conceptual Model. The documentation generator 238 allows generation of queries, specific manuscripts or well-formed documents in order to document properly a project.

In a preferred embodiment, complete generation of Conceptual Model is generated in an ASCII format with OASIS syntax. OASIS is a formal specification in an object-oriented language. The OASIS specification comprises the part of the Conceptual Model related to analysis of the problem. Other parts, like interface patterns, are not included in the OASIS specifications.

Document generator provides, by default, general documents, services documents, and help documents. The general documents include a natural language specification description. The services documents include a detailed description of classes and services. The help documents contain an on-line help for generated prototypes.

The Documentation Generator uses as target languages some recognized standard formats for documentation: ASCII, plain text, navigational HTML with multiple documents, navigational HTML with one document, LaTeX, and Rich Text Format (RTF).

This Documentation System is scalable and can be extended to add a new kind of document or target language. Adding a new target language allows all defined documents to be generated with this new language. In the same way, adding a new document type will be generated to any supported target language.

In order to produce an OASIS specification, a process iterates over the information structures and writes to a file the corresponding text strings in the OASIS language. In the inner process, the iteration over the structures can be detailed as: (1) write specification headers; (2) For all class selected to be described: write its OASIS template (attributes, events, derivations, restrictions, preconditions, triggers and process); (3) for all global transaction, write its declaration and OASIS definition; and (4) write the end spec.

A document is generated in an intermediate block language (IBL). In such language the document is a block of document type and contains n child blocks. Recursively, by continence relation and having fixed a block taxonomy, documents can be defined based on block's structures. A block is a structure that contains the following properties: name, category, block type, block text, and list of contained blocks.

The generation is supported by an algorithm that implements loops iterating over the Conceptual Model following the order fixed by the document. In these iterations, the document is built creating and linking the blocks that constitute the document.

When the block structure is built, the resultant structure, a tree of blocks, is processed by a translator to convert it to a document in the selected target language. This algorithm using recursive descent analysis is capable to convert the blocks to tags in the target language depending on the information stored in the block and contained blocks.

As example, a block of type MM_SECCION1 and containing the text "Title" will be translated to the next string HTML equivalent: <H1>Title</H1>

Generating Full Applications

Accordingly, an automatic software production tool is described that captures information requirements, also referred to as "business processes" from a triple perspective: static, dynamic and functional. This allows system designers and analysts to fully capture every aspect of the reality they model.

System Logic Translator is then responsible for gathering all this information, which would have been previously validated to assure correctness and completeness, and automatically produce code that implements every aspect of the modeled reality. This system logic code has the following features:

The system logic code is complete and correct. Since information gathered by the System Logic Translator has been previously validated, produced code can be assured to be both complete and correct thanks to the set of translation recipes provided. The set of translation recipes cover every aspect that can be modeled by an analyst, so everything that can be expressed and captured in a Conceptual Model can be translated into source code. Every translation recipe assures for correct translation thus resulting in error-free source code.

The system logic code is for a full application, not just a prototype. Generated code can be compiled (with the appropriate compiler depending on the target programming language) and executed "as-is" because it is fully translated from the Conceptual Model information input. Generated code is not a mere collection of method skeletons but complete methods. Furthermore, no useless code is produced and no line of code is generated more than once. In addition to this, even being the generated code well structured and readable, comments can be automatically generated as a means of internal code documentation thus improving readability.

The system logic code is robust and includes error checking and handling. Correctness and completeness allow for the production of robust code. According to the information in the Conceptual Model, errors fall into two categories: model or internal errors and external errors. Internal errors correspond to properties that must hold at a given instant according to the Conceptual Model (e.g.: a precondition that does not hold, an integrity constraint, violation of a maximum cardinality of an aggregation relationship, etc.) External errors correspond to causes alien to the Conceptual Model (e.g.: a system failure, a database failure, . . . etc.).

The generated code handles errors according to this classification as follows: For internal errors, the system logic translator identifies every point where an internal error might occur then produces error checking and handling code to notify the client about such an error's occurrence. Again, internal errors can be categorized and given a specifically defined treatment, such as customizable error messages and error codes. For external errors, the system logic translator identifies every point where an external error might occur then produces error checking and handling code to notify the client about such an error's occurrence. Since external errors cannot be categorized, they are treated in the same standard way.

Therefore, the automatic production of error checking and handling code for every possible situation can assure any translation of a Conceptual Model to be robust.

The system logic code handles transactional behavior. The generated code presents transactional behavior in the sense that the code provides clients a well-defined interface, which allows them to request services from the system. Those services are executed in a transactional way: every input argument of the service must be provided by the client, then system logic performs the corresponding operations and replies to the client. Services in a Conceptual Model can be in turn decomposed into actions. The generated code assures for all actions composing a service be successfully accomplished or none of them. In addition, changes to objects affected by the actions a service is divided into do not effectively take place until all these actions have successfully terminated. Transactional behavior also enhances integration with legacy systems.

The system logic code is independent from the user interface. The generated code provides a well-defined interface allowing for clients to request services. But this interface does not depend on the clients interacting with it. This allows for a heterogeneous set of clients interacting with the same system logic. Thus, clients for a specific system logic need only know the interface it will present to them. This feature also enhances integration with legacy systems and decomposition of huge information systems or Conceptual Models into smaller ones, which, thanks to their well-defined interfaces, can interact with each other.

The system logic code is independent from the persistence layer. The generated code is responsible for interacting with the persistence layer implementing what is regarded as "persistence services". These services are responsible for: adding, retrieving, updating, and deleting information in the persistence layer. These services are necessary for the system logic to perform its tasks but, in addition to this, system logic hides the persistence layer to clients by providing services to perform queries on the persistence layer. This implies that clients need not know the physical location of the persistence layer; need not know the structure of the persistence layer, because they are provided with services to perform queries on the persistence layer; need not be authorized users of the persistence layer because access to the persistence layer is entirely managed by the system logic; and need not even know that there is a persistence layer.

To sum up, the code automatically produced by the automatic software production system of one embodiment of the present invention corresponds to that of a true final software application, instead of that of just a prototype. To maintain this distinction, some of the differences between the generated system logic code from that of a prototype are explained.

(1) Completeness: A prototype does not fully cover functionality of an information system, nor is it intended for every possible flow of execution, while our automatically generated code, being a final application, totally covers the functionality captured in the corresponding Conceptual Model, as well as every possible flow of execution.

(2) Correctness: A prototype aims to verify user's needs and requirements and verify correctness of execution. The automatically generated code in accordance with an embodiment of the present invention, on the other hand, aims to verify user's needs and requirements, for it is correctly generated.

(3) Robustness: A prototype is not robust, because the prototype is not produced with error checking and handling code. Rather, this code is not produced, typically by hand, until the very last step of codification, where user's needs and requisites have proven to be satisfied and a final application can then be produced. A final application, such is the case of our automatically generated code, must come with all the code necessary to assure robustness. Since this is usually codified by hand, programmers often forget to add such code in many places where needed. This leads to high costs of maintenance and disrupts the balance between system logic code and error checking and handling code. The system logic translators described herein provides all the necessary (and just than the necessary) code to deal with error checking and handling.

(4) Scalability: Prototypes are not scalable because they tend to be discarded during the process of validating user's needs and requisites. Final applications can be designed to be scalable because they aim to last much longer than a prototype. Nevertheless scalability implies following certain guidelines during design phase. With embodiments of the invention, system analysts need not worry about scalability because such a task falls under the System Logic Translator 232 responsibilities. So, analysts focus on analysis matters knowing that the resulting code will be scalable. Furthermore, different Conceptual Models translated by the System Logic Translator can interact with each other through their well-defined interfaces.

Appendix A attached is a set of power point slides printed on paper which explain the operation of the system and give some specific examples of key operations.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A process to use a computer to automatically translate a Formal Language Specification defining the functionality of a computer application program modeled in a Conceptual Model, into bug-free source code of a complete application program including a user interface and a database schema, said process comprising the steps of:
   A) using a computer to automatically check statements in said Formal Language Specification against the rules of syntax and semantics of a formal language in which said Formal Language Specification is expressed thereby validating said Formal Language Specification to ensure said Formal Language Specification is complete in that there is no missing information in said Formal Language Specification and to ensure said Formal Language Specification is correct in that primitives of said conceptual model are syntactically and semantically consistent and not ambiguous;
   B) translating said validated Formal Language Specification into computer readable source code which has the capability to control a computer to provide a user interface access mechanism to allow users to log in by entering at least identification data and to use said identification data to authenticate and validate a user as an instance of a class of the validated Formal Language Specification that act as agent in at least one agent relationship, said translating done using a computer to automatically retrieve information from said Formal Language Specification and storing said retrieved information in one or more code generation structures in memory of a computer, said code generation structures taking the form of class objects each of which has a code generation method, and using a method in a code generation class object to call the code generation method(s) of the code generation structures in a proper order to write one or more source code files that implement said user interface access mechanism;
   C) translating said validated Formal Language Specification into computer readable code which has the capability to control a computer to provide a view of the system defining the set of objects and attributes the user can query and the set of services said user can execute, the content of said system view depending on the identity of said user accessing said application, said translating done using a computer to automatically retrieve information from said Formal Language Specification which expresses concepts in a Conceptual Model of said application in a Formal Language, and storing said retrieved information in one or more code generation structures in memory of a computer, said code generation structures taking the form of class objects each of which has a code generation method, and using a method in a code generation class object to call the code generation method(s) of said one or more code generation structures in a proper order to write one or more source code files that implement said capability to control a computer to provide a view of said system defining the set of objects and attributes said user can query and the set of services said user can execute; and
   D) translating said validated Formal Language Specification into computer readable code which has the capability to control a computer to provide user interface interaction mechanisms to interact with and execute the functionality of the application in terms of performing queries on information managed by said application and executing services to modify the state of said information managed by said application, said services comprising events, local transactions and global transactions, said translating done using a computer to automatically retrieve information from said Formal Language Specification which expresses concepts in a Conceptual Model of said application in a Formal Language, and storing said retrieved information in one or more code generation structures in memory of a computer, said code generation structures taking the form of class objects each of which has a code generation method, and using a method in a code generation class object to call the code generation method(s) of said one or more code generation structures in a proper order to write one or more source code files that implement said application with capability to control a computer to provide user interface interaction mechanism to interact with and execute the functionality of said application and allow a user of said application to launch said queries and services.

2. The process of claim 1 wherein Step D comprises retrieving data from said Formal Language Specification for storage in said code generation structures which is such that, when said code generation method(s) of said code generation structure(s) are executed, said code generation methods(s) create computer readable source code which is structured so as to have the capability to control a computer so as to implement functionality of said queries as defined in said validated Formal Language Specification by means of well-formed formulas of Filter Expressions that define filter patterns representing said queries such that objects that satisfy said formula of said Filter Expression pass the filter and objects that do not fulfill the condition do not pass said filter, and said computer readable source code also structured so as to have the capability to control a computer so as to implement functionality of said services as defined in said validated Formal Language Specification said functionality comprising:

at least a valuation formula for each variable attribute of each class in said validated Formal Language Specification, each said valuation associated to at least an event of said class, said valuations altogether defining the functionality of every event;

a transaction formula that defines a composition of services into a molecular execution unit, thereby defining functionality of every local transaction and global transaction;

state transitions to control the valid lives for objects of each class in said validated Formal Language Specification, upon occurrence of an event or a local transaction;

formulas that define optional preconditions to the execution of services; and formulas that define optional integrity constraints to prevent the execution of services from leaving the information managed by said application in an inconsistent or invalid state.

3. The process of claim 2 wherein the steps in step D comprise using said computer to automatically retrieve information from said Formal Language Specification the information retrieved being such as to create said code generation structures structured with data such that when said code generation method(s) of said code generation structure(s) are executed, said code generation methods(s) generate(s) computer readable source code which is structured to control a computer to allow a logged on user to interact with and execute the functionality of a query by defining a well-formed formula that defines a Filter Expression which defines how objects in a multi-object society are filtered as part of said query, said query capable of being carried out either independently or by a Class Population Presentation pattern type of user interface of a class of said application which defines which and how objects from the class are displayed, and wherein said source code is further structured to control said computer so as to provide a user interface mechanism to allow a user to provide content to construct a message containing parameters needed to construct said well-formed formula so as to define filter criteria used by said Filter Expression for a filter which is part of said Class Population Presentation pattern, and wherein said source code is further structured to control a computer so as to send said message so as to cause execution of said query embodied in said Filter Expression and display objects which pass said filter, said class queried being a class to which a user of said application has access, and wherein said computer readable source code is also structured to control a computer to display objects in said class which pass said Filter Expression in accordance with a display set and order criterion of a Population Selection pattern for said class which defines how properties of multiple objects of one class are presented to a user, and said source code being structured to control a computer to allow a user to select an object from said class from the objects displayed in accordance with said Class Population Presentation pattern, and, once an object is selected, said source code is structured to allow a user of said application to observe related instances, and know which services can be launched for a given object in its current state and display a visual component that a user can use to launch said services, and wherein said source code is also structured to control a computer to provide initialization arguments for object-valued arguments of said service to be launched, and check any input arguments entered by a user to launch said service so as to make sure input arguments entered by said user are valid data types for the arguments the data is intended to supply and that the input argument data entered by said user are within valid ranges for the arguments the user input data is intended to fill, and wherein said source code is structured to control a computer to check for dependencies between arguments of said service to be launched, and if a dependency exists and a user input triggers a dependency, said computer readable source code is structured to control a computer to display an appropriate form requesting the user to input data to satisfy the dependency and check that the data input by said user is a valid data type for said argument and within an acceptable range for said argument.

4. The process of claim 1 wherein said step B comprises using said computer to automatically retrieve data from said Formal Language Specification which is such as to create said code generation structures such that when said code generation method(s) of said code generation structure(s) are executed, said code generation methods(s) create computer readable source code which has the capability to control a computer to provide user interface access mechanisms which block access to potential users of said application such that only an "accountuser" can connect or log on to said desired computer program, said control being performed by requesting that a user wishing to log onto said desired computer program prove he or she is said "accountuser" by entering information that identifies a class of which said user is an instance, and also indicates information that identifies the user as an instance of said class so as to identify said user, and also indicates information that is used as a password for that user so as to authenticate said user.

5. The process of claim 1 wherein said step C comprises carrying out said translating by using a computer for automatically retrieving information from said Formal Language Specification so as to create said code generation structures such that when said code generation method(s) of said code generation structure(s) are executed, said code generation methods(s) creates computer readable source code which has the capability to control a computer to provide said view of the system in such a manner that said view of the system includes user interaction mechanisms included in Action Selection Presentation patterns associated with said view of the system for which said application is produced such that final actions objects defined in said Formal Language Specification may be viewed.

6. The process of claim 5 wherein step C comprises carrying out said translating by using a computer for automatically retrieving information from said Formal Language Specification to create said code generation structures each of which has a code generation method, and which, when said code generation method(s) of said code generation structure(s) are executed, said code generation methods(s) creates computer readable source code which has the capability to control a computer to restrict the user interface interaction mechanisms to the ones the user who logged on is allowed to interact with according to privileges established by data structures which relate the class said user belongs to, playing the role of agent, with classes, playing the role of servers, that determine which services of each server class will be available for execution by said user and which attributes of each server class said user will be able to query.

7. The process of claim 1 wherein step D comprises carrying out using said computer to automatically retrieve data from said Formal Language Specification which is such that when said code generation method(s) of said code generation structure(s) are executed, said code generation methods(s)

creates computer readable source code which has the capability to control a computer to provide user interface interaction mechanisms taking the form of Service Presentation patterns, Instance Presentation patterns, Class Population Presentation patterns, and Master-Detail Presentation patterns which allow a user who has logged on to interact with and access functionality of said application by invoking services, executing queries and/or execution of user interface interaction scenarios.

8. The process of claim 7 wherein step D comprises automatically retrieving information from said Formal Language Specification which is such as to create said code generation structures structured such that, when said code generation method(s) of said code generation structure(s) are executed, said code generation methods(s) create computer readable source code which has the capability to control a computer to provide user interface interaction mechanisms which allow a user who has logged in to interact with and access the functionality of said application by execution of only selected services selected from a group of services comprising events, local transactions and/or global transactions and wherein said selected services which said user who has logged on can invoke depend upon the identity of said user.

9. The process of claim 8 where the steps in step D of translating said Formal Language Specification comprises using a computer for automatically retrieving information from said Formal Language Specification to create said code generation structures which are structured such that when said code generation method(s) of said code generation structure(s) are executed, said code generation methods(s) generate computer readable source code which is structured to control a computer to allow a logged on user to execute an event which said logged on user has privileges to execute, said source code structured to control a computer to provide a mechanism to construct a message associated to said event and which will be sent to an object server implemented in said source code which executes said event.

10. The process of claim 9 wherein said step D comprises retrieving data which is such as to create said code generation structures which are structured such that when said code generation method(s) of said code generation structure(s) are executed, said code generation methods(s) generate computer readable source code which is structured to control a computer to provide a mechanism to construct said message associated to said event by performing the following steps:
  providing a mechanism to identify the class object on which the event will be executed, except if said event is a creation event, in which case this step will be omitted;
  providing mechanisms to give a value to every argument of said event, said mechanisms further controlling said computer such that arguments that require a value are provided a value and controlling said computer to provide restrictions and monitoring which are such that any argument whose value is provided is guaranteed to receive a valid value.

11. The process of claim 9 wherein said step D includes the steps of automatically retrieving information from said Formal Language Specification which is such as to create said code generation structures which are structured such that when said code generation method(s) of said code generation structure(s) are executed, computer readable source code is automatically generated which has the capability to control a computer to provide a mechanism to execute a service which is an event and by performing the following steps:
  controlling a computer to provide a mechanism to, except in the case of a creation event, verify the existence of said object on which said event will be executed, or the non-existence of the object to be created in the case of a creation event;
  controlling a computer to provide a mechanism to, except in the case of a creation event, recover the state of the object on which the event is executed from whatever memory or database or repository or any other persistence means (hereafter just "memory") to which said state of said object has been saved;
  controlling a computer to provide a mechanism to verify that, according to the state transition diagram of the class owning said event, there is a valid state transition labelled with said event being executed and for the agent class to which the user belongs who logged onto said application, in which case said mechanism will update the state of the object on which the event is executed according to said state transition diagram, and if there is no valid state transition, said mechanism will produce an error message causing the execution of the event to stop and roll back all changes made to the state of the object on which said event is executed;
  controlling a computer to provide a mechanism to verify that every precondition that is defined for said event being executed and for said agent class to which the user logged on to the computer application belongs, is satisfied, and should any of said preconditions not be satisfied, then said mechanism will produce an error with the error message being predefined for said precondition that does not hold causing the execution of the event to stop and roll back all changes made to the state of said object on which said event is executed;
  except in the case of creation events or destruction events, controlling a computer to provide a mechanism to produce the changes of values to the variable attributes of said class owning said event for which valuation formulas in said functional model have been defined such that said valuations relate said variable attributes with the event being executed, and wherein said mechanism applies only the changes to the variable attributes which are required by valuation formulas of valuations whose valuation condition formula evaluates to true, if any, or the change required by a valuation formula of a valuation having no valuation condition formula;
  in the case of a creation event, controlling a computer to provide a mechanism to assign a value to every constant or variable attribute of an object on which said creation event is executed and establishing relationships between said object on which said creation event is executed with objects of classes related with the class owning said creation event;
  in the case of a destruction event, controlling a computer to provide a mechanism to delete relationships of the object on which said destruction event is executed with objects said object is related to;
  except in the case of destruction events, controlling a computer to provide a mechanism to check that every integrity constraint define d in the class owning said event is satisfied, for the object whose state has been changed by said event, and should any of said integrity constraints not be satisfied, said mechanism will produce an error with the error message predefined for said integrity constraint that does not hold, said mechanism causing the execution of the event to stop and roll back all changes made to the state of the object on which the event is executed;

except in the case of a destruction event, controlling a computer to provide a mechanism to save the changes made to said object on which the event is executed to memory;

in the case of a destruction event, controlling a computer to provide a mechanism to delete the object on which said destruction event is executed from memory to which said object has been saved;

except in the case of a destruction event, controlling a computer to provide a mechanism to check every trigger condition on said object on which said event is executed for every trigger relationship defined on said class owning said event, and wherein for every trigger condition that holds, a mechanism to execute the service associated to said trigger relationship by:

provide a mechanism to determine the set of objects on which said service associated to said trigger will be executed, and executing said service on every object of said set of objects by:

giving a value to every argument of said service, and ensuring that every argument that requires a value is provided a value and that any argument whose value is provided receives a valid value; and invoking the execution of said service on said object; and controlling a computer to provide a mechanism to inform the requestor of the result of executing the event.

12. The process of claim 8 where the steps in step D comprise using a computer for automatically retrieving information from said Formal Language Specification which is such as to create said code generation structures which are such that, when said code generation method(s) of said code generation structure(s) are executed, computer readable source code is generated which controls a computer to provide a mechanism to construct a message associated to said local transaction which contains the arguments needed by the services comprising said local transaction and to send said message to one or more object servers which serve to execute said local transaction.

13. The process of claim 12 wherein the steps in step D comprise using a computer for automatically retrieving information from said Formal Language Specification which is such as to create said code generation structures which are structured such that when said code generation method(s) of said code generation structure(s) are executed, said code generation methods(s) generate computer readable source code which controls a computer to provide a mechanism to construct said message associated to the local transaction by performing the following steps:

providing a mechanism to identify the object on which said local transaction will be primarily executed, except if said transaction is a creation service, in which case this step will be omitted;

providing mechanisms to give a value to every argument of said local transaction, said mechanisms further controlling said computer such that restrictions and monitoring are implemented such that arguments that require a value are provided a value and that any argument whose value is provided is guaranteed to receive a valid value.

14. The process of claim 12 wherein said step D comprises using a computer for automatically retrieving information from said Formal Language Specification to create said code generation structures which are structured such that when said code generation method(s) of said code generation structure(s) are executed, said code generation methods(s) generate computer readable source code which has the capability to control a computer to execute a service which is a local transaction by performing the following steps:

providing a mechanism to, except in the case of a creation service, verify the existence of the object on which the local transaction will be executed or, in the case of a creation service, verify the non-existence of the object to be created;

except in the case of a creation service, providing a mechanism to recover the state of the object on which the local transaction is executed from memory to which the state of said object has been saved;

providing a mechanism to verify that, according to a state transition diagram of the class owning said local transaction, there is a valid state transition labelled with said local transaction being executed and for an agent class to which the user logged on to the system belongs, and, if there is such a valid state transition, said mechanism will update the state of the object on which the local transaction is executed according to said state transition diagram, and, if there is no such valid state transition, said mechanism will produce an error message causing the execution of said local transaction to stop and roll back all changes made to the state of said object on which the local transaction is executed and of any other object the state of which has been modified by the execution of said local transaction;

providing a mechanism to verify that every precondition that is defined for the local transaction being executed and for the agent class to which the user logged on to the system belongs, is satisfied, and should any of said preconditions not hold, then said mechanism will produce an error with the error message defined for said precondition that does not hold causing the execution of said local transaction to stop and roll back all changes made to the state of the object on which said local transaction is executed and of any other object the state of which has been modified by the execution of said local transaction;

for every service comprised in the transaction formula of said local transaction being executed:

if said service has an associated guard, controlling a computer to provide a mechanism to check that said guard associated to said service holds; and if said guard does not hold, the rest of the steps associated to said service will be omitted;

controlling a computer to provide a mechanism to determine the set of objects on which said service comprised in said transaction formula will be executed and to provide a mechanism to execute said service on every object of said set of objects by:

providing mechanisms to give a value to every argument of said service, said mechanisms further ensuring that arguments that require a value are provided a value and that any argument whose value is provided receives a valid value;

providing a mechanism to invoke the execution of said service on said object and control the result of said execution, and should said execution result in an error, causing the execution of the local transaction to stop and roll back all changes made to the state of said object on which the local transaction is executed and of any other object the state of which has been modified by the execution of said local transaction controlling a computer to provide a mechanism to check that every integrity constraint holds which is defined in the class owning the local transaction and in classes whose instances include objects the state of which has been modified by the execution of said local transaction, for any object whose state has been changed by said local transaction, and, should any of said integrity constraints not hold, said mechanism produces an error with an error message defined for said integrity constraint that does not hold and causing the execution of said local transaction to stop and roll back all changes made to the state of the object on which the local transaction is executed and of any other object the state of which has been modified by the execution of said local transaction;

controlling a computer to provide a mechanism to check every trigger condition on any object the state of which has been modified by the execution of said local transaction, for every trigger relationship defined on each class owning an object the state of which has been changed by execution of said local transaction, and for every trigger condition that holds, a mechanism to execute the service associated to said trigger relationship by:

providing a mechanism to determine the set of objects on which said service associated to said trigger will be executed, and providing a mechanism to execute said service on every object of said set of objects by:

giving a value to every argument of said service, and ensuring that every argument that requires a value is provided a value and that any argument whose value is provided receives a valid value; and invoking the execution of said service on said object; and controlling a computer to provide a mechanism so as to inform the requestor of the result of executing said local transaction.

15. The process of claim 8 wherein the steps in step D comprise using a computer for automatically retrieving information from said Formal Language Specification to create said code generation structures which are structured such that, when said code generation method(s) of said code generation structure(s) are executed, said code generation methods(s) generate computer readable source code which controls a computer to allow a logged on user to interact with and execute the functionality associated to a global transaction by providing a mechanism to construct the message associated to said global transaction and send said message to one or more object servers to execute said global transaction.

16. The process of claim 15 wherein the steps in step D comprise using a computer for automatically retrieving information from said Formal Language Specification which is such as to create said code generation structures which are structured such that, when said code generation method(s) of said code generation structure(s) are executed, said code generation methods(s) generate computer readable source code which controls a computer to provide mechanisms to give a value to every argument of said global transaction, said mechanisms further controlling said computer such that restrictions and validity checking are performed on the supplied values such that arguments that require a value are provided a value and that any argument whose value is provided is guaranteed to receive a valid value.

17. The process of claim 15 wherein said step D comprises using a computer to automatically retrieve data from said Formal Language Specification for storage in said code generation structures, said data being such as to structure said code generating structures so as to generate computer readable source code which is structured to control a computer to execute a service which is a global transaction by performing the following steps:

controlling a computer to provide a mechanism to verify that every precondition that is defined for the global transaction being executed and for the agent class the user logged on to the system belongs to, is satisfied, and should any of said preconditions not hold, then said mechanism will produce an error and display an error message which has a predefined message with content which is determined by said precondition that does not hold, and said source code being structured to control said computer to stop execution of said global transaction and reverse all changes made to any object the state of which has been modified by execution of said global transaction;

for every service included in a transaction formula that defines the services and arguments that comprise said global transaction being executed:

if said service has an associated guard or control condition, said source code is structured to control a computer to provide a mechanism to check that said guard associated to said service holds, and if said guard does not hold, the rest of the steps required to be carried out as part of execution of said service will be omitted;

controlling a computer to provide a mechanism to determine the set of objects on which said service will be executed and to execute said service on every object of said set of objects by performing the following steps:

give a value to every argument of said service, and controlling said computer to implement restrictions and monitoring to ensure that arguments that require a value are provided a value and that any argument whose value is provided is guaranteed to receive a valid value;

controlling a computer to build a message containing the arguments needed by said service and to send said message to an object server which executes said service so as to invoke the execution of said service on said object and control the result of said execution, and should said execution result in an error, controlling said computer to stop the execution of said global transaction and reverse all changes made to the state of any object the state of which has been modified by the execution of said global transaction;

controlling a computer to check that every integrity constraint still holds for every integrity constraint that is defined in classes whose instances include objects the state of which might have been modified by the execution of said global transaction, for any object whose state has been changed by said global transaction, and should any of said integrity constraints not hold, controlling a computer to generate an error and display an error message which has been predefined for said integrity constraint that does not hold and controlling said computer to stop execution of said global transaction and reverse all changes made to any object the state of which has been modified by execution of said global transaction;

controlling a computer to check every trigger condition on any object the state of which has been modified by execution of said global transaction, and, for every trigger condition that holds, controlling a computer to execute the service defined by said trigger by performing the following steps:

controlling a computer to determine a set of objects upon which said service defined by said trigger will be executed, and a controlling a computer to execute said service on every object of said set of objects by:

controlling a computer to give a value to every argument of said service, and implementing restrictions and monitoring to ensure that every argument that requires a value is provided a value and that any argument whose value is provided is guaranteed to receive a valid value; and controlling a computer to construct a message containing said arguments and send it to an object server capable of carrying out said service thereby invoking the execution of said service on said object;

and controlling a computer to provide a mechanism so as to display or otherwise indicate the result of executing said global transaction.

18. The process of claim 1 wherein said step D comprises using a computer for automatically retrieving information from said Formal Language Specification which is such as to create said code generation structures having data stored therein which causes said code generation method(s) of said code generation structure(s) to generate computer readable source code for said application which is structured to control a computer to perform the following steps:

providing a mechanism in the form of a displayed graphic item such as a dialog box showing the filter conditions a user has the option to set to define a well-formed formula which defines a Filter Expression for a query said user of said application wants said application to execute;

controlling a computer to receive a value supplied by a user for every filter variable which can be set by a user, said filter variables which can be set by a user being part of said well-formed formula defining the search criteria represented by said Filter Expression said filter variables representing the query desired by said user, said computer readable source code also structured to further control said computer such that filter variables that require a value are provided a value either automatically from data in said Formal Language Specification or from data supplied by said user, and to further control said computer such that any filter variable whose value is provided by a user of said application is required by said application to receive a valid value and to reject any invalid value thereby forcing said user to supply a valid value;

providing a user interface mechanism to allow a user to select a desired Display Set user interface pattern controlling what information is displayed from objects that pass said Filter Expression as a result of performing said query and displaying a visual component that shows objects that fulfil the filter condition expressed in said well-formed formula represented by said Filter Expression;

controlling a computer to display a user interface mechanism such as selection options in a dialog box to allow a user to select user interface patterns to use in supplying values to filter variables to define said well formed formula defining said Filter Expression, if any, to be used by said application in performing said query including edit-masks and range-value restrictions in an Introduction Patterns and a Defined Selection pattern with specified sets of pre-specified valid values from which filter variables may be selected;

controlling a computer to display a visual component to show objects that pass the filter of said Filter Expression or all the population of the class upon which said query is executed if no Filter Expression is defined and in use where the attributes displayed in said visual component are established by said Display Set user interface pattern selected by said user of said application.

19. The process of claim 1 wherein said step D comprises using a computer to automatically retrieve information from said Formal Language Specification so as to create code generation structures structured with data from said Formal Language Specification which is such that, when said code generation method(s) of said code generation structure(s) are executed, said code generation methods(s) generate computer readable source code which is structured to control a computer to provide a mechanism to execute a query represented by a well-formed formula which defines a Filter Expression by performing the following steps:

controlling a computer to provide a Class Population Presentation pattern user interface to display the population of instances of the class owning said Filter Expression;

controlling a computer to provide a user interface mechanism to display instances of said population of said class which satisfy the condition(s) stated in said well-formed formula that defines said Filter Expression; depending on the values assigned to every filter variable of said Filter Expression;

controlling a computer to provide a user interface mechanism in the form of a Population Selection pattern having said Filter Expression and a display set as part thereof, said Display Set controlling which part is displayed of the state of every instance of said class which satisfy said condition(s) stated by said well-formed formula of said Filter Expression owned by said class and which is part of said Population Selection pattern user interface defined for said class, said part of said state which is displayed being controlled by said Display Set which was selected in said message constructed by said computer as a response to input data entered by said user in filling out said query/selection form, said part of said state dictated by said Display Set being further constrained to the attributes said user logged onto said application is allowed to query;

controlling a computer to display the instances of said population of said class owning said Filter Expression which fulfil said condition stated by said well-formed formula that defines said Filter Expression, the nature of said display defined by said Population Selection Pattern and, if an Order Criteria has been selected by said message as part of said Population Selection Pattern, displaying said instances of said population which fulfil said condition stated by said Filter Expression in the order stated by said Order Criteria pattern.

20. The process of claim 1 wherein step D comprises using said computer to automatically retrieve data from said Formal Language Specification and storing said data in said code generation structures so as to create code generation structure which are structured such that said code generation methods(s) generate computer readable source code of said application which is structured to control a computer to provide user interface interaction mechanisms which allow a user who has logged on to said application to execute services of classes of objects created by said application which said user has privileges to access and to execute queries on said classes of objects which said user has privileges to access, said execution of services and queries carried out by said user by interacting with one or more user interfaces in the form of Service Presentation patterns which controls how a service will obtain data from said user using said computer, Instance Presentation patterns each of which controls how properties of objects in a class owning said Instance Presentation pattern will be presented to said user, Class Population Presentation patterns each of which control how the properties of multiple objects of a class owning said Class Population Presentation pattern will be presented to said user and/or Master/Detail Presentation patterns which control how an object will be displayed which is related to other related objects that complete the full detail of the object, and wherein step D further comprises using a computer to automatically write computer readable source code structured to control a computer executing said application to display an application main form containing a menu showing the services a user who has logged onto said application has access to and can execute, said computer readable source code also structured to control said computer such that when a user requests to activate a service and supplies arguments needed by said service, said computer automatically validates service arguments entered by said user, and, if said service arguments are found to be valid, said source code is structured to control said computer so as to automatically build a message to supply said validated services arguments to the appropriate object server which executes said service, said object server being part of system logic implemented by said source code of said application, said object server functioning to carry out said service, and wherein said computer readable source code is also structured to control said computer executing said service to inform said user of said application whether said service execution succeeded or failed, and for each said service, said computer readable source code is structured to control a computer to carry out said step of validation of said service arguments by displaying a service form which points to the appropriate object server to carry out said service and which has an introduction field for each argument the user must provide, and controlling said computer to carry out said step of validating said service arguments by validating data types, sizes, value-ranges and nulls in user input data entered by said user to fill in service arguments, and wherein said automatically generated computer readable source code is also structured to control said computer to search object browsing information and filter said object browsing information for object-valued fields.

21. The process of claim 20 wherein the steps in step D of translating said validated formal language specification to generate computer readable source code include steps of using a computer to automatically extract the necessary information from said Formal Language Specification so as to structure said code generation structures such that when said code generation method(s) of said code generation structure(s) are executed, computer readable source code is generated which is structured to control a computer to allow a logged on user to interact with an interaction scenario corresponding to said Master/Detail Presentation Pattern so as to query information on:
  instances belonging to the class owning said Master/Detail Presentation Pattern as presented in a Presentation Pattern which is either an Instance Presentation Pattern or a Class Population Presentation Pattern owned by the same class owning said Master/Detail Presentation Pattern, and
  instances belonging to other classes related to said class owning said Master/Detail Presentation Pattern, each set of related instances as presented by a Presentation Pattern, which is either an Instance Presentation Pattern, or a Class Population Presentation Pattern, or a Master/Detail Presentation Pattern owned by said class related to said class owning said Master Presentation Pattern,
said steps of translating comprising the steps of:
  translating said validated formal language specification so as to provide computer readable source code which is structured to control a computer to provide a mechanism to identify said Master/Detail Population Presentation Pattern by its alias;
  translating said validated formal language specification so as to provide computer readable source code which is structured to control a computer to provide a mechanism to present said user any help message associated with said Master/Detail Presentation Pattern;
  translating said validated formal language specification so as to provide computer readable source code which is structured to control a computer to provide a mechanism to present said user a master interaction unit in which a single object is displayed or in which a collection of objects is displayed from which the user can select one of the displayed objects, the details of the display of said single object or said collection of objects controlled respectively by an Instance Presentation Pattern of said Master/Detail Presentation Pattern or by a Class Population Presentation Pattern of said Master/Detail Presentation Pattern;
  translating said validated formal language specification so as to provide computer readable source code which is structured to control a computer to provide a mechanism to present said user with one or more detail interaction units in which are displayed objects related to said object displayed and/or selected in said master interaction unit, the details of said objects displayed in said detail interaction units being controlled each by an Instance Presentation Pattern or a Class Population Presentation Pattern or a Master-Detail Presentation Pattern;
  translating said validated formal language specification so as to provide computer readable source code which is structured to control a computer to provide a mechanism to synchronize information displayed in every detail interaction unit whenever:
    the object displayed in said master interaction unit changes when said master interaction unit is an Instance Presentation Pattern, or
    the selection of one of the objects displayed in said master interaction unit changes when said master interaction unit is a Class Population Presentation Pattern;
  translating said validated formal language specification so as to provide computer readable code which is structured to control a computer to provide a mechanism to cancel the interaction of the logged on user with the interaction units presented by said Master/Detail Presentation Pattern.

22. The process of claim 20 wherein the steps in step D of translating said validated Formal Language Specification comprise using a computer to automatically extract requirements data from said Formal Language Specification and store said extracted requirements data in code generation structures in memory of a computer, said extracted requirements data including, for each service which a user who has successfully logged on can launch:
  a service to generate;
  a service class;
  an arguments list for said service;
and, for generation of a query/selection form for each class:
  the class and its properties including its alias;
  a list of the Population Selection interface patterns defined for the class, each said Population Selection interface pattern containing a Display Set, a Filter Expression and a sort criterion;
  relationships of the class;
said extracted requirements data structuring said code generation structures such that when said code generation method(s) of said code generation structure(s) are executed, said extracted requirements data is plugged into blanks in source code templates stored in said code generation structures so as to generate computer readable source code which is structured to control a computer to allow a user to:
  query information on a set of objects in a class,
  launch services on any object in said set of objects, and navigate to other related objects related to a selected object of said set of objects, and wherein said source code also being structured to control a computer to allow a user to perform the above noted operations by interaction with an Application Main Form which is a menu where a user who has successfully logged on can view the services he or she is allowed to launch, said source code also being structured to control a computer to implement each action a user can request from said Application Main Form, said source code also structured to iterate through the services defined in said application computer program and determine the services a user who has logged onto said application computer program can launch, and then generate said Application Main Form as an access hierarchy and convert said access hierarchy to menu bars, http pages or any other structure which allows browsing so as to create an access tree wherein, for each class, a tree item is displayed labelled with the alias of said class, said tree item having descendant menu items which can be selected by said user which include:

a menu item labelled "query" which, when selected, causes said computer to display said query/selection form with a filter having filter variables a user can set to define filter criteria so as to restrict objects from said class which will be displayed in a Service Form;

a menu item for each service of said class which said logged on user can launch, said menu item labelled with the service alias; and in the case of an inheritance relationship with other classes, a menu item is displayed with for each direct subclass labelled with the subclass alias;

and wherein said source code is also structured to control a computer to generate a Service Form for every service a user who has successfully logged on can launch, said Service Form functioning to, inter alia, locate and point to object server code which is structured to control a computer to execute said service and comprising a graphic part and a functional part, said source code of said Service Form structured to control a computer to:

display said graphic part of said Service Form with a widget attached to each service argument that needs user input to receive data for said service argument from said user, and a pair of widgets to launch said service or cancel the service launch;

implement said functional part as event-drivers for said widgets to receiver data for said service arguments from said user and to launch or cancel the launch of said service;

one or more processes to initialize the properties of said widgets with default values by initial default values input by a designer when said Conceptual Model was being designed, by context where object-valued arguments are set with values by search for appropriate values in a recently visited objects list or by Dependency Pattern defined by said Designer such that the value of one service argument determines the value of another service argument;

one or more processes to validate any values for said service arguments introduced by said user to ensure the data type, size and value range are correct and, if a particular service argument is a null, determine whether a null is acceptable for that service argument, and display an error message if any service argument does not pass validation;

one or more processes to build a message including said service arguments that have been validated and send said message to object server code pointed to by said Service Form which is structured to control a computer to execute said service and invoke said object server code into execution thereby launching said service; and report back to said user the results of execution of said service and display an error message if an error occurred.

23. The process of claim 20 wherein step D comprises using said computer to automatically retrieve data from said Formal Language Specification and storing said data in said code generation structures so as to create code generation structures which are structured such that said code generation methods(s) generate computer readable source code of said application which is structured to control a computer to provide user interface interaction mechanisms which allow a user who has logged on to said application to query information on an instance of a class, execute services on said instance and/or navigate to interaction scenarios displaying information related with said instance, by interaction with an Instance Presentation Pattern of the class owning said instance, said source code structured to control said computer to carry out steps including:

controlling said computer to provide a mechanism to identify said Instance Presentation Pattern by its alias;

controlling said computer to present a help message, if any, associated with said Instance Presentation Pattern;

controlling said computer to provide a mechanism to present said user with the value of each element in the Display Set Pattern of said Instance Presentation Pattern, each element identified by the alias of said element and presented in the order dictated by said Display Set Pattern, said elements being further restricted to those elements that correspond to attributes the logged on user is allowed to query;

controlling said computer to provide a mechanism to access each user interface interaction scenarios corresponding to each service that can be executed on the object displayed by said Instance Presentation Pattern, each of said services identified by the alias of the Service Presentation Pattern corresponding to each of said services, said services being further restricted to the ones the logged on user is allowed to execute;

controlling said computer to provide a mechanism to present said user with a help message associated with each service, if any, executable on said object displayed by said Instance Presentation Pattern;

controlling said computer to provide a mechanism to access each user interface interaction scenario corresponding to each class, if any, owning instances related with the instance belonging to the class owning said Instance Presentation Pattern, each of said user interface interaction scenarios being identified by the alias of its corresponding Presentation Pattern, said user interface interaction scenarios being further restricted to the ones corresponding to classes said logged on user is allowed to query;

controlling said computer to provide a mechanism to present said user with any help message associated with each of said user interface interaction scenarios corresponding to each class, if any, owning instances related with instance belonging to the class owning said Instance Presentation Pattern;

and controlling said computer to provide a mechanism to cancel the interaction of the logged on user with the user interface interaction scenario represented by said Instance Presentation Pattern.

24. The process of claim 20 wherein step D comprises using said computer to automatically retrieve data from said Formal Language Specification and storing said data in said code generation structures so as to create code generation structures which are structured such that said code generation methods(s) generate computer readable source code of said application structured to control a computer to provide user interface interaction mechanisms which allow a user who has logged on to said application to allow a logged on user to query information on a set of instances of a class, execute services on any instance in said set and or navigate to interaction scenarios displaying information related with any said instance of said set, all by interaction with a Class Population Presentation Pattern of the class owning said set of instances, said source code structured to control said computer to carry out steps including:

controlling said computer to provide a mechanism to identify said Class Population Presentation Pattern by its alias;

controlling said computer to provide a mechanism to present any help message associated with said Class Population Presentation Pattern;

controlling said computer to provide a set of mechanisms to obtain and display a set of instances of the class owning said Class Population Presentation Pattern, comprising:

a mechanism to identify the Filter Pattern, if any, associated with said Class Population Presentation Pattern;

a mechanism to identify and select one of the Order Criterion Patterns, if any, associated to said Class Population Presentation Pattern;

a mechanism to identify each filter variable, if any, of said Filter Pattern, if any, associated to said Class Population Presentation Pattern, said identification by the alias of each of said filter variables, and to present said filter variables to said user in the order they are defined in said Filter Pattern;

a mechanism to present said user a default value, if any default value exists in said Formal Language Specification, of each filter Variable, if any, of said Filter Pattern, if any, associated to said Class Population Presentation Pattern;

a mechanism to let said user provide a value for each filter variable, if any, of said Filter Pattern, if any, associated to said Class Population Presentation Pattern;

a mechanism to validate the value assigned to each filter variable by said user, if any value is assigned to a filter variable, of said Filter Pattern, if any, associated to said Class Population Presentation Pattern, said validation carried out according to:

the data type of said filter variable;

what is dictated by the Introduction Pattern, if any, associated to said filter variable;

a mechanism to access an objects selection mechanism corresponding to a Population Selection Pattern which defines the process of observing and selecting objects in a multiple objects society, said Population Selection Pattern being associated to every object valuated filter variable, if any, of said Filter Pattern, if any, associated to said Class Population Presentation Pattern;

a mechanism to present said user with a help message, if any, associated to each filter variable, if any, of said Filter Pattern, if any, associated to said Class Population Presentation Pattern;

a mechanism to present said user with elements in any Display Set Pattern assigned as a Supplementary Information Pattern to every object valuated filter variable, if any, of said Filter Pattern, if any, associated to said Class Population Presentation Pattern, whenever the value of said object valuated filter variable changes;

a mechanism to invoke execution of a query represented by said Filter Pattern, if any, associated with said Class Population Presentation Pattern so as to retrieve objects of said class owning said Class Population Presentation Pattern which satisfy the search criteria of said Filter Pattern, or to invoke retrieval of the full population of said class owning said Class Population Presentation Pattern where no Filter Pattern is present;

controlling said computer to provide a mechanism to display the value of each element, for every instance in the population of said class owning said Class Population Presentation Pattern, or to display the value for every instance of said class returned as a result of executing said query represented by said Filter Pattern, if any, associated with said Class Population Presentation Pattern, each element so displayed being a member of a Display Set Pattern associated to said Class Population Presentation Pattern, each element the value of which is displayed being restricted to those elements corresponding to attributes the logged on user is allowed to query;

controlling a computer to provide a mechanism for said user to select one of the objects or instances presented to the user by said Class Population Presentation Pattern as a result of a query that returns some or all of the instances of said class owning said Class Population Presentation Pattern;

controlling a computer to provide a mechanism to, upon selection of one of said objects presented by said Class Population Presentation Pattern, access each of said user interface interaction scenarios corresponding to each service that can be executed on said selected object, each of said services identified by the alias of the Service Presentation Pattern corresponding to each of said services, said services further restricted to the services the logged on user is allowed to execute;

controlling a computer to provide a mechanism to present said user with any help message associated with each service executable on said selected object;

controlling a computer to provide a mechanism to, upon selection of one of said objects presented by said Class Population Presentation Pattern, access each of said user interface interaction scenarios corresponding to each class, if any, owning instances related with said selected object of said class owning said Class Population Presentation Pattern, each of said user interface interaction scenarios being identified by the alias of its corresponding Presentation Pattern, said user interface interaction scenarios being further restricted to the ones corresponding to classes said logged on user is allowed to query;

controlling said computer to provide a mechanism to present said user any help message associated with each of said user interface interaction scenarios corresponding to each class, if any, owning instances related with said selected object of said class owning said Class Population Presentation Pattern; and controlling said computer to provide a mechanism to cancel the interaction of the logged on user with the interface interaction scenario represented by said Class Population Presentation Pattern.

25. The process of claim 1 wherein the steps in step D of translating said validated formal language specification comprise using a computer for automatically retrieving information from said Formal Language Specification which structures said code generation structures such that when said code generation method(s) of said code generation structure(s) are executed, computer readable source code is generated which is structured to control a computer to allow a user to invoke execution of a service by presenting to a user an activation service form which allows a user to supply argument data, the format of said activation service form dictated by a Service Presentation Pattern owned by said service to be activated, said source code structured to control said computer to carry out steps including:

controlling said computer to provide a user interface mechanism allowing a user to identify a Service Presentation Pattern by its alias;

controlling a computer to provide a mechanism to present a help message which is part of said Service Presentation Pattern to said user interacting with said Service Presentation Pattern to help said user fill in arguments needed by the service to be executed;

controlling a computer to display or otherwise present information allowing a user to identify each argument of said service owning said Service Presentation Pattern by the alias of each said argument of said service;

controlling a computer to display a service activation form to present to a user information identifying each argument needed for execution by said service owning said Service Presentation Pattern and presenting said arguments in an order and in groups dictated by an Arguments Grouping Presentation pattern (if any);

controlling a computer to receive and store input data entered by said user interacting with said service activation form so as to provide a value for each argument of said service to be executed;

controlling a computer to ensure that every argument of said service associated with said Service Presentation Pattern that requires a value has received a value and controlling said computer to validate every value of an argument that has a value to ensure that said value has a valid data type and is within a valid range, said data type and valid ranges dictated by an Introduction Pattern, if any, associated with each said argument;

controlling a computer to automatically fill in default values for arguments on said service activation form so as to present the user with the default value, if any, of every argument of said service owning said Service Presentation Pattern;

controlling a computer to provide a mechanism to allow a user to access an object and invoke said object's selection mechanism to select it, which objects are displayed for selection, which data is displayed from each object displayed, and how displayed objects are ordered being controlled by a Population Selection Pattern;

controlling a computer to provide a mechanism to present said user with a help message, if any, associated to every argument of a service said user wishes to invoke which has a Service Presentation Pattern;

controlling a computer to provide a mechanism to allow event-condition-action rules of Dependency Patterns which allow specification of dependency rules between arguments in services, if any dependencies exist, said mechanism allowing said Event-Condition-Action rules to be defined as a Dependency Pattern for every argument of the service owning said Service Presentation Pattern, said source code structured to control a computer to implement each said Dependency Pattern by:

monitoring for the occurrence of events relevant to every said argument, which either changes the value of said argument or activates/deactivates said argument;

controlling a computer when an argument is either changed, activated or de-activated by an event so as to check that the condition of an Event-Condition-Action (hereafter ECA) rule of said Dependency Pattern holds, and if said condition holds, controlling said computer to execute the actions in said ECA rule of said Dependency Pattern to assign a value and/or activate and/or deactivate other arguments of the service associated to said Service Presentation Pattern;

controlling a computer to display information associated to object valuated arguments, said information dictated by a Display Set Pattern, if any, assigned as a Supplementary Information Pattern to every object valuated argument of said service associated with said Service Presentation Pattern, whenever the value of said argument changes;

controlling a computer to provide a mechanism to allow a user to cancel interaction of said user with a service activation form presented by said Service Presentation Pattern;

controlling a computer to provide a mechanism to confirm and send said message constructed automatically by said computer with validated argument values provided by said user via interaction with said service activation form, sending of said message to an object server pointed to my said service activation form causing said service owning said Service Presentation Pattern to execute.

26. The process of claim 1 wherein the translating steps in step D further comprise retrieving information from said Formal Language Specification, said retrieved information being stored in said code generation structures so as to create code generation structures which are structured such that execution of code generation methods of said code generation structures generates computer readable source code which is structured to control a computer to allow a logged on user to execute one or more services of an instance of a class said logged on user is allowed to access and/or navigate to displays displaying information pertaining to other objects related with said instance of said class, said source code generated by execution of said code generation methods of said code generation structures being structured to control a computer to perform the following steps:

display an Application Main Form containing a menu of services of objects or instances of said classes to which a user who has logged onto said application has privileges to access and services of which said user has privileges to execute, and, for each class the user who has logged on can access, generating and displaying a Query/Selection Form which allows said logged on user to query data instances of said class, search instances that fulfill a given filter condition, select objects of a class, and, for each selected object, observe instances related to said selected object and know which services for a given object said user has privileges to launch, and wherein, more specifically, said Query/Selection form having a visual component to show objects of a class which satisfy filter condition(s) set by said user with the attributes of said objects which are displayed determined by a Display Set user interface pattern selected and articulated by said designer, said Query/Selection form for each said class said user who logged in can access also having graphic items representing filters which have fields a user can fill in to supply filter criteria to allow said logged on user to filter objects in said class which will be displayed in said visual component, said Query/Selection form visual component allowing said user to control said computer to select an object that satisfies filter criteria, if any, and display services which said user can launch, and launch a service of a selected object said user requests to be launched, and said Query/Selection form visual component displaying links which allow a user to navigate to other data items related to the selected object thereby causing another Query/Selection Form to be displayed, said source code structured to control said computer to receive data regarding the previous object so that only data related to the initial object is displayed;

for each service said user can launch, locate appropriate object server code in system logic code which has been automatically generated, said object server code being code which can control a computer to carry out said service, said source code also structured to control a computer to generate and display a Service Form that points to said object server code which can perform said service, said Service Form having an introduction field for each argument said user must provide to execute said service;

supply initialization default values from said Formal Language Specification and/or values supplied by context from a recently visited objects list for some or all arguments if said designer has entered default values and/or if context values can be obtained, and/or receive user supplied values for some or all arguments needed to execute said service, and, if said user has supplied values for some or all of said arguments, check the user supplied values for each argument to ensure the data type and size is correct, the value is within an acceptable range for said argument and whether or not a null value is acceptable, and display a warning to said user if an argument's value fails any validation check;

check dependencies between arguments, and, if a dependency is found to exist, display a form requesting said user to input data to satisfy said dependency and validate said data input by said user to ensure it has a valid data type, a proper size, and is within an acceptable range and whether a null value is acceptable if null;

once all service arguments have been validated, and dependencies satisfied, send a message containing said service arguments to said object server code so as to launch said service; and wait for results from execution of said service, and display an error message if an error has occurred, otherwise wait for further user input.

27. A translation process using a computer to automatically convert a Formal Language Specification into working source code for a user interface of an application computer program defined in said Formal Language Specification comprising the steps of:

controlling a computer to generate the following source code files which are structured to control a computer to implement the desired user interface including:

final source code files of fixed content corresponding to structures or auxiliary functions which are widely used and always produced in the same way regardless of the content of said Formal Language Specification including headers, definitions, constants;

source code files which control a computer to implement auxiliary widgets including controls and JavaBeans, said auxiliary widgets and JavaBeans which are produced depending upon the application defined in said Formal Language Specification;

for every class defined in said Formal Language Specification:
one or more source code files which control a computer to implement a query/selection form,
one or more source code files which control a computer to implement an instance selection component,
one or more source code files which control a computer to implement a specialization component if said class is specialized, and
one or more source code files which control a computer to implement a service form if said class is a service class;

one or more source code files which control a computer to implement an access form that can receive a user name and password and check the entered data for validity for purposes of identification of a user attempting to log onto said application computer program and use it;

one or more source code files which control a computer to implement a main form presenting a menu of services a user who has successfully logged on has privileges to access and invoke; and one or more source code files which control a computer to implement a communication function to send messages to object server code for each service a logged on user can access, said communication function source code controlling a computer to supply argument default values for a service to be launched and solicit argument values from said user for said service to be launched and validate arguments values supplied by said user to be the correct data type, size and within a valid range and, if null, determine whether or not a null value is acceptable, and notify said user if an argument value fails any validation test, said communication function also structured to control a computer to send all arguments needed to execute a service said user has indicated a desire to invoke to appropriate object server code which is capable of controlling a computer to execute said service.

28. An apparatus comprising:
a general purpose computer having as part thereof a memory, a display, a keyboard and a pointing device and having a validated Formal Language Specification stored in memory, said computer programmed with:
an operating system program loaded into and controlling operation by said computer to carry out instructions of other computer programs;
a translator program cooperating with said operating system program to control operation of said computer to automatically extract requirements data from said validated Formal Language Specification and store said requirements data in code generation translation structures in memory of said computer wherein each code generation translation structure is an object in memory of said computer in the form of an instance of a class of objects which is designed to create source code of a predetermined type and can store requirements data extracted from said formal language specification which is needed to generate source code of said predetermined type and which also stores a source code template to generate source code of said predetermined type, and wherein each said code generation translation structure also has a code generation method which functions to automatically plug requirements data stored in said translation structure object into appropriate blanks of said source code template and automatically output source code of said predetermined type which has been automatically customized by requirements data automatically extracted from said validated Formal Language Specification, and wherein said translator program cooperates with said operating system to create a code generation class object in said memory of said computer which has methods to automatically keeps track of the code generation translation structures which have been created in said memory of said computer and call said code generation methods of said code generation translation structures in the proper order to generate finished source code for said application program which is executable and complete and not a prototype and with functionality to access a database and having a complete user interface.

29. A process for using a computer to automatically validate a Formal Specification encoding a Conceptual Model of an application computer program being designed by a designer, comprising the steps:
A) using a computer to automatically ensure that said Formal Specification is complete, said Formal Specification being written in formal language having a grammar comprised of rules of syntax and semantics which define how statements in said Formal Specification must be structured and what they mean, said computer executing a validation program that uses said rules of syntax and semantics to check that all required properties of elements introduced by said designer into said Conceptual Model embodied in said Formal Specification are defined and have a valid value;
B) using a computer to automatically ensure that said Formal Specification is correct by executing a validation program which uses said rules of grammar of said formal language in which said Formal Specification is expressed to ensure that statements in said Formal Specification have correct syntax and are semantically correct and not ambiguous and each formula is well-formed according to rules of syntax and semantics specific to formulas of that type;
and further comprising the step of using a computer to automatically translate said Formal Specification into final, working, bug-free source code after steps A and B and been completed and all formulas are syntactically and semantically complete and correct so as to create a validated Formal Specification that is complete and correct, said automatic translation being carried out by a computer by extracting and storing in translation structure objects in memory of said computer predetermined requirements data from said validated Formal Specification needed to fill gaps in source code templates stored in each of a plurality of different types of translation structures stored in memory of a computer, each translation structure being a class object which stores requirements data extracted from said validated Formal Specification and a source code template and having a method which plugs requirements data stored in said translation structure into appropriate blanks in said source code template so as to create source code of a particular type which is generated by instances of said class of translation structures, said source code customized with data from said validated Formal Specification, said process of automatic translation comprising:
creating not only said translation structures but also a code generation class which includes one or more methods which are executed during said translation process to maintain a list of said translation structures which have been created;
call the code generation methods of said translation structures in the proper order;
write to files the source code generated by the code generation methods of said translation structures; and
organize said files in accordance with a component-based structure for said application computer program thereby creating final, working, bug-free source code for said application computer program.

30. A process for using a computer to automatically validate a Formal Specification encoding a Conceptual Model of an application computer program being designed by a designer, comprising the steps:
A) using a computer to automatically ensure that said Formal Specification is complete, said Formal Specification being written in formal language having a grammar comprised of rules of syntax and semantics which define how statements in said Formal Specification must be structured and what they mean, said computer executing a validation program that uses said rules of syntax and semantics to check that all required properties of elements introduced by said designer into said Conceptual Model embodied in said Formal Specification are defined and have a valid value;
B) using a computer to automatically ensure that said Formal Specification is correct by executing a validation program which uses said rules of grammar of said formal language in which said Formal Specification is expressed to ensure that statements in said Formal Specification have correct syntax and are semantically correct and not ambiguous and each formula is well-formed according to rules of syntax and semantics specific to formulas of that type;
and further comprising the steps:
presenting user interface tools including diagrams and textual interactive dialogs by which a user may define elements that make up said Conceptual Model including defining mathematical and boolean formulas necessary to define aspects of the behavior of said application computer program and make changes thereto;
checking all affected formulas each time a change is made to said Conceptual Model;
and wherein some of the properties of elements in said Conceptual Model are strictly validated under rules of said validation process and some of the elements in said Conceptual Model are flexibly validated under rules of said validation process, and, if a change made by said designer to said Conceptual Model affects a strictly validated property, then said change is rejected if the property is not given a valid value, otherwise said change is accepted;
and if a change to said Conceptual Model made by said designer affects a property which is flexibly validated, then said designer is informed should any error arise, but allowed to do the modification if said designer wishes;

if there are no affected formulas, modifying the Conceptual Model as specified by said designer.

31. A process for using a computer to automatically validate a Formal Specification encoding a Conceptual Model of an application computer program being designed by a designer, comprising the steps:

A) using a computer to automatically ensure that said Formal Specification is complete, said Formal Specification being written in formal language having a grammar comprised of rules of syntax and semantics which define how statements in said Formal Specification must be structured and what they mean, said computer executing a validation program that uses said rules of syntax and semantics to check that all required properties of elements introduced by said designer into said Conceptual Model embodied in said Formal Specification are defined and have a valid value;

B) using a computer to automatically ensure that said Formal Specification is correct by executing a validation program which uses said rules of grammar of said formal language in which said Formal Specification is expressed to ensure that statements in said Formal Specification have correct syntax and are semantically correct and not ambiguous and each formula is well-formed according to rules of syntax and semantics specific to formulas of that type;

and wherein said Conceptual Model includes a Presentation Model containing elements that define the final user interface said application computer program will present to users thereof, and wherein said Presentation Model includes elements added by said designer to said Conceptual Model by selection of user interface patterns from a pattern language which are validated by using a computer to automatically use rules of syntax and semantics that apply to patterns and sub-patterns within said patterns in said pattern language to perform the following steps:

verifying that any patterns in said Presentation Model selected by said designer and articulated with additional requirements data that defines the desired user interface are acceptable user interface patterns with no essential information missing;

verifying that attributes used in filters sub-patterns specified as part of a pattern selected to be part of said Presentation Model are visible from a class owning said filters;

verifying that attributes used in order criteria sub-patterns are visible from a class owning said order criteria sub-patterns;

verifying that any formula in a filter sub-pattern has correct syntax and is semantically correct and uses only terms defined in said Conceptual Model;

verifying that any action selection pattern selected by said designer from said pattern language uses as final actions presentation patterns selected from said pattern language which have been articulated in said Conceptual Model by said designer;

verifying that any set of dependency patterns selected by said designer to be part of said Presentation Model are terminal and have confluence; and verifying that warnings are displayed to said user if any pattern is defined in said Conceptual Model but not used in said Presentation Model or if an instance pattern is duplicated.

32. An apparatus comprising a computer programmed with an operating system and a validation program that cooperates with said operating system to control said computer to perform the following functions of a validation process to validate a Formal Specification encoding a Conceptual Model of an application computer program being designed by a designer, said validation process comprising the following steps:

A) controlling said computer to check said Formal Specification to ensure that it is complete, said Formal Specification written in a formal language which has a grammar comprised of rules of syntax and semantics and wherein said process of checking said Formal Specification to ensure it is complete comprises the process of using said computer to automatically check said Formal Specification for completeness using said rules of syntax and semantics to ensure that all required properties of elements of said Conceptual Model encoded in said Formal Specification added by said designer are defined and have been given a valid value;

B) controlling said computer to use said rules of syntax and semantics of said formal language to ensure said Formal Specification is correct in that the statements therein have correct syntax and are semantically correct and not ambiguous and to verify that each formula is well formed according to rules of syntax and semantics specific to formulas of that type;

and wherein said validation program is also a modelling program or is part of a suite of programs which includes a modelling program, said modelling program being structured to control said computer to perform the following steps:

displaying diagrams and textual interactive dialogs with which said designer interacts to enter requirements data that defines elements in said Conceptual Model and make changes thereto;

doing a partial validation each time a change is made to said Conceptual Model where some elements in said Formal Specification have a set of properties that are strictly validated and must have a full definition and be given a valid value when entered and other elements are flexibly validated and can be left with some properties incomplete or with invalid values during the process of inputting requirements data to define said Conceptual Model;

said partial validation process controlling said computer to implement the following rules:

if the change affects a strictly validated property and the property is not given a valid value, then the change is rejected;

if the change affects a strictly validated property and the property is given a full definition and a valid value, the change is accepted;

if the change affects a property which is not strictly validated but the change renders part of said Formal Specification invalid, then marking the portion of said Formal Specification rendered invalid by the change as invalid, but allowing the change and the requirements data inputting process to continue;

upon completion of the process of inputting requirements data and receiving a request to validate said Formal Specification, re-validating every statement in said Formal Specification and every formula using said rules of syntax and semantics and the validation processes specifically designed for each different type of formula and interacting with said designer until all errors have been corrected so as to create a validated Formal Specification;

automatically translating said validated Formal Specification into final working source code by extracting and storing in translation structure objects predetermined requirements data from said validated Formal Specification needed to fill gaps in source code templates stored in each of a plurality of different types of said translation structure objects stored in memory of said computer, each translation structure object being an instance of a class of said objects which stores requirements data extracted from said validated Formal Specification and a source code template and having a method which plugs said requirements data stored in said translation structure object into appropriate blanks in said source code template so as to create source code of the particular type generated by instances of said class of translation structures, said source code having been customized by the insertion of said requirements data stored in said translation structure which was extracted from said validated Formal Specification, said function of automatically translating further comprising creating a code generation class object which includes one or more methods which are executed by said computer during said automatic translation and control said computer to maintain a list of said translation structure objects which have been created and to call the code generation methods of said translation structure objects in the proper order, write to one or more files the source code generated by the code generation methods of said translation structure objects and organize said files in accordance with a component-based structure for said application computer program thereby creating final, working, bug-free source code for said application computer program.

33. A process for automatically translation of a validated Formal Specification into working, final source code complete with a user interface and a database schema, said validated Formal Specification encoding in a formal language a Conceptual Model of an application computer program, said automatic translation process comprising:

creating translation object instances in memory of a computer each of which is designed to create source code of a different type and each of which stores a source code template which has blanks in it for requirements data that will customize said source code to the requirements of said application computer program;

using a code generation method of each said translation object instance to control a computer to extract requirements data needed from said validated Formal Specification to fill in blanks in said source code template and storing said extracted requirements data in said translation object instance;

creating a code generation object in said memory of said computer and controlling a computer with a method which is part of said code generation object to make a list of the translation object instances which have been created and to call said code generation method of each said translation object in the proper order to cause said translation object to write source code by putting said extracted requirements data stored therein in the appropriate blanks of its source code template, writing the source code so generated by said translation objects to files and organizing said files into said application computer program.

34. A process comprising the steps:
A) controlling a computer with a validation program to validate a Formal Specification written in a formal language which has rules of syntax and semantics which define a grammar, said Formal Specification expressing in said formal language the information contained in a Conceptual Model of an application computer program being designed by a designer which is to be automatically translated by a translation program executing on a computer into working, final computer source code of said application computer program having a user interface and a database schema, said validating being carried out on a computer executing said validation program to ensure that said Formal Specification is complete in that there is no missing information and all required properties of elements in said Conceptual Model embodied in said Formal Specification are defined and have a value which is valid;
B) controlling said computer using said validation program so as to use said rules of grammar of whatever formal language said Formal Specification is written in, to ensure said Formal Specification is correct in that the statements in said Formal Specification have correct syntax and are semantically correct, consistent and not ambiguous; and
C) controlling said computer using said validation program to use rules of grammar that are specific to each different type of formula in said Conceptual Model and a validation process which is specific to each different type of formula in said Conceptual Model to validate each formula expressed in the Formal Specification;
and
wherein said Conceptual Model comprises an object model, a dynamic model, a functional model and a presentation model, and
further comprising the step of using a computer to automatically translate said Formal Specification into full, working, bug-free source code of said application computer program after steps A and B and C have been completed and all elements of said Formal Specification including all said formulas have been validated to ensure they have correct syntax and are semantically complete and correct, said automatic translation process comprising:

creating translation object instances in memory of a computer each of which is designed to create source code of a different type and each of which stores a source code template which has blanks in it for requirements data which will be extracted from said Formal Specification after it has been validated and that will customize said source code to the requirements of said application computer program;

using a code generation method of each said translation object instance to control a computer to extract said requirements data needed from said validated Formal Specification to fill in said blanks in each said source code template and storing said extracted requirements data in each said translation object instance;

creating a code generation object and controlling a computer with a method which is part of said code generation object to make a list of the translation object instances which have been created and to call said code generation method of each said translation object in the proper order to cause said translation object to write source code by putting said extracted requirements data stored therein in the appropriate blanks of its source code template, and writing the source code so generated by said translation objects to files and organizing said files into said application computer program.

35. The process of claim 34 wherein said process is performed in such a way that the following further steps are performed:

presenting user interface tools in the form of diagrams and textual interactive dialogs said designer may interact with to define said Conceptual Model and make changes thereto, and controlling a computer to automatically convert each element of requirements data as it is added to said Conceptual Model into its formal counterpart in a formal language in said Formal Specification;

checking all affected formulas and portions of said Formal Specification each time a change is made to said Conceptual Model, and marking any portions of said Formal Specification rendered invalid by a change as invalid, where some elements of said Conceptual Model have properties which are strictly validated and other elements of said Conceptual Model have properties which are flexibly validated;

if a change to said Conceptual Model affects a strictly validated property, then the change is rejected if the property is not given a valid value at the time of entry, otherwise the change is accepted;

if a change to said Conceptual Model affects a property which is not strictly validated and said designer has not entered a valid value, then said designer is informed of said error should an error arise, but is allowed to do the modification if he or she wishes;

if said change does not affect any formulas or other elements of said Formal Specification, said computer is controlled to accept the change and modify said Conceptual Model as specified by said designer.

36. The process of claim 34 further comprising the step of displaying on a display of a computer diagrams and textual interactive dialogs which said designer of said Conceptual Model can interact with to use object-oriented modelling techniques to define classes of said Conceptual Model including user interfaces of said classes and enforce the restriction that only the information relevant to filling a class definition in the formal specification language in use can be introduced.

37. The process of claim 34 further comprising the step of displaying on a display of a computer diagrams and textual interactive dialogs with which a designer of said Conceptual Model can interact to use object-oriented modelling techniques to define the classes of said Conceptual Model including user interfaces, relationships between classes, global transactions, global functions and view.

38. The process of claim 34 further comprising the step of displaying on a display of a computer diagrams and textual interactive dialogs which a designer of said Conceptual Model can interact to use object-oriented modelling techniques to define classes of said Conceptual Model including their process specification, attributes, services, valuations, derivations, integrity constraints, transactions, triggers, preconditions, display sets, filters, population selection user interface patterns, said diagrams including a state transition diagram where the designer can specify the correct behaviour of objects in terms of an appropriate sequence of states in the life cycle for all objects in the class associated with said state transition diagram for said class, and an object interaction diagram for the entire Conceptual Model which provides a tool for the designer to enter data defining allowed interobject communication such as triggers which are object services which are automatically activated when a condition specified by said designer is satisfied, and global transactions which are services involving the services of different objects and/or other global transactions, the composition of said global transactions being specified by a formula entered by said designer, and wherein said textual interactive dialogs allow said user to select and articulate patterns from a pattern language to define in said Conceptual Model and said Formal Specification generated therefrom a full user interface for said application computer program being designed, and wherein said textual interactive dialogs allow said designer to define formulas for said process specification, valuations, derivations, transaction and integrity constraints, and wherein a valuation is a mathematical or Boolean formula that specifies how an event specified by said designer will affect the value of an attribute specified by said designer of a class specified by said designer, where an event is the occurrence of a single service and not a transaction.

39. The process of claim 34 further comprising the step of displaying on a display of a computer diagrams and textual interactive dialogs which said a designer of said Conceptual Model can interact with to use object-oriented modelling techniques to define the classes of said Conceptual Model in an object model and to define a functional model, dynamic model and presentation model, all of said models being automatically converted by said computer to said Formal Specification written in the OASIS formal language, said object model including requirements data entered by said designer to define each class, and wherein said diagrams and textual interactive dialogs are structured to allow said designer to enter requirements data defining or selecting and defining the following elements of said Conceptual Model: a formula for a default value calculation of constant and variable attributes, services, event and transaction arguments, formulas that define local and global transactions, formulas to calculate specialization conditions for inheritance, derivation and valuation formulas including formulas to calculate the values of derived and variable attributes and formulas to calculate conditions, formulas to calculate static and dynamic constraints, formulas to calculate preconditions for actions carried out by events and transactions, formulas to calculate control conditions that control transitions between states in a State Transition Diagram, formulas to calculate conditions for triggers, display sets, filters, and population selection user interface patterns.

40. The process of claim 39 further comprising the step of displaying on the display of a computer diagrams and textual interactive dialogs which said designer of said Conceptual Model can interact with to use object-oriented modelling techniques to define each class of said Conceptual Model, using a state transition diagram which defines the valid states of objects in said class and valid transitions between them, each transition defined in terms of a change in the attributes of an object in said class undergoing said transition, each transition defined in terms of an action which can cause the change in state of the object, each action defined as execution of a service by an agent, and wherein each action may have a precondition defined in the form of a formula that defines the precondition that needs to be satisfied before said action will be performed and a corresponding error message which will be displayed on a display of a computer executing said application computer program if said precondition does not hold, and wherein said diagrams and textual interactive dialogs are structured to allow said designer to specify a list of interfaces, each interface comprising a list of services that a user of said computer application program can execute and a list of attributes said user can see.

41. The process of claim 39 further comprising the step of displaying on the display of a computer diagrams and textual interactive dialogs which are structured to allow said designer to specify relationships between each class in said Conceptual Model and the other classes, said relationships being of two types: inheritance and aggregation, said textual interactive dialogs also structured to allow said designer to define the cardinalities of each aggregation relationship and whether said aggregation relationship is static or dynamic and whether the aggregation relationship is inclusive or referential and whether said aggregation relationship has an identification dependence and allowing said designer to specify a grouping clause when said aggregation relationship is multi-valued, said diagrams and textual interactive dialogs also structured to allow said designer to store the name of a parent class for any inheritance relationship, the name of the child class and whether the specialization is temporary or permanent, and, if permanent, to store a well-formed formula based upon constant attributes as a specialization condition, and, if said specialization is temporary, said diagrams and other textual interactive dialogs are structured to allow said designer to store either a condition or a list of events that activate or deactivate the child role.

42. The process of claim 34 further comprising the step of displaying on the display of a computer diagrams and textual interactive dialogs which said designer of said Conceptual Model interacts with to use object-oriented modelling techniques to define the classes of said Conceptual Model, where said diagrams and textual interactive dialogs are structured to allow specification of services as events or transactions, where events are a single service and where transactions are compositions of multiple services each of which may be an event or a transaction, each said transaction having a formula which defines the composition of services which make up said transaction, and wherein said diagrams and textual interactive dialogs are structured to allow a designer to specify a list of arguments for each service where each argument may be given the following characteristics: name, data type, whether nulls are allowed as a valid value, whether the argument represents a set of objects, a default value, an alias and a selection of a user interface which may be an introduction pattern, a population selection pattern, a defined selection pattern or dependency pattern, and wherein said textual interactive dialogs are structured to allow said designer give each attribute a definition which may include the following characteristics: a name, a formal type which may be defined as a constant, variable or derived variable, a data type, a default value, whether the attribute is an identifier for distinguishing the objects of a class, a length, whether the attribute is required when the object is created, whether the attribute can be assigned a null value, and a field to introduce some remarks regarding why the attribute has been created, and wherein said textual interactive dialogs are structured to allow said designer to include a set of valuation formulas that define how the value of the attribute is changed by means of execution of an event by defining a condition that must be satisfied to apply the effect, each said formula also defining the event that causes the effect and each said formula supplying a mathematical or Boolean expression that defines how the named event affects the value of said attribute, said textual interactive dialogs also structured to allow said designer to select user interface patterns to be applied in the corresponding service arguments related to the attribute.

43. The process of claim 42 further comprising the step of displaying on the display of a computer diagrams and textual interactive dialogs which said designer of said Conceptual Model may interact with to use object-oriented modelling techniques to define the classes of said Conceptual Model and wherein said diagrams and textual interactive dialogs are structured to allow said designer to specify formulas for derivations and constraints for each class, where said textual interactive dialogs allow said designer, for each derivation, to specify a list of pairs, each pair comprising a condition and a formula, each said condition specifying which formula will be applied in each condition, and wherein said textual interactive dialogs allow said designer to specify each constraint as a formula plus an error message which will be displayed if the constraint is violated.

44. The process of claim 42 further comprising the step of displaying on the display of a computer diagrams and textual interactive dialogs which said designer of said Conceptual Model can interact with to use object-oriented modelling techniques to define the classes of said Conceptual Model wherein said diagrams and textual interactive dialogs are structured to allow a designer to enter formulas to specify derivations and constraints for each class, where each derivation comprises a list of pairs each pair comprised of a condition and a formula each condition specifying which formula will be applied if said condition is satisfied, and wherein each constraint is a formula which defines a constraint which all objects in said class owning said constraint must satisfy plus an error message which will be displayed on a display of a computer executing said application computer program if said constraint is violated, and wherein said textual interactive dialogs are structured to allow said designer to specify triggers by selecting a target in terms of self, class or object upon which a service will be performed, a trigger condition which defines the conditions which must be satisfied before a triggered action is performed, a triggered action which is defined in terms of a service which will be performed on said target and a list of possible agents to activate said triggered action and a list of default values to be applied as the arguments of the triggered service.

45. The process of claim 42 further comprising the step of displaying on the display of a computer diagrams and textual interactive dialogs which said a designer of said Conceptual Model can interact with to use object-oriented modelling techniques to define derivations and constraints for each class, where said designer can use said textual interactive dialogs to define each derivation by specifying a list of pairs, each pair comprising a condition and a formula, said condition specifying which formula will be applied if said condition is satisfied, and wherein said textual interactive dialogs are structured to allow said designer to specify each said constraint using a formula defining the constraint that all objects of the class owning said constraint must satisfy plus an error message which will be displayed on a display of a computer executing said application computer program if said constraint is violated, and wherein said diagrams and textual interactive dialogs are structured to allow a designer to specify triggers by defining a target upon which the triggered action will be carried out upon, said target being specified in terms of self, class or object, a trigger condition which is a condition which, if satisfied, will cause said triggered action to be performed, a triggered action which is defined in terms of a service which will be performed on said target if said trigger condition is satisfied and a list of possible agents to activate said triggered action and by defining a list of default values to be applied as arguments of said triggered service when said trigger condition is satisfied and said triggered action is performed, and wherein said diagrams and textual interactive dialogs allow a designer to define for each class user interface patterns in terms of display sets, each display set storing elements of visualization which control which attributes of said objects in said class will be displayed to a user of said application computer program, filters which are formulas and a list of auxiliary variables that are useful to define said formulas, said filters defining which objects in said class can be accessed, and population selection patterns which are related to said display sets and a filters and control which objects of said class can be observed and which attributes of each said object which passes said filter can be observed.

46. The process of claim 34 further comprising the step of displaying on the display of a computer diagrams and textual interactive dialogs which said designer of said Conceptual Model can interact with and which are structured to allow said user to use object-oriented modelling techniques to enter requirements data that defines the following elements of said Conceptual Model: said classes; services of each said class, said services being defined as events or transactions, where events are single services and where transactions are compositions of multiple services each of which may be an event or a transaction, said transaction having a formula which defines the composition of services; a list of arguments for each service; global transactions and, for each global transaction, said textual interactive dialogs are structured to allow said designer to give a name, a formula which defines the nature of the global transaction in terms of the services involved and a list of arguments, and to enter a list of global functions and, for each one, give a name, a data type of the returned value, a set of arguments and provide a comment about the function.

47. The process of claim 34 further comprising the step of displaying on the display of a computer diagrams and textual interactive dialogs which said designer of said Conceptual Model can interact with to use object-oriented modelling techniques to define the classes of said Conceptual Model, where said diagrams and textual interactive dialogs are structured to allow specification of services of each said class as events or transactions, where events are not comprised of multiple services and where transactions are compositions of multiple services each of which may be an event or a transaction, said transaction having a formula which defines the composition of services, and wherein said diagrams and textual interactive dialogs are structured to allow said designer to specify a list of arguments for each service, and to specify a view for each agent class, said view comprising the formal interface for said agent class in terms of the attributes said agent class will be able to see and services said agent class will be able to invoke.

48. A process comprising the steps:
using a computer to automatically translate a validated Formal Specification that embodies a Conceptual Model of an application computer program into a complete, working source code of said application computer program including a user interface and a database schema, comprising the sub steps:
A) controlling a computer to retrieve requirements data entered into said Conceptual Model by a designer of said application computer program regarding classes, global transactions and global functions defined in said Conceptual Model, and storing it in code generation structures in memory of said computer, each said code generation structure being an instance of a code generation class which is designed to generate source code of a predetermined type and storing a source code template which is used to generate source code of said predetermined type and which has blanks in it into which said requirements data is plugged by a code generation method of said code generation structure so as to customize said source code template to the particular requirements for said application computer program which are embodied in said requirements data entered by a designer into said Conceptual Model;
B) for each class for which requirements data was retrieved from said Conceptual Model, automatically generating working and complete computer program source code using said code generation methods of said code generation structures so as to generate complete and final source code which implements a server component, a query component, and a service type executive component, and a global interaction type executive component,
and wherein said server component for each said class is structured to receive requests for execution of services to be executed and has a method for each service present in said class, each said method for a service being source code which can control a computer to carry out said service;
and wherein said query component for each said class is structured to have methods necessary to query the population of said class, each said method being source code capable of controlling a computer to allow a user of said application computer program to query said population of said class stored in said database schema implemented in memory of a computer as part of a persistence tier;
and wherein said service type executive component for each said class is source code structured to be able to control a computer to resolve or execute services offered in a class signature of said class by implementing an interface to other components of said application computer program comprising a method for each service, each said method of said interface associated with a service functioning to receive from a server component for said service or another executive component a request to cause execution of said service by a server component instance that has a method to control a computer to execute said service, each said method for each said service implemented by said service type executive component being source code structured to control a computer in accordance with an Execution Model to carry out the following functions:
verify the existence and validity of said server component instance to carry out said service;
create a copy of the requested server component instance in memory of a computer and access a persistence layer via said query component to retrieve the values of constant and variable attributes needed to execute said service;
use a state transition diagram defined for said class in said Conceptual model to validate the state transition which would be caused by execution of the requested service based upon the present state of the requested server instance;
verify satisfaction of any preconditions to execution of the requested service;
if the state transition caused by execution of said service is valid and all preconditions are satisfied, modify the value of instance variable attributes that are acted upon by execution of said service as specified in a valuation formula, said modification of values done by performing all valuation calculations specified in said valuation formulas specified in said Conceptual Model as implemented by said service so as to change the state of said requested server instance;

validate the new state achieved by said server instance by checking the new state against all static and dynamic integrity constraints;

checking if said new state of said server instance causes any trigger conditions defined in said Conceptual Model to be satisfied, and, if so, cause any triggered actions to be carried out;

communicate with a persistence layer to store the values of any persistent attributes of said new state of said requested server instance; and, and wherein said global interaction executive component for each class is structured to have a method per each global interaction defined in said Conceptual Model for said class;

and wherein said process of automatically translating said Formal Specification into source code of said application computer program further comprises the following steps:

C) for each class for which requirements data was gathered from said Conceptual Model, using said computer to automatically execute said code generation method of a code generation structure storing a source code template designed to generate a T component, said T component being a source code component which is structured to control a computer to store a copy of the constant and variable attributes of an instance of said class in memory of a computer and is further structured to control a computer to calculate the value of derived attributes of said class;

D) for each class for which requirements data was gathered from said Conceptual Model, using said computer to automatically execute said code generation method of a code generation structure storing a source code template designed to generate a P component, said P component being a source code component structured to control a computer to store in memory values needed to initialize the values of constant and variable attributes of said class when creating an instance of said class or to just initialize the values of variables that constitute the class identification mechanism;

E) for each class which is a multi-valued component of an inheritance relationship and for which requirements data was gathered from said Conceptual Model, using said computer to automatically execute said code generation method of a code generation structure storing a source code template designed to generate a PL component, said PL component being a source code component structured to control a computer to implement a collection whose components are P components as well as to carry out methods needed to add and get items from said collection and get a number representing the number of items in said collection;

F) for some or all classes which are temporal or permanent, condition-based specialization, using a computer to automatically execute said code generation method of a code generation structure storing a source code template designed to generate a C component, where a C component is a source code component structured to control a computer to store in memory the values needed to initialize constant and variable attributes of the class corresponding to said C component when creating an instance of said class;

G) for classes which are temporal or permanent condition-based specialization, using a computer to automatically execute said code generation method of a code generation structure storing a source code template designed to generate a CC component, wherein a CC component is a source code component structured to control a computer to implement a collection of C components and a pair of methods per each C component to add and get items to the collection and a method to get the number of item in said collection of said C components;

H) for every class, using a computer to automatically generate a code generation method of a code generation structure having stored therein a source code template designed to generate an error component, said error component being a source code template which is structured to control a computer to store information about the success or failure of a service execution;

I) for every class for which requirements data was gathered from said Conceptual Model, using a computer to automatically execute a code generation method of a code generation structure having stored therein a source code template designed to generate an instance list component, wherein said instance list component is a source code component structured to control a computer to gather a collection whose items are executive components involved in the execution of a service and including methods to add an item to the collection, get an item and get the number of items in the collection and including a method to empty the collection and another one to look for an instance of said class by its identification function;

J) for every class for which requirements data was gathered from said Conceptual Model, using a computer to automatically execute the code generation method of a code generation structure storing a source code template designed to generate condition, disjunction and conjunction components, where said condition, disjunction and conjunction components are source code components which are structured to control a computer to support the construction of complex Boolean expressions, query said persistence layer and are structured as a conjunction of disjunctions, and wherein said condition component is a source code component which stores information about a simple Boolean condition comprising two operands and a Boolean operator, and wherein said disjunction component is a source code component which implements a collection whose items are condition components as well as methods to add and get a condition from the collection and a method to get the number of conditions in the collection, and wherein said conjunction component is a source code component which implements a collection whose items are disjunction components as well as having methods to add and get a disjunction from said collection of disjunction components and a method to get the number of disjunction in the collection;

K) for every class for which requirements data was gathered from said Conceptual Model, using a computer to automatically execute a code generation method of a code generation structure storing a source code template which is designed to generate a trigger component, where a trigger component is a source code component which is structured to control a computer to store information about a satisfied trigger condition so that the corresponding action identified in a formula defining said trigger condition can be later executed;

L) for every class for which requirements data was gathered from said Conceptual Model, using a computer to automatically execute a code generation method of a code generation structure storing a source code template designed to generate a trigger list component, where a trigger list component is a source code component which is structured to control a computer to implement a collection whose items are trigger components and includes methods to add trigger components to the collection, get any item from said collection, get the first item from the collection and get the number of items in the collection;

using a computer to automatically execute a code generation method of a code generation structure storing a source code template designed to generate a global module for grouping attributes and methods shared through the generated code;

using a computer to automatically execute a code generation method of a code generation structure storing a source code template designed to generate a global functions module that groups the source code of all global functions defined in said Conceptual Model; and outputting the computer program source code resulting from the above recited source code generation steps.

49. A process for using a computer to automatically translate a validated Formal Specification written in a formal language as that term is used in computer science and meaning that there is an agreed upon syntax to every statement defining the proper structure of the component parts of the statement and there is an agreed upon semantic meaning for every term and that term is defined so as to have one and only one meaning, said Formal Specification defining an application computer program the source code of which will be created by said automatic translation of said Formal Specification, said automatic translation creating working and complete source code with a user interface and a database schema that is the functional equivalent of said Formal Specification, comprising the steps:

A) using a computer to automatically extract necessary requirements data from said Formal Specification and automatically generate source code implementing fixed files to embody headers, definitions, constants and auxiliary functions;

B) using a computer to automatically extract necessary requirements data from said Formal Specification and automatically generate source code implementing auxiliary widgets;

C) using a computer to automatically extract necessary requirements data from said Formal Specification and automatically generate source code structured to control a computer to carry out the following functions, for each class, generate a query/selection form, an instance selection component, a specialization component if the class is specialized from other classes and requires extra initialization, and, for each service of said class, locating the appropriate object server code and generating and displaying an activation service form which points to the appropriate object server for said service;

D) using a computer to automatically generate source code structured to control a computer to generate and display an access form to identify a user who wishes to use said application program by providing user name and password login capability;

E) using a computer to automatically extract necessary requirements data from said Formal Specification and automatically generate source code structured to control a computer to implement a main form containing a menu application block which displays, in menu form, all the services an authenticated user is allowed to access, and wherein said computer automatically generates system logic code to implement a server object which is source code structured to control a computer to receive arguments needed to execute said service and execute said service;

F) using a computer to automatically extract necessary requirements data from said Formal Specification and automatically generate source code structured to control a computer to implement communication functions to, for each service, send a message containing the necessary arguments needed to execute said service and send said message to the appropriate object server code structured to control a computer to carry out said service so as, so as to allow a logged on user to invoke services selected by said user; and G) using a computer to automatically generate source code structured to control a computer to extract the state of all attributes of all classes defined in said Formal Specification and automatically generate a data store such as a relational database which stores the state of said attributes, and wherein step E is carried out in such a way as to automatically generate system logic source code structured to control a computer to access said data store so as to provide the ability to store changes in attributes of said classes as the values of said attributes change.

50. The process of claim 49 wherein step D is performed by controlling a computer to iterate over said Formal Specification to determine a list of agent classes and by controlling a computer to execute a code generation method of a code generation structure stored in memory of a computer which stores requirements data from said Formal Specification which is used by said code generation method to fill in blanks in a source code template so as to generate source code which is structured to control a computer to display a dialog box which provides a list of agent classes from which a user logging onto said application program can choose and displays a field where a user can enter an object ID of a valid object ID for a valid object instance belonging to a class said user selects and displays a field in which said user enters a password, and wherein step G is performed by controlling a computer to execute a code generation method of a code generation structure stored in memory of a computer which stores requirements data from said Formal Specification which is used by said code generation method to fill in blanks in a source code template so as to generate source code for said application computer program which is structured to control a computer to create said data store by creating a table in a relational database for every class defined in said Formal Specification with a field in each said table for each said constant or variable attribute of said class.

51. The process of claim 50 wherein step E is performed by controlling a computer to iterate through said Formal Specification and extract requirements data defining classes and services available to a user of said application computer program and which are to be implemented in said application computer program, and controlling a computer to execute a code generation method of a code generation structure stored in memory of a computer which stores requirements data from said Formal Specification which is used by said code generation method to automatically fill in blanks in a source code template so as to automatically generate source code which causes said main form to list said available services in an access hierarchy implemented as menu bars, HTTP pages or any other user interface display structure which allows said user of said application computer program to browse to and select a service said user executing said application computer program has privileges to perform, and wherein said source code automatically generated as part of said application computer program is also structured to control a computer executing said application computer program to, for each class, display an item labelled "query" or something which indicates selecting it will allow said user to access a query form to query said class, and to display an item labelled with the alias of a service for each service of said class available to the user, and, for each class which has an inheritance relationship with other classes, said automatically generated source code is structured to display an item for each subclass labelled with a subclass alias.

52. The process of claim 51 wherein step F is performed by controlling a computer to execute a code generating method of a code generation structure in memory of a computer that stores requirements data from said Formal Specification, said code generation method controlling said computer to use said requirements data stored in said code generation structure to fill in a source code template so as to generate source code of said application computer program which is structured to control a computer executing said application computer program to cause a service form to be displayed on said computer executing said application computer program, said service form associated with a service a user of said application computer program wishes to have executed by a computer executing said application computer program, said service form having a graphic part and a functional part, said graphic part including a displayed widget for each service argument that needs input from a user of said application computer program said widget for each said service argument having a field which a user of said computer application program uses to fill in a value for said service argument, and wherein said source code is also structured to control a computer executing said computer application program to display a pair of widgets which function to receive commands from said user of said application computer program to accept or cancel launch of said service, and wherein said functional part includes source code structured to control said computer executing said application computer program to implement event drivers for said widgets to receive and execute commands received from said user to accept or cancel launch of said service and to initialize properties of said widgets displayed for each service argument which requires input from said user with default values, and to control said computer executing said application computer program to validate data introduced by said user to set values for said service arguments and to control said computer executing said application computer program to build a message containing the values for service arguments needed to execute said service, said message to be sent to an object server having code structured to control said computer executing said application computer program to execute said service and send said message to said object server to invoke execution of said service.

53. The process of claim 49 wherein step G is performed by controlling a computer to execute a code generation method of a code generation structure stored in memory of a computer so as to extract requirements data from said Formal Specification needed to create a database schema and fill in blanks of a source code template stored in said code generation structure so as to automatically create source code structured to control a computer to create a persistence tier in the form of said database schema in memory of a computer which stores the values of all object attributes for all class objects or class instances, and wherein said code generation method extracts for each class defined in said Formal Specification requirements data including name, constant attributes of either the emergent or inherited type, variable attributes of either the emergent or inherited type, identification function, inherited identification function, aggregation relationships of either the emergent or inherited type and agent information, and wherein said database schema comprises any data structure which stores the values of all object attributes in a manner that allows system logic of said application computer program to retrieve said object attribute values at will, said data structure preferably being a table in a relational database in said memory for each elemental class defined in said Formal Specification, each said table having a field therein for each constant or variable attribute defined for said class in said Formal Specification, each said field being of a type determined by the type of said attribute to which said field corresponds in said Formal Specification, each said table having a primary key, said primary keys for said tables so created being fields in said tables and being determined by attributes marked in said Formal Specification for each class as being identification attributes for their respective classes, and wherein tables in said database schema representing specialized classes, in addition to having fields for emergent and inherited attributes will also have fields corresponding to attributes that constitute the primary key of a table representing an ancestor class, and wherein if a specialized class has its own identification function, these fields constitute a foreign key to a parent class table, and wherein if a class has an aggregation relationship which is multi-valued, a new table is added to represent said aggregation relationship which has a field for each attribute which constitutes a primary key of a related table, the set of all these fields representing the primary keys of related tables representing the primary key of said new table and representing fields coming from each related table's primary key, these fields constituting foreign keys to each related table, and if the aggregation relationship is univalued, said source code is structured to control said computer to copy the fields of the primary key of the other class and these fields constitute a foreign key to the related class table, and wherein said source code which is automatically generated is structured to control a computer to create in each table corresponding to a class a field for each object to store a name of a current state of said object, and to create a field to store a password in tables corresponding to classes that are agents of any service specified in said Formal Specification so as to limit the users which may have access to each said service, and wherein step E is performed by controlling a computer to execute a code generation method of a code generation structure stored in memory of a computer so as to extract requirements data from said Formal Specification needed to fill in a source code template stored in said code generation structure so as to create system logic source code which identifies each point where an internal or external error might occur and generate error checking and handling source code structured to control a computer to notify a user of said application computer program about an error's occurrence, said system logic code including source code structured to control a computer to provide user interfaces defined in said Formal Specification to allow clients to request services and to add, retrieve, update and delete information in said relational database.

54. An apparatus comprising:
a general purpose computer having as part thereof a memory, a display, a keyboard and a pointing device and having a validated Formal Language Specification stored in memory, said computer programmed with:
an operating system program loaded into and controlling operation by said computer to carry out instructions of other computer programs;

a translator program cooperating with said operating system program to control operation of said computer to automatically extract requirements data from said validated Formal Language Specification and store said requirements data in code generation translation structures in memory of said computer wherein each code generation translation structure is an object in memory of said computer in the form of an instance of a class of objects which is designed to create source code of a predetermined type and can store requirements data extracted from said formal language specification which is needed to generate source code of said predetermined type and which also stores a source code template to generate source code of said predetermined type, and wherein each said code generation translation structure also has a code generation method which functions to automatically plug requirements data stored in said translation structure object into appropriate blanks of said source code template and automatically output source code of said predetermined type which has been automatically customized by requirements data automatically extracted from said validated Formal Language Specification, and wherein said translator program cooperates with said operating system to create a code generation class object in said memory of said computer which has methods to automatically keep track of the code generation translation structures which have been created in said memory of said computer and call said code generation methods of said code generation translation structures in the proper order to generate finished source code for said application program which is executable and complete and not a prototype and with functionality to access a database and having a complete user interface and wherein said computer further comprises:

a modeler program controlling said computer to cooperate with said operating system to control said computer to create said validated Formal Language Specification by using said keyboard, display and pointing device to provide a graphical user interface having diagrams and textual interactive dialogs with which a designer interacts to design an application program by entering requirements data into a Conceptual Model, said modeler program structured to control said computer to automatically convert said requirements data by plugging it into appropriate parts of formal language statements defining the conceptual structures said requirements data is meant to define, said formal language statements so created comprising a Formal Language Specification which is written in a formal language and which encodes said Conceptual Model, a formal language being defined as a language having an agreed upon syntax to every statement defining the proper structure for the component parts of the statement and there is an agreed upon semantic meaning such that every term is defined and has one and only one meaning, said modeler also structured to cooperate with said operating system to control said computer to use said rules of syntax and semantics to validate said Formal Language Specification to ensure said Formal Language Specification is complete and correct prior to translation.

* * * * *